(12) United States Patent
Honda

(10) Patent No.: US 8,112,623 B2
(45) Date of Patent: Feb. 7, 2012

(54) COMMUNICATION TERMINAL APPARATUS, SERVER TERMINAL APPARATUS, AND COMMUNICATION SYSTEM USING THE SAME

(75) Inventor: Atsushi Honda, Tokyo (JP)

(73) Assignee: NEC Corporation, Tokyo (JP)

( * ) Notice: Subject to any disclaimer, the term of this patent is extended or adjusted under 35 U.S.C. 154(b) by 837 days.

(21) Appl. No.: 12/092,916

(22) PCT Filed: Nov. 6, 2006

(86) PCT No.: PCT/JP2006/322093
§ 371 (c)(1),
(2), (4) Date: May 7, 2008

(87) PCT Pub. No.: WO2007/055169
PCT Pub. Date: May 18, 2007

(65) Prior Publication Data
US 2009/0100524 A1 Apr. 16, 2009

(30) Foreign Application Priority Data
Nov. 9, 2005 (JP) .................................. 2005-324507

(51) Int. Cl.
*H04L 29/06* (2006.01)
(52) U.S. Cl. ....................................................... 713/156
(58) Field of Classification Search ......................... None
See application file for complete search history.

(56) References Cited

U.S. PATENT DOCUMENTS
6,148,404 A * 11/2000 Yatsukawa .......................... 726/2
2006/0123172 A1* 6/2006 Herrell et al. .................. 710/269

FOREIGN PATENT DOCUMENTS
| EP | 0726526 A2 | 8/1996 |
| EP | 1331539 A2 | 7/2003 |
| JP | 5134917 | 6/1993 |

(Continued)

OTHER PUBLICATIONS

"Interrupts, Direct Memory Access, and Processes," Microcomputer Architecture and Programming, Jan. 1, 1981, pp. 325-369, XP 000199247.

(Continued)

*Primary Examiner* — Brandon Hoffman
(74) *Attorney, Agent, or Firm* — Sughrue Mion, PLLC

(57) ABSTRACT

A communication terminal apparatus includes a storage section configured to store a library function in which a first specific instruction is executed a process to be executed prior to a communication with a communication target and a second specific instruction is executed before returning to a call source, a client application, an attribute value group of the client application, and an permissible address range of the first specific instruction. A communication instruction execution control section controls execution of a communication instruction based on the attribute value group of the client application, when the client application executes the communication instruction to generate an internal interruption. A security gate entering section checks whether or not an address of the first specific instruction is within a permissible address range when the client application executes the first specific instruction to generate the internal interrupt, and changes the attribute value group of the client application when the address of the first specific instruction is within the permissible address range. A security gate exiting section returns the attribute value group of the client application to an original state when the client application executes the second specific instruction to generate the internal interrupt.

30 Claims, 39 Drawing Sheets

FOREIGN PATENT DOCUMENTS

| | | |
|---|---|---|
| JP | 10269184 | 10/1998 |
| JP | 10336169 | 12/1998 |
| JP | 1173372 | 3/1999 |
| JP | 2001516908 | 10/2001 |
| JP | 2004213640 | 7/2004 |
| JP | 2005128960 | 5/2005 |
| WO | WO 0142874 A2 | 6/2001 |

OTHER PUBLICATIONS

Search Report dated Oct. 10, 2011 from the European Patent Office in counterpart European application No. 06823007.7.

Wikipedia, "Security-Enhanced Linux," Oct. 27, 2005, XP55007943, http://en.wikipedia.org/w/index.php?title=Security-Enhanced_Linux&oldid=26592624.

* cited by examiner

STACK OF APPLICATION PROCESS
(BEFORE CHANGE)

STACK OF APPLICATION PROCESS
(AFTER CHANGE)

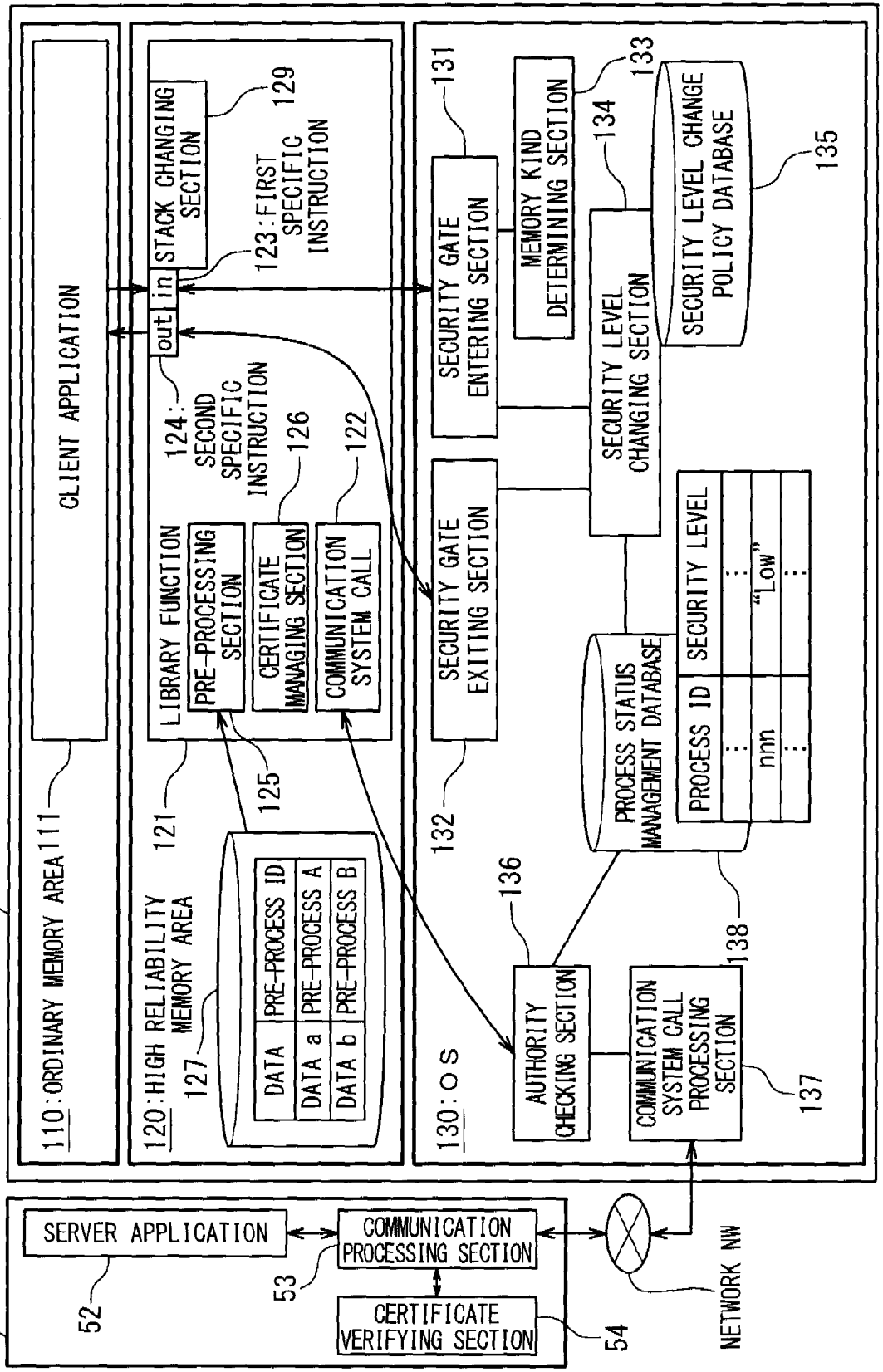

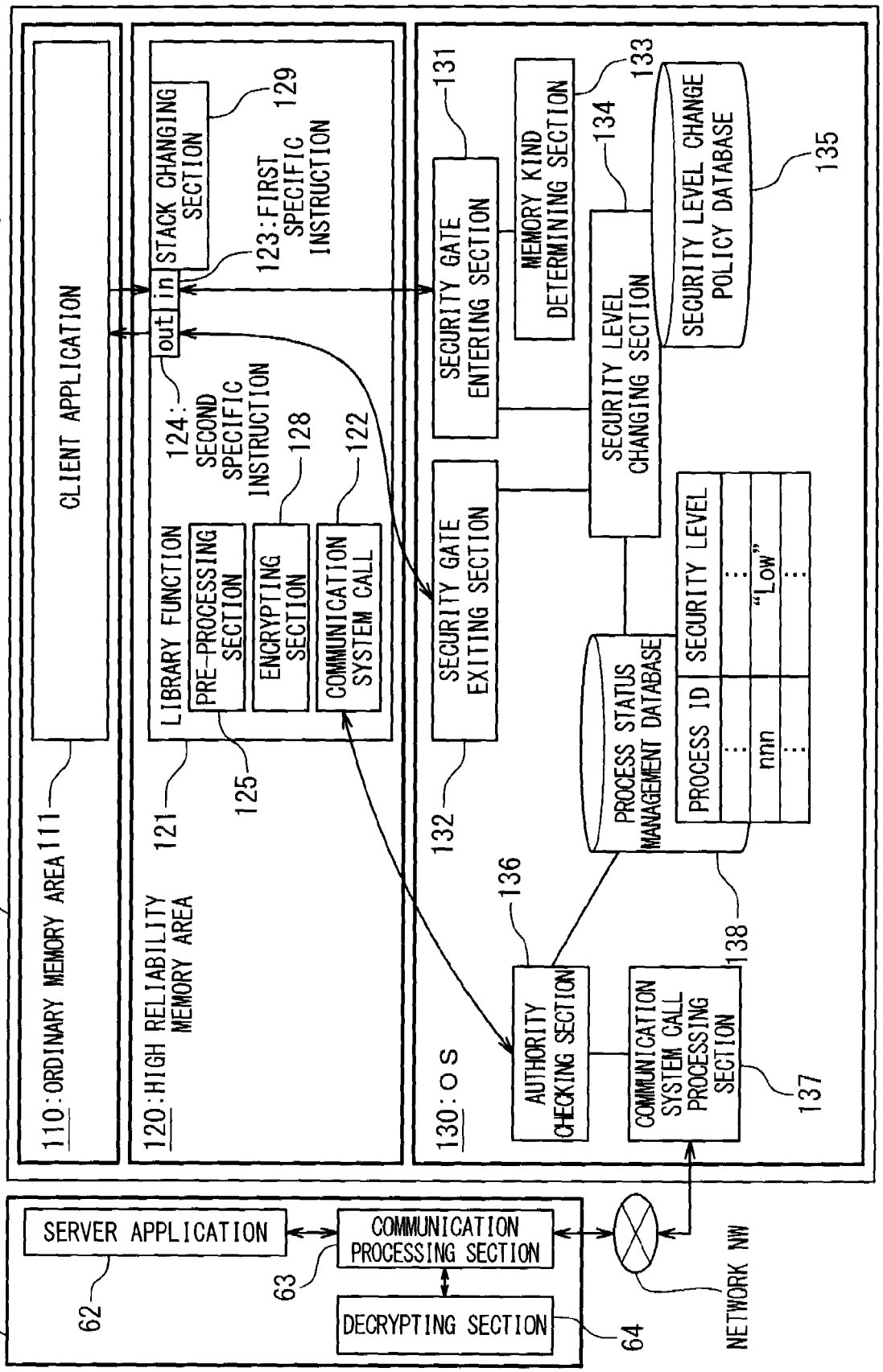

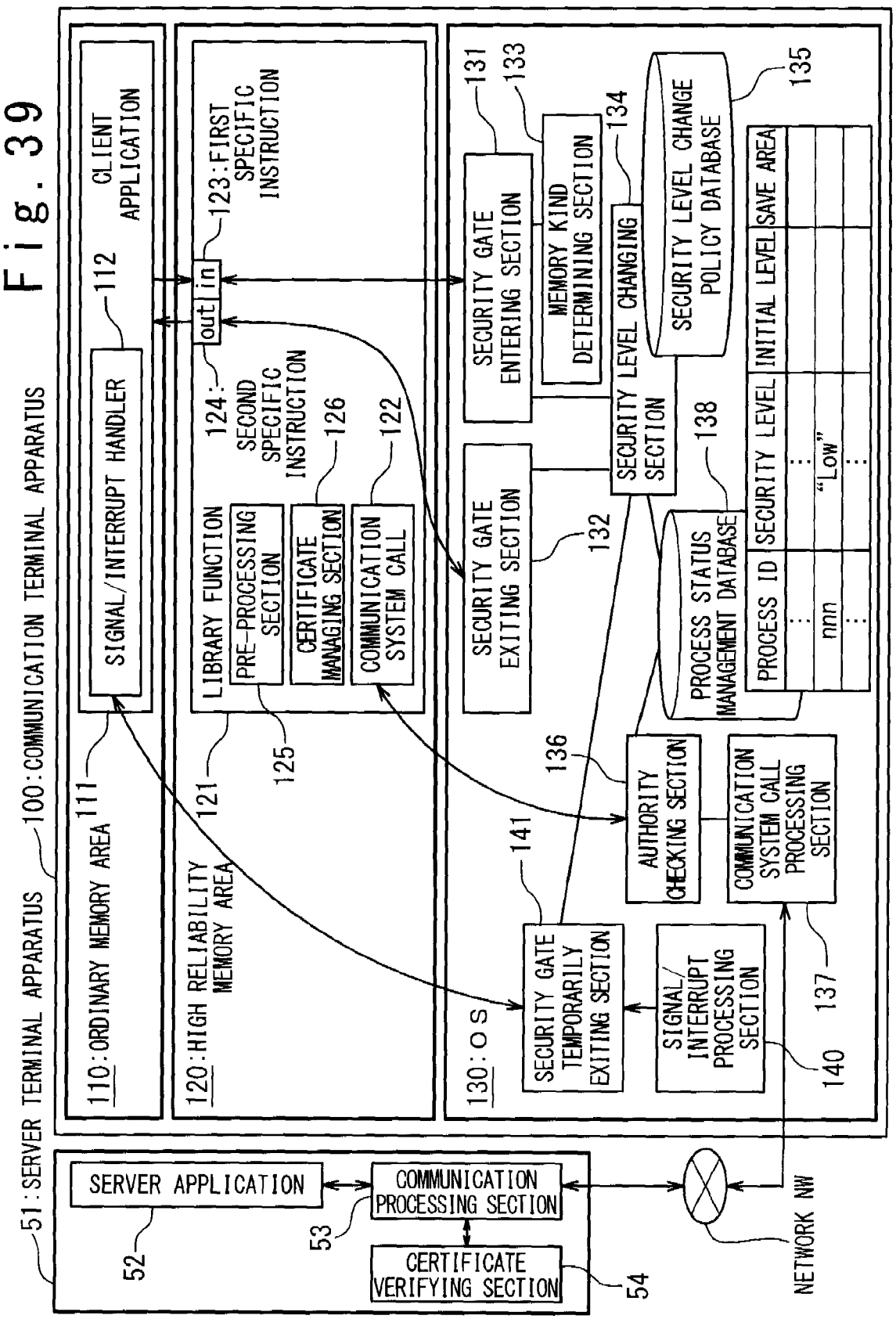

COMMUNICATION TERMINAL APPARATUS, SERVER TERMINAL APPARATUS, AND COMMUNICATION SYSTEM USING THE SAME

TECHNICAL FIELD

The present invention relates to a communication terminal apparatus and a communication system, and especially, relates to a communication terminal apparatus and a communication system which necessarily execute a specific process prior to communication with a counter end.

BACKGROUND ART

There are many proposed and practically used communication systems in which a communication terminal apparatus that a client application program (hereinafter, to be referred to as a "client application") is executed and a server terminal apparatus that a server application program (hereinafter, to be referred to as a "server application") is executed are connected each other via a network such the internet to be communicable, and a request from the communication terminal apparatus is transmitted to the server terminal apparatus via the network, so that the server terminal apparatus provides services in response to the request (for example, Japanese Patent Application Publication (JP-P2005-128960A).

In such a communication system, a scheme for executing the specific process in the communication terminal apparatus prior to communication with the server terminal apparatus is realized by interposing a pre-processing section 4302 between a client application 4301 and a communication processing section 4303 in a communication terminal apparatus 4300, through a method of: transferring data for a server application 4311 to the pre-processing section 4302, and transferring the data to the communication processing section 4303 to allow communication between the communication processing section 4303 and a communication processing section 4312 on a server terminal apparatus 4310 after the pre-processing section 4302 executes the specific process based on the transferred data, when the client application 4301 communicates with the server application 4311 on the server terminal apparatus 4310, as shown in a conceptual diagram of FIG. 43.

In this system, the client application 4301 may directly transfer the data to the communication processing section 4303 by bypassing the pre-processing section 4302. Prior to the communication with the server terminal apparatus, it is possible to execute the specific process in the communication terminal apparatus, but it is difficult to guarantee the execution.

Also, there is a possibility that the client application 4301 executes altered or forged communication process. As a result, the client application 4301 can communicate with the server application 4311 in an illegal communication process in which the process is regarded as if necessary pre-processing has been completed prior to the communication in spite that the necessary pre-processing has not been completed prior to the communication.

The server terminal apparatus 4310 cannot determine whether or not the communication from the client application 4301 passes through the necessary pre-processing prior to the communication in the communication terminal apparatus 4300. The server terminal apparatus 4310 has no method for distinguishing the communication from the client application 4301 on which the necessary pre-processing is performed prior to the communication from the others.

Consequently, the specific process executed prior to the communication with the server terminal apparatus in the communication terminal apparatus is limited to a process that will not invite a serious problem even if the process is executed or not, and for example, an important process for the server terminal apparatus such as a charging process is required to be performed not on the communication terminal apparatus but on the server terminal apparatus.

In conjunction with the above-mentioned description, Japanese Patent Application Publication (JP-P2004-213640A) discloses an information management system. In an information management system of the related art, a plurality of terminal apparatus for storing a data and a data management server for managing management data relating to the data are connected to each other via a network. The data management server includes a management data storage section for storing the management data and a first secure communication section for forming a secure communication path between the respective terminal apparatus and for communicating with the terminal apparatus via the communication path. The terminal apparatus include a tamper resistant module, and the tamper resistant module includes a data storage section for securely storing the data, an executing section for securely executing a process influencing to the management data with respect to the data stored in the data storage section, and a second secure communication section for forming a secure communication path with the first secure communication section and for transmitting a completion notification showing that the process impacting the management data has been executed via the communication path.

In addition, Japanese Patent Application Publication (JP-A-Heisei 5-134917) discloses a data process system of a data process apparatus. In the data process system of this related art, the data process apparatus includes an operating system for describing and processing data in accordance with a file format. The data process system includes an access pre-process and access post-process registered with relating to divided significant fields in a file; an access pre-process executing section for executing the access pre-process related to the field when accessing the field in the file; an access permission determining section for determining whether or not an access to the field can be permitted based on a result of the access pre-process by this access pre-process executing section; a field accessing section for accessing the field when the access is permitted by the access permission determining section; and an access post-process executing section for executing the access post-process related to the field after this field accessing section accessed the field.

In addition, Japanese Patent Application Publication (JP-A-Heisei 10-269184) discloses a security management method of a network system. In the security management method of this related art, a client, a business server, and an integrated authentication server can communicate to each other via a network. A business request is issued by transmitting certificate data from the client to the business server, and a confirmation request of the certificate is issued by transmitting the certificate data from the business server to the integrated authentication server. Also, the certificate is confirmed by the integrated authentication server, and an access authority of a user to the business server is checked. Thus, a user ID and a password are transmitted to the business server when being valid, and authentication is performed by using the user ID and the password by the business server.

DISCLOSURE OF INVENTION

An object of the present invention is to provide a technique for guaranteeing execution of a necessary pre-process prior to communication within a communication terminal apparatus in communication between a server terminal apparatus and a communication terminal apparatus.

Another object of the present invention is to provide a technique for preventing a communication terminal apparatus from communicating with a server terminal apparatus via an illegal communication process which a process is executed as if a necessary pre-process prior to communication has been completed in spite of incompletion of the necessary pre-process prior to the communication.

Further, another object of the present invention is to provide a technique for determining, on a server terminal apparatus, whether or not a necessary pre-process is performed by a communication terminal apparatus prior to the communication.

In an exemplary aspect of the present invention, a communication terminal apparatus includes a storage section configured to store a library function in which a first specific instruction is executed a process to be executed prior to a communication with a communication target and a second specific instruction is executed before returning to a call source, a client application, an attribute value group of the client application, and an permissible address range of the first specific instruction; a communication instruction execution control section configured to control execution of a communication instruction based on the attribute value group of the client application, when the client application executes the communication instruction to generate an internal interruption; a security gate entering section configured to check whether or not an address of the first specific instruction is within a permissible address range when the client application executes the first specific instruction to generate the internal interrupt, and to change the attribute value group of the client application when the address of the first specific instruction is within the permissible address range; and a security gate exiting section configured to return the attribute value group of the client application to an original state when the client application executes the second specific instruction to generate the internal interrupt.

In the communication terminal apparatus, the process to be executed prior to the communication with the communication target includes a pre-process, and a process of adding a certificate verifying the execution of the pre-process for the communication target to a transmission data. The process to be executed prior to the communication with the communication target may include a re-process, and a process of encrypting a data to be transmitted to the communication target by using a secret key of the communication target. The pre-process may include a charging process, or a copy right managing process.

In another exemplary aspect of the present invention, a server terminal apparatus includes: a storage section configured to store a server application; a certificate verifying section configured to verify whether or not a certificate is authorized; and a communication processing section configured to determine to be a data received from a client application which executes a predetermined pre-process prior to a communication, when the certificate added to the data received from the client application is determined to be authorized by the certificate verifying section, and to transmit to the server application.

Also, a server terminal apparatus includes: a storage section configured to store a server application; a decrypting section configured to decrypt an encrypted data by using a public key of the apparatus; and a communication processing section configured to determine to be a data received from a client application which has executed a predetermined pre-process prior to a communication, when the encrypted data received from the client application is decrypted by the decrypting section, and to transmit the decrypted data to the server application.

In another exemplary aspect of the present invention, a communication system includes a communication terminal apparatus and a server terminal apparatus, which are connected to each other through a network.

In another exemplary aspect of the present invention, a data processing method is achieved by retaining a library function in which a first specific instruction is executed previous to a process to be executed prior to a communication with a communication target and a second specific instruction is executed before returning to a call source, a client application, an attribute value group of the client application, and an permissible address range of the first specific instruction, in a communication terminal apparatus; by controlling execution of a communication instruction based on the attribute value group of the client application when the client application executes a communication instruction to generate an internal interruption; by checking whether or not an address of the first specific instruction is within the permissible address range when the client application executes the first specific instruction to generate the internal interruption; by changing the attribute value group of the client application when the address of the first specific instruction is within the permissible address range; and by returning the attribute value group of the client application to an original state when the client application executes the second specific instruction to generate an internal interruption.

The process to be executed may include a pre-process, and a process of adding a certificate verifying that the pre-process has been executed to the communication target to a transmission data. Also, the process may include a pre-process, and a process of encrypting a data to be transmitted to the communication target by using a secret key of the communication target.

In the present invention, when the client application of the communication terminal device calls the library function, the first specific instruction is executed before a process to be executed prior to a communication with the server terminal device and the internal interruption is generated. In exception process associated with this internal interruption, it is checked whether or not an address of the first specific instruction is within the permissible address range by the security gate entering section, an attribute value group of the client application is changed so as to execute a communication instruction when the address is within the permissible address range. Such change of the attribute value group is not performed when the address is not within the permissible address range. After that, a subsequent process of the called library function is executed, and a process to be executed prior to the communication with the server terminal device is executed. When the process of the library function progresses to a part of a communication instruction, an internal interruption is generated due to execution of the communication instruction and permission of execution of the communication instruction is controlled by the communication instruction execution control section based on the attribute value group of the client application in the exception process associated with this internal interruption. Accordingly, while the attribute value group remains in a state which does not allow execution of the communication instruction since the first specific instruction is not executed when the client application is not allowed to directly jump to the communication instruction, execution of the communication instruction becomes possible because the attribute value group is changed so as to use the communication instruction by execution of the first specific instruction when the first specific instruction has called a library function existing within the permissible address range. Also, in this case, a process to be executed prior to the communication with the communication target which is arranged after the first specific instruction is necessarily executed. Moreover, when the client application executes the second specific instruction before returning to the client application that is a caller from the library function, an internal interruption is generated and the attribute value group of the client application is returned to an original state by the security gate exiting section. According to this, execution of the communication instruction other than communication instructions included in the normal library function is prevented.

The client application of the communication terminal apparatus has no method for using the communication instruction other than a method that the first specific instruction calls the normal library function existing in an permissible address range, and a process to be executed prior to the communication with a server application of the server terminal apparatus is necessarily executed. According to the present invention, the execution of the necessary pre-process prior to the communication can be guaranteed in the communication terminal apparatus when the sever terminal apparatus communicates with the communication terminal apparatus.

In addition, it can be realized by adding a process to a library function called by a client application and to an OS. According to the present invention, there is no need to make change to the client application in order to guarantee execution of pre-process required prior to communication in the communication terminal apparatus.

In addition, only a communication terminal apparatus which communicates with the server terminal apparatus by calling the library function normally can perform creation of an authorized certificate and encryption using a secret key of a communication target. Therefore, it can be possible to determine whether or not the necessary pre-process prior to the communication has been executed if verifying the certificate by the server terminal apparatus or if decrypting by using a public key. Therefore, in the present invention including a process for creating the certificate verifying that the pre-process has been executed to the communication target or a process of encrypting a data transmitted to the communication target by using the secret key of the communication target as the process to be executed prior to the communication with the communication target in addition to pre-process, whether or not the necessary pre-process prior to the communication has been executed can be determined in the communication terminal apparatus on the server terminal side.

Furthermore, since only a communication terminal apparatus which communicates with the server terminal apparatus by calling the library function normally can perform creation of an authorized certificate and encryption using the secret key of the communication target, it is possible to determine whether or not it is such illegal communication process. Therefore, in the present invention including a process of creating a certificate verifying the pre-process has been executed to the communication target or a process of encrypting a data transmitted to the communication target by using the secret key of the communication target as a process to be executed prior to the communication with the communication target, in addition to the pre-process, it can be prevented that the communication terminal apparatus communicates with the server terminal apparatus via an illegal communication process which acts as if the necessary pre-process prior to the communication has been completed in spite of the fact that the necessary pre-process prior to the communication has not been completed.

BRIEF DESCRIPTION OF DRAWINGS

FIG. 37 is a block diagram of the communication system according to a fourteenth exemplary embodiment of the present invention;

FIG. 38 is a block diagram of the communication system according to a fifteenth exemplary embodiment of the present invention;

FIG. 39 is a block diagram of the communication system according to a sixteenth exemplary embodiment of the present invention;

BEST MODE FOR CARRYING OUT THE INVENTION

Hereinafter, a communication terminal apparatus and a communication system using it of the present invention will be described in detail with reference to the attached drawings (Hardware Configuration of Communication Terminal Apparatus)

Figure 1:
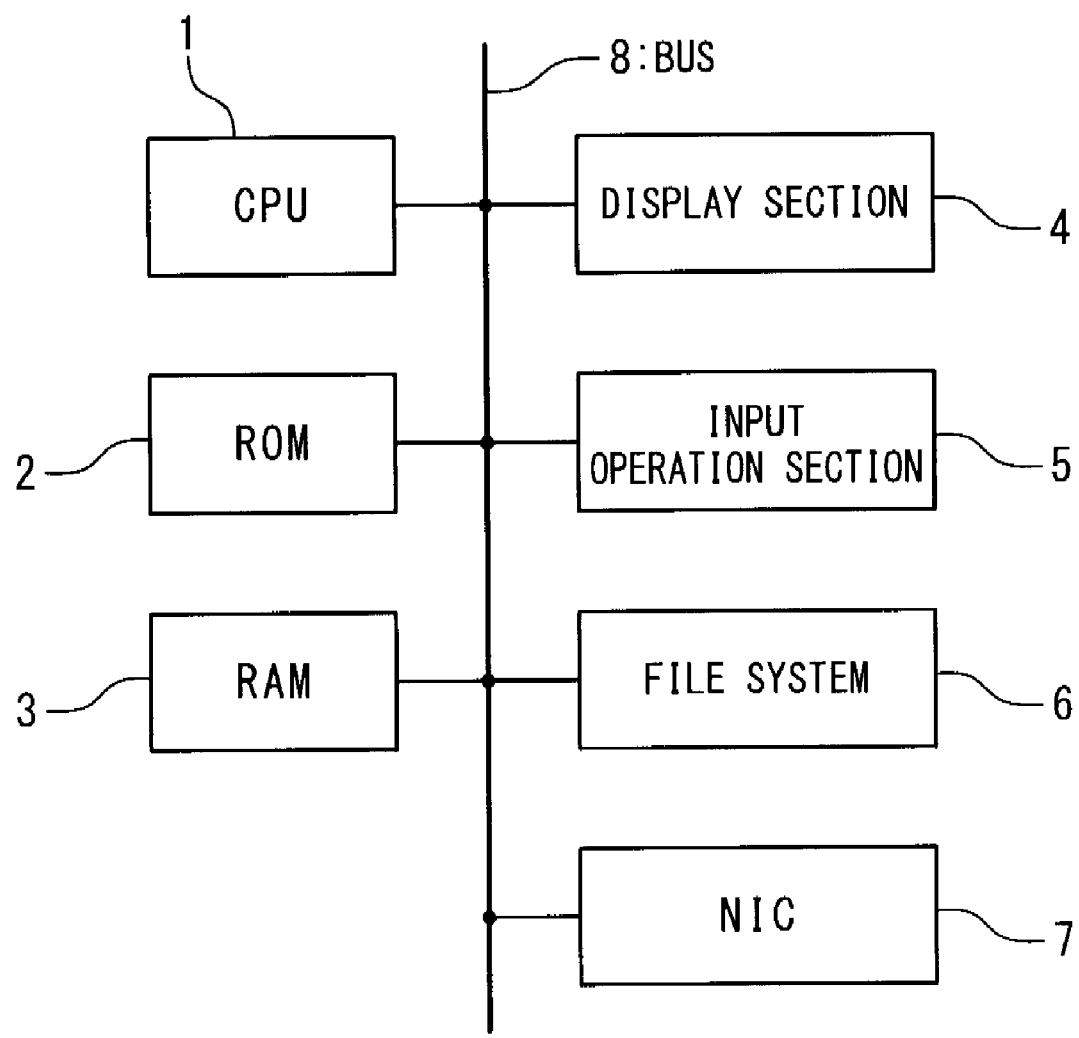
FIG. 1 is a block diagram showing one example of a hardware configuration of a communication terminal apparatus of the present invention.

FIG. 1 is a block diagram showing one example of a hardware configuration in a communication terminal apparatus of the present invention. Referring to FIG. 1, the communication terminal apparatus of the present invention includes a CPU 1, a ROM 2, a RAM 3, a display section 4, an input operation section 5, a file system 6, a network interface card (NIC) 7, and a bus 8 for connecting them each other. The ROM 2 is a read only memory, which sores an operating system (OS) executed by the CPU 1, a library function, fixed data, and so on. The RAM 3 is a rewritable memory, which temporarily stores a client application executed by the CPU 1, operation data, and so on. The display section 4 is composed of a LCD and the like, and displays an application screen and so on. The input operation section 5 is composed of a key board and the like, and inputs a data and an instruction from a user. The file system 6 is composed of a hard disk, an IC card, and so on, and stores the client application and various data. The NIC 7 is for communicating with an external communication target by a wired or wireless communication. Common computers such as a personal computer, a game terminal, a mobile phone, and the like exist as examples of the communication terminal apparatus having such hardware configuration.

First Exemplary Embodiment of Communication Terminal Apparatus

Figure 2:
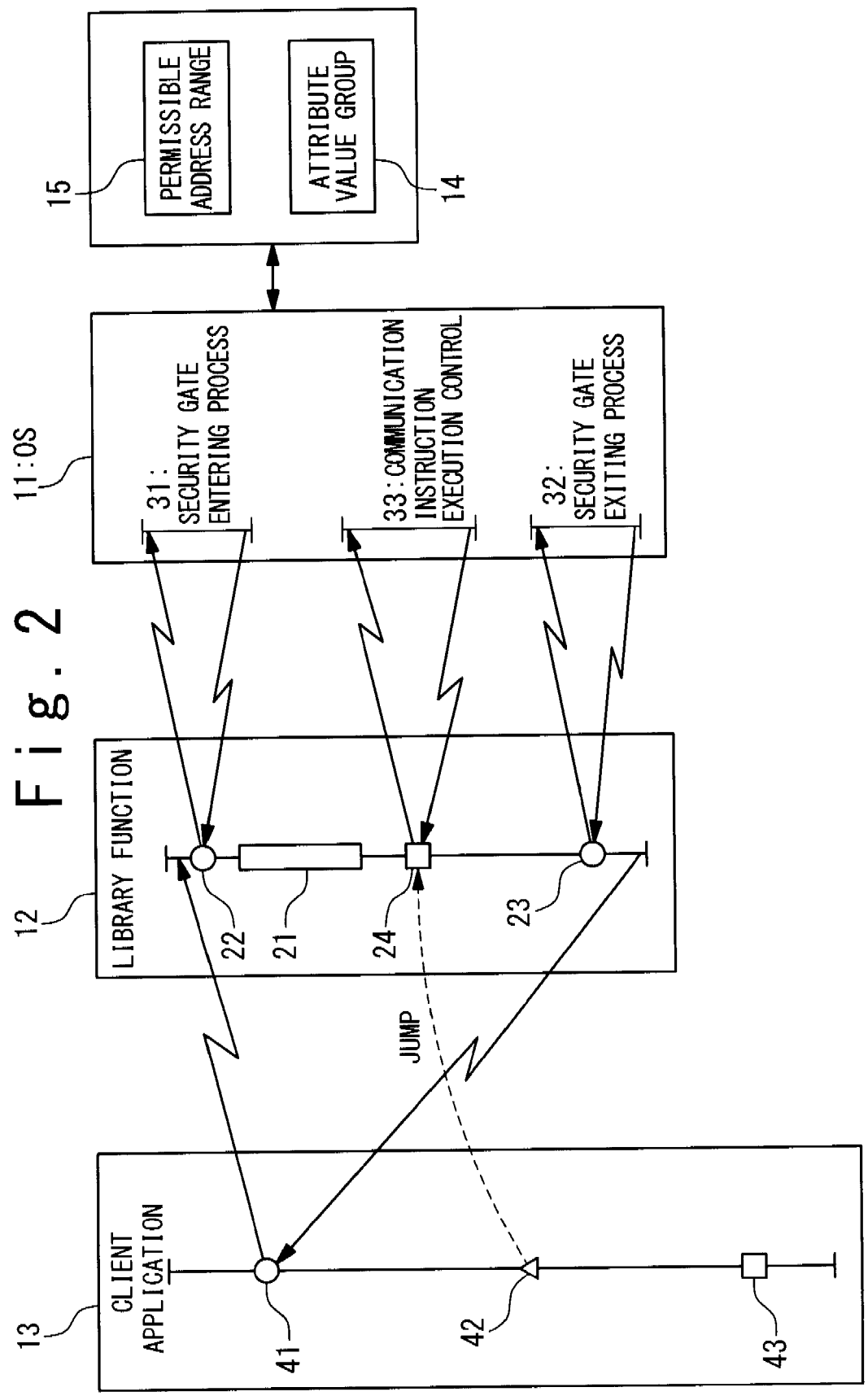
FIG. 2 is a block diagram of a communication terminal apparatus according to a first exemplary embodiment of the present invention.

FIG. 2 is a block diagram showing a configuration of the communication terminal apparatus according to a first exemplary embodiment of the present invention. Referring to FIG. 2, the communication terminal apparatus according to the first exemplary embodiment of the present invention stores an OS 11, a library function 12, a client application 13, an attribute value group 14, and a permissible address range 15 of a first specific instruction in a computer-readable storage medium.

In the library function 12, a first specific instruction 22 can be executed before execution of a process 21 of processes executed by a function prior to communication with a communication target, and a second specific instruction 23 can be executed before returning to a call source. Typically, the first specific instruction 22 is arranged in a head portion of the function and the second specific instruction 23 is arranged in a portion immediately before returning to the call source. The process 21 includes a pre-process such as a charging process, and a process of producing a certificate showing completion of the pre-process or a process of encrypting data to be sent to the communication target by using a secret key of the communication target. In addition, the library function 12 includes a communication instruction 24 for communicating with the communication target. The first specific instruction 22, the second specific instruction 23, and the communication instruction 24 are system call instructions. An internal interruption is generated on execution thereof, and a control is shifted to the OS 11. In addition, the permissible address range 15 of the first specific instruction 22 is set previously and is referred by the OS 11 at the internal interruption on the execution of the first specific instruction 22.

The client application 13 executes a call instruction 41 for calling the library function 12, a jump instruction 42 for directly jumping to the communication instruction 24 in the library function 12, and a communication instruction 43.

The OS 11 is a secure OS that a security level can be set for each client application 13. The OS 11 manages the attribute value group 14 for each client application 13 for example. The attribute value group 14 includes at least one attribute value used for determination of functions used by the client application 13 and of access control of resources. As a specific example of the attribute value group 14, there are an attribute value indicating the security level and an attribute value showing a security gate entry state. When the internal interruption is generated through execution of the first specific instruction 22 and the second specific instruction 23 and the communication instructions 24 and 43, the OS has a function for performing a security gate entering process 31, a security gate exiting process 32, and a communication instruction execution control 33, as an exception process corresponding thereto.

The communication instruction execution control 33 controls permission of execution of the communication instructions 24 and 43 based on the attribute value group 14 of the client application 13 when the client application 13 calls the library function 12 and executes the communication instruction 24 and when executing the communication instruction 43 on a client application code.

The security gate entering process 31 checks whether or not an address of the first specific instruction 22 is within the permissible address range 15 when the client application 13 executes the first specific instruction 22, and changes the attribute value group 14 of the client application 13, when being within the permissible address range 15.

The security gate exiting process 32 returns the attribute value group 14 of the client application 13 to an original state, when the client application 13 executes the second specific instruction 23.

Next, an operation of the communication terminal apparatus of the first exemplary embodiment will be described. Here, the attribute value group 14 of the client application 13 is set to a value indicating that a communication instruction cannot be executed. In addition, a memory address range of a memory (for example, the ROM 2 in FIG. 1) in which the normal library function 12 is set to the permissible address range 15.

When the client application 13 calls the library function 12 based on the call instruction 41, the first specific instruction 22 arranged in its head portion is executed first and the attribute value group 14 of the client application 13 is changed in the security gate entering process 31 of the OS 11. For example, when permission of execution of the communication instruction is controlled on the basis of a security level, the security level is changed, and when the permission of execution of a communication instruction is controlled on the basis of a security gate entry state, an attribute value indicating occurrence or non-occurrence of the security gate entry is changed. It should be noted that it is possible to execute a process of returning a security level to an original state again by changing the attribute value indicating the security gate entry state at this time point and determining whether or not being in the security gate entry state at this time point of the communication instruction execution control 33, and by determining permission of execution of the communication instruction based on the security level after changing the security level when being in the security gate entry state.

Subsequently, when the communication instruction 24 is executed by the client application 13 after the execution of the process 21 prior to the communication with the communication target, permission of execution of the communication instruction is determined based on the attribute value group 14 of the client application 13 in the communication instruction execution control 33 of the OS 11. When execution is permitted, the communication instruction 24 is executed to return the control to a call source. Communication between the communication terminal apparatus and a server terminal apparatus (not shown) is realized by the execution of this communication instruction 24.

Subsequently, when a process of the library function 12 progresses and the second specific instruction 23 is executed immediately before returning to the call source, the attribute value group 14 of the client application 13 is returned to a state before the security gate entry by the security gate exiting process 32 of the OS 11.

After that, when the client application 13 executes the instruction 42 for jumping to the communication instruction 24 of the library function 12, the control shifts to the communication instruction execution control 33 of the OS 11 because of execution of the communication instruction 24 as a jump destination. However, the communication instruction execution control 33 results in an error without executing the communication instruction since the attribute value group 14 of the client application 13 is not changed to execute a communication instruction because the first specific instruction is not executed.

Moreover, when the client application 13 directly executes the communication instruction 43, the control shifts the communication instruction execution control 33 of the OS 11. However, the communication instruction execution control 33 results in an error without executing the communication instruction since the attribute value group 14 of the client application 13 is not changed so that a communication instruction can be executed, because the first specific instruction is not executed.

According to the present exemplary embodiment, illegal use of the communication instructions 24 and 43 and the library function 12 by the client application 13 can be prevented, and the process 21 can be necessarily executed when communicating with the server terminal apparatus (not shown) by using the communication instruction 24 of the library function 12 correctly.

Second Exemplary Embodiment of Communication Terminal Apparatus

Figure 3:
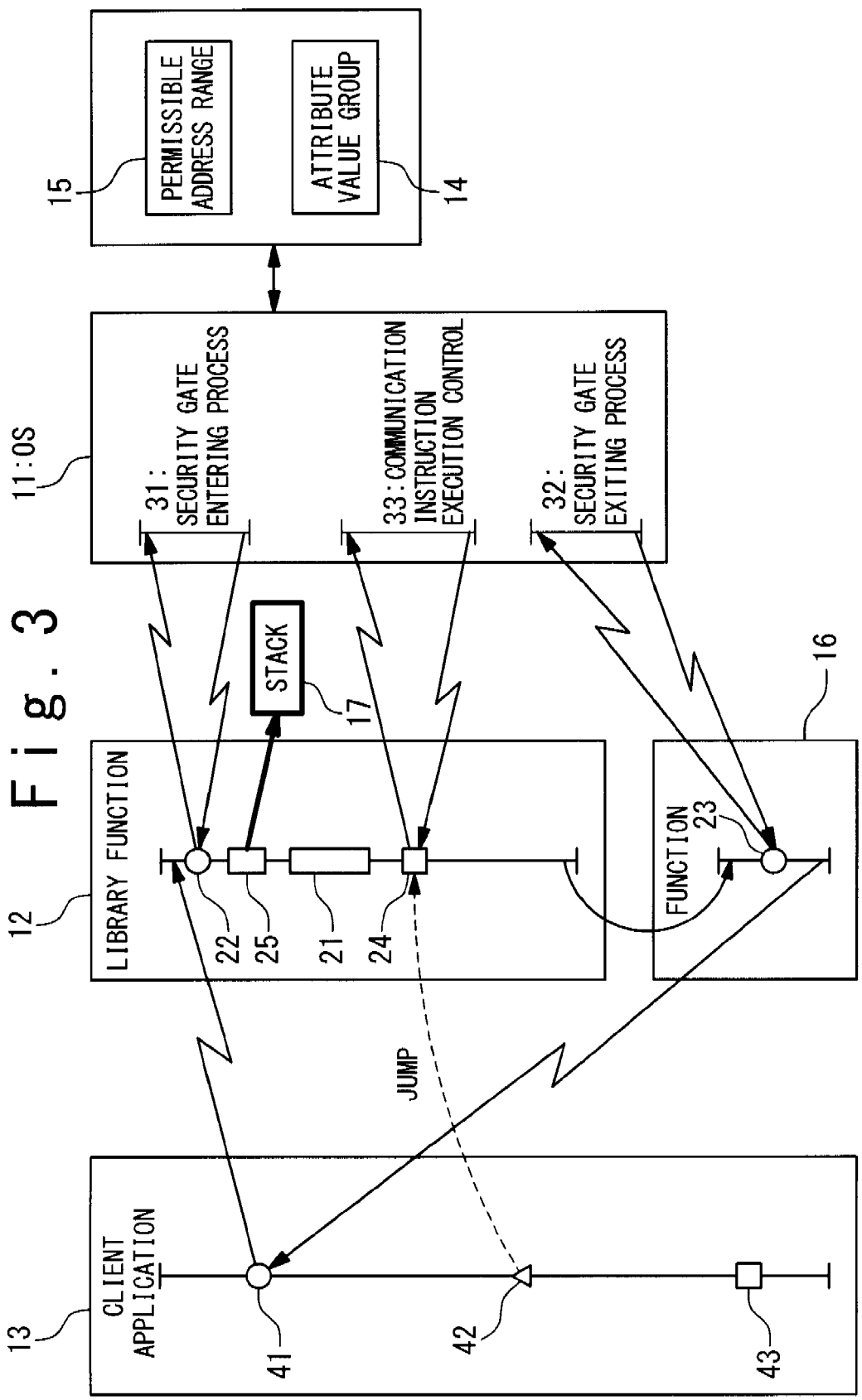
FIG. 3 is a block diagram of a communication terminal apparatus according to a second exemplary embodiment of the present invention.

FIG. 3 is a block diagram showing a configuration of the communication terminal apparatus according to a second exemplary embodiment of the present invention. Referring to FIG. 3, the communication terminal apparatus according to the second exemplary embodiment of the present invention is different from the communication terminal apparatus in the first exemplary embodiment in that the second specific instruction 23 is not arranged in the library function 12, an instruction sequence 25 for modifying (updating) a stack 17 of the client application 13 is arranged so as to go through a function 16 including the second specific instruction 23 before returning to a call source. The instruction sequence 25 may be arranged on an optional position if being on a path where the instruction sequence is necessarily executed and after a position where the first specific instruction 22 is arranged.

Next, an operation of the communication terminal apparatus of the present exemplary embodiment will be described mainly with respect to points different from the communication terminal apparatus in the first exemplary embodiment.

When the client application 13 calls the library function 12 based on the call instruction 41, the first specific instruction 22 arranged in its head portion is executed first, and the attribute value group 14 of the client application 13 is changed by the security gate entering process 31 of the OS 11. Subsequently, the stack 17 is modified or changed to go through the function 16 through execution of an instruction sequence 25 by the client application 13 before returning to the client application 13. When the communication instruction 24 is executed by the client application 13 after the process 21 is executed prior to the communication with the communication target, permission of execution of the communication instruction 24 is determined based on the attribute value group 14 of the client application 13. If the execution is permitted, the communication instruction 24 is executed and a control flow is returned to the call source. Subsequently, since data of the function 16 is obtained when process of the library function 12 progresses and the stack 17 is hopped to obtain data of the call source, the function 16 is called and the second specific instruction 23 therein is executed. Thus, the security gate exiting process 32 of the OS 11 is executed and the attributed value group 14 of the client application 13 is returned to a state before the security gate entry.

Operations when the client application 13 executes the instruction 42 for directly jumping to the communication instruction 24 of the library function 12 and when the client application 13 executes the communication instruction 43 are the same as that of the first exemplary embodiment.

According to the communication terminal apparatus of the present exemplary embodiment, illegal use of the communication instructions 24 and 43 and the library function 12 by the client application 13 can be prevented, and the process 21 can be necessarily executed when communicating with a server terminal apparatus (not shown) by using the communication instruction 24 of the library function 12 correctly. In addition, when a plurality of exits are present for returning from the library function 12 to the client application 13 as the call source, it is required to arrange the second specific instructions in front of all of the exits in a method of arranging the second specific instructions in the library function 12. However, the present exemplary embodiment advantageously satisfies the request by arranging only one instruction sequence 25.

Figure 4:
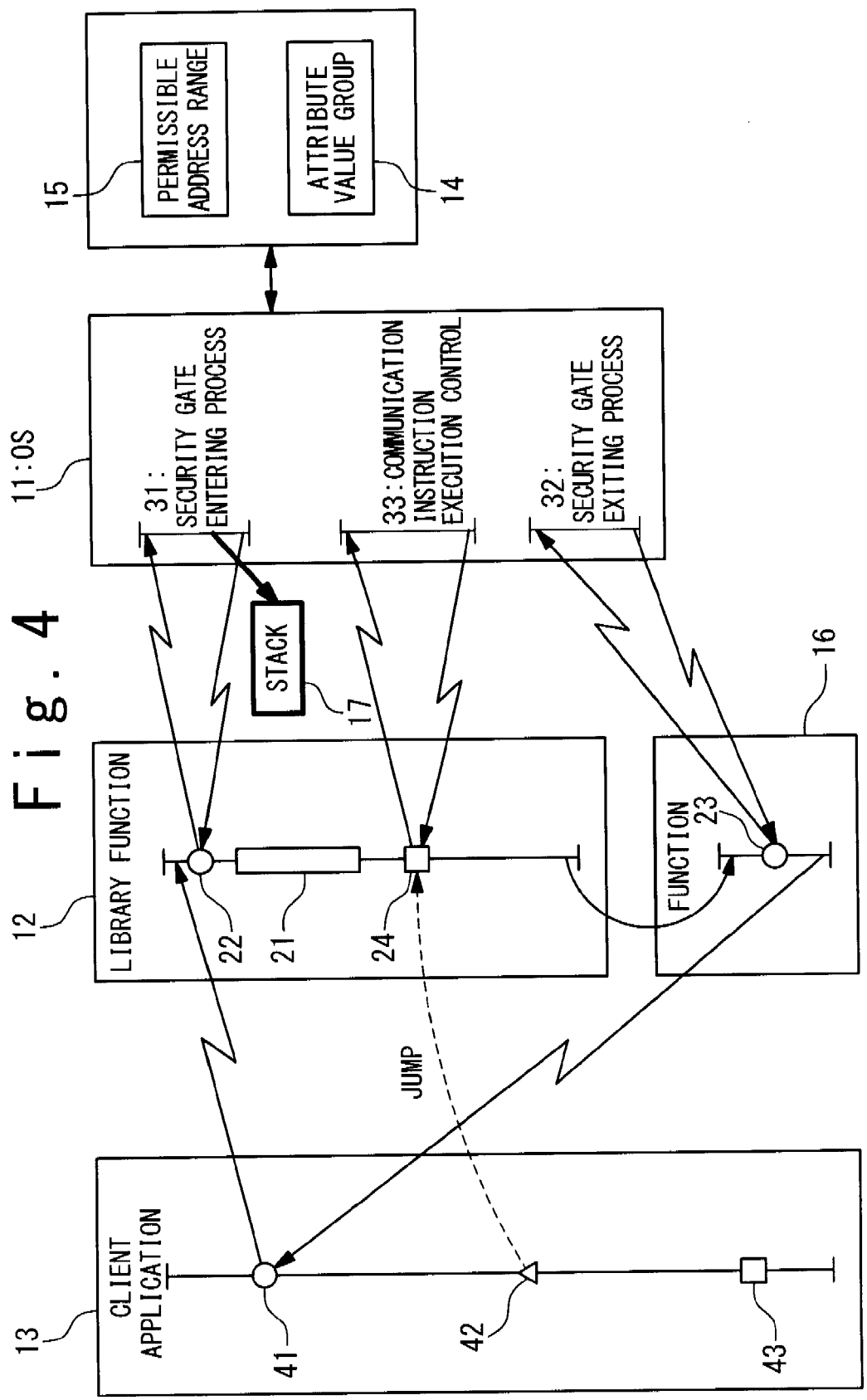
FIG. 4 is a block diagram of a communication terminal apparatus according to a modified example of the second exemplary embodiment of the present invention.

Modified Example of Second Exemplary Embodiment of Communication Terminal Apparatus FIG. 4 is a block diagram of a modified example of the communication terminal apparatus according to the second exemplary embodiment of the present invention. Referring to FIG. 4, the communication terminal apparatus according to the modified example of the second exemplary embodiment of the present invention is different from the first exemplary embodiment in that the second specific instruction 23 is not arranged in the library function 12, and instead, a process for modifying (updating) the stack 17 of the client application 13 is added to the security gate entering process 31 of the OS 11 such that the control flow goes through the function 16 including the second specific instruction 23 before returning from the library function 12 to the client application 13.

Next, an operation of the communication terminal apparatus of the present exemplary embodiment will be described mainly with respect to different points thereof from the communication terminal apparatus of the first exemplary embodiment.

When the client application 13 calls the library function 12 based on the call instruction 41, the first specific instruction 22 arranged in its head portion is executed first, and the attribute value group 14 of the client application 13 is changed by the security gate entering process 31 of the OS 11. Also, the stack 17 is modified so as to go through the function 16 before returning from the library function 12 to the client application 13. Subsequently, when the communication instruction 24 is executed by the client application 13 after the process 21 is executed prior to the communication with the communication target, permission of execution of the communication instruction 24 is determined based on the attribute value group 14 of the client application 13 by the communication instruction execution control 33 of the OS 11. When the execution is permitted, the communication instruction 24 is executed to return the control flow to the call source. Since data of the function 16 is obtained when the process of the library function 12 progresses and the stack 17 is hopped to obtain data of the call source, the function 16 is called and the second specific instruction 23 therein is executed. Thus, the security gate exiting process 32 of the OS 11 is executed, and the attribute value group 14 of the client application 13 is returned to a state before the security gate entry.

Operations when the client application 13 executed the instruction 42 for directly jumping to the communication instruction 24 of the library function 12 and when the client application 13 executed the communication instruction 43 are the same as that of the communication terminal apparatus of the first exemplary embodiment.

According to the communication terminal apparatus of the present exemplary embodiment, an illegal use of the communication instructions 24 and 43 and the library function 12 by the client application 13 can be prevented, and the process 21 can be necessarily executed when communicating with the server terminal apparatus (not shown) by using the communication instruction 24 of the library function 12 correctly. In addition, when a plurality of exits are present for returning from the library function 12 to the client application 13 as the call source, it is required to arrange the second specific instructions in front of all of the exits and the communication terminal apparatus of the second exemplary embodiment requires an arrangement of one instruction sequence 25 in a method for arranging the second specific instructions in the library function 12. However, the communication terminal apparatus of the present exemplary embodiment does not require the arrangements.

Third Exemplary Embodiment of Communication terminal Apparatus

Figure 5:
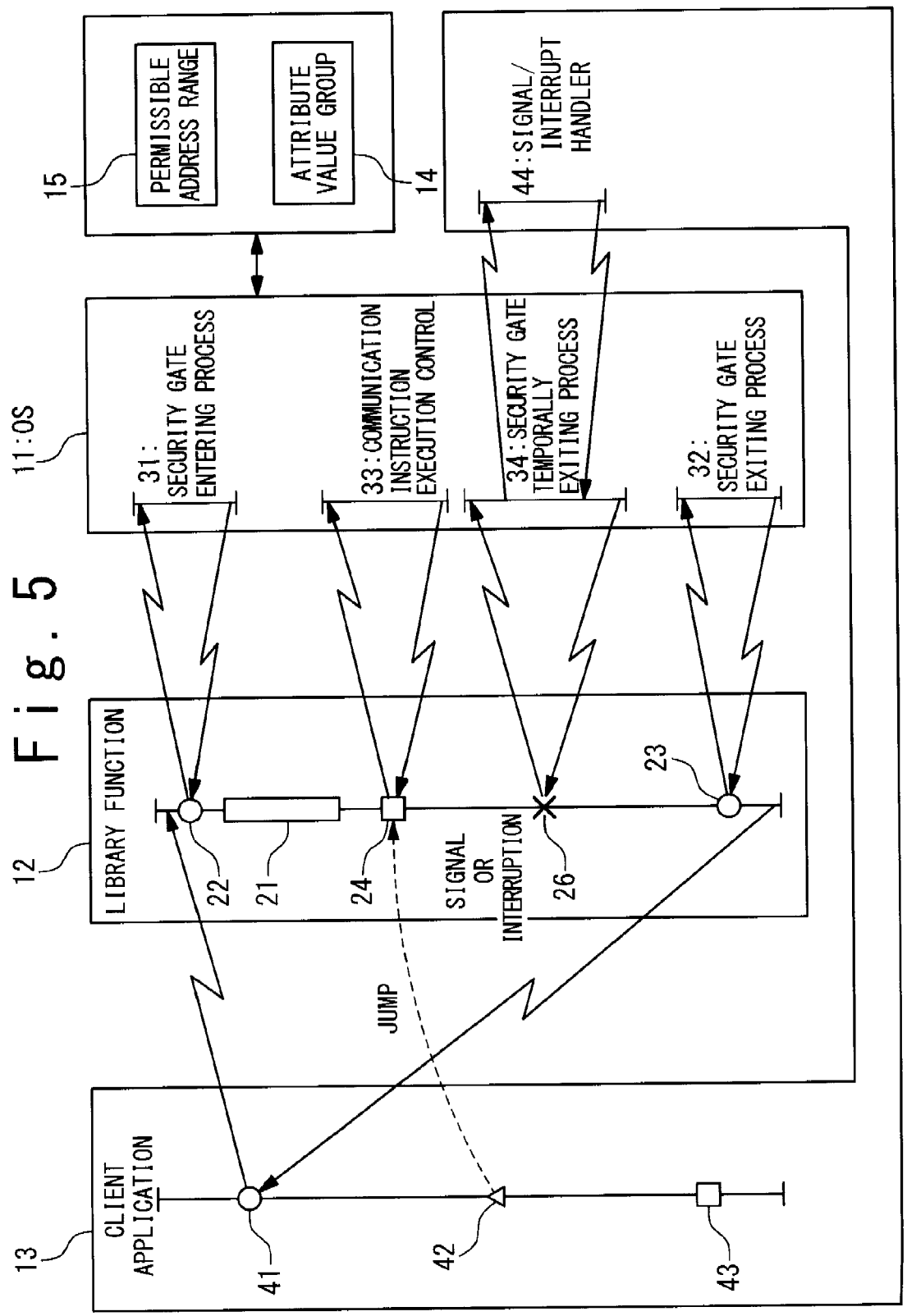
FIG. 5 is a block diagram of a communication terminal apparatus according to a third exemplary embodiment of the present invention.

FIG. 5 is a block diagram of a communication terminal apparatus according to a third exemplary embodiment of the present invention. Referring to FIG. 5, the communication terminal apparatus according to the third exemplary embodiment of the present invention is different from the first exemplary embodiment in that, when a signal or an interrupt 26 is generated during running of the client application 13 after changing the attribute value group 14 of the client application 13 by the security gate entering process 31 until returning the attribute value group 14 of the client application 13 to an original state by the security gate exiting process 32, the OS 11 executes a security gate temporary exiting process 34 for returning the attribute value group 14 of the client application 13 to a previous state which is not still changed by the security gate entering process 31 before calling the signal or an interrupt handler 44 of the client application 13 and returning the previous state to a value already changed the security gate entering process 31 when process by the signal and interrupt handler 44 is completed.

An operation of the communication terminal apparatus of the present exemplary embodiment will be described mainly with respect to different points thereof from the communication terminal apparatus of the first exemplary embodiment next.

When the client application 13 calls the library function 12 based on the call instruction 41, the first specific instruction 22 arranged in its head portion is executed first, and the attribute value group 14 of the client application 13 is changed by the security gate entering process 31 of the OS 11. Also, when the communication instruction 24 is executed by the client application 13 after the process 21 is executed prior to communication with the communication target, permission of execution of the communication instruction 24 is determined based on the attribute value group 14 of the client application 13 by the communication instruction execution control 33 of the OS 11. If the execution is permitted, the communication instruction 24 is executed and the control flow is returned to the call source. After that, when the signal or the interrupt 26 is generated, an internal interrupt is generated and the control flow shifts to the OS 11. Also, the security gate temporary exiting process 34 is executed, and the signal and interrupt handler 44 of the client application 13 is called after the attribute value group 14 of the client application 13 is returned to a previous state which has been changed by the security gate entering process 31. When a process by the signal and interrupt handler 44 is completed, the control flow is returned to the security gate temporary exiting process 34 of the OS 11, and the control flow is returned to a portion interrupted by the signal or interrupt 26 of the library function 12 after the attribute value group 14 of the client application 13 is returned to the state already changed by the security gate entering process 31. Then, when the process of the library function 12 progresses and the second specific instruction 23 is executed immediately before returning to the call source, the attribute value group 14 of the client application 13 is returned to a state before the security gate entry by the security gate exiting process 32 of the OS 11.

Operations when the client application 13 executes the instruction 42 for directly jumping to the communication instruction 24 of the library function 12 and when the client application 13 executed the communication instruction 43 are the same as that of the first exemplary embodiment.

According to the communication terminal apparatus of the present exemplary embodiment, an illegal use of the communication instructions 24 and 43 and the library function 12 by the client application 13 can be prevented more certainly, compared to the communication terminal apparatus of the first exemplary embodiment.

(Hardware Configuration)

An example of the server terminal apparatus of the present invention has a same configuration as that of the communication terminal apparatus shown in FIG. 1 or the configuration in which the display section 4 and the input operation section 5 are omitted from the configuration of FIG. 1. In this case, the OS executed by the CPU 1, fixed data and so on are stored in the ROM 2, and the server application executed by the CPU 1, operation data and so on are temporarily stored in the RAM 3. In addition, the file system 6 is composed of a hard disk and the like, in which the server application and various data are stored. The NIC 7 is for communicating with an external communication target by a wired or wireless communication. As an example of the communication terminal apparatus having such a hardware configuration, common computers such as a personal computer and a work station are exemplified.

First Exemplary Embodiment of Server Terminal Apparatus

Figure 6:
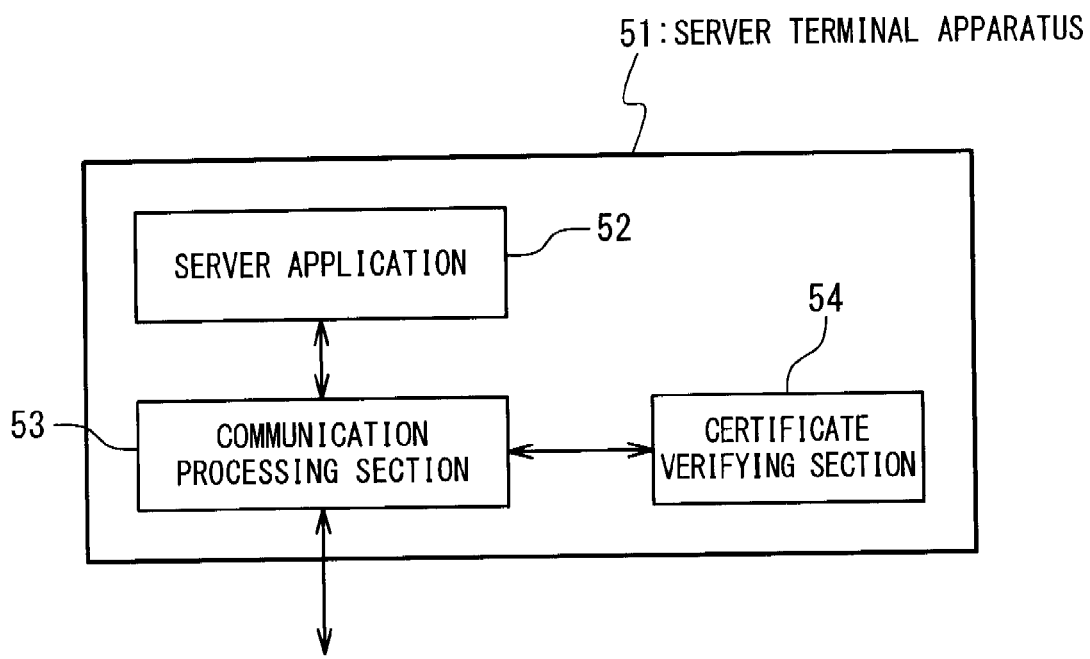
FIG. 6 is a block diagram of a server terminal apparatus according to the first exemplary embodiment of the present invention.

FIG. 6 is a block diagram of the server terminal apparatus according to the first exemplary embodiment of the present invention. Referring to FIG. 6, the server terminal apparatus according to the first exemplary embodiment of the present invention including a server application 52, a communication processing section 53, and a certificate verifying section 54.

The certificate verifying section 54 is a section for receiving a certificate (an electronic certificate), which is received from the communication target through the communication processing section 53, verifying whether or not the certificate is authorized, and informing the verification result to the communication processing section 53.

The communication processing section 53 is a section for communicating with the communication target by a wired or wireless communication via a network (not shown). When receiving a data and the certificate from the communication target, the communication processing section 53 transfers the certificate to the certificate verifying section 54 and receives the verification result, determines that the communication target has already executed a predetermined pre-process when obtaining the verification result showing that the certificate is authorized, and transmits the received data to the server application 52 with the certificate. When failing to obtain the verification result showing that the certificate is authorized, the communication processing section 53 determines that the communication target did not yet execute the predetermined pre-process and discards the received data with the certificate without transmitting to the server application 52.

The server application 52 receives data, which is received from the communication target through the communication processing section 53, and processes the data. As a result of the process, the server application 52 transmits data to the communication target via the communication processing section 53 when it is required to transmit some data to the communication target.

Next, an operation of the server terminal apparatus 51 of the present exemplary embodiment will be described.

Figure 7:
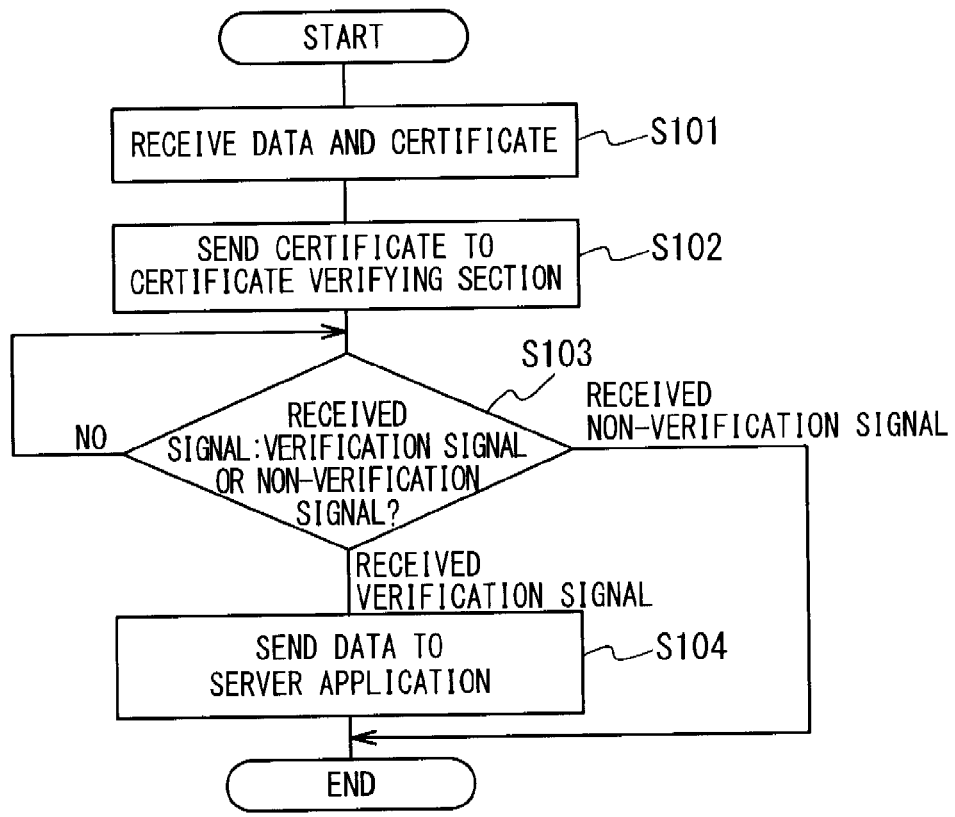
FIG. 7 is a flowchart showing a process example in a communication processing section of the server terminal apparatus in the first exemplary embodiment of the present invention.

When receiving the data and the certificate from the communication target (S101 in FIG. 7), the communication processing section 53 of the server terminal apparatus 51 transfers the certificate to the certificate verifying section 54 (S102), and waits until a certificate authentication signal or a certificate repudiation signal is received (S103).

Figure 8:
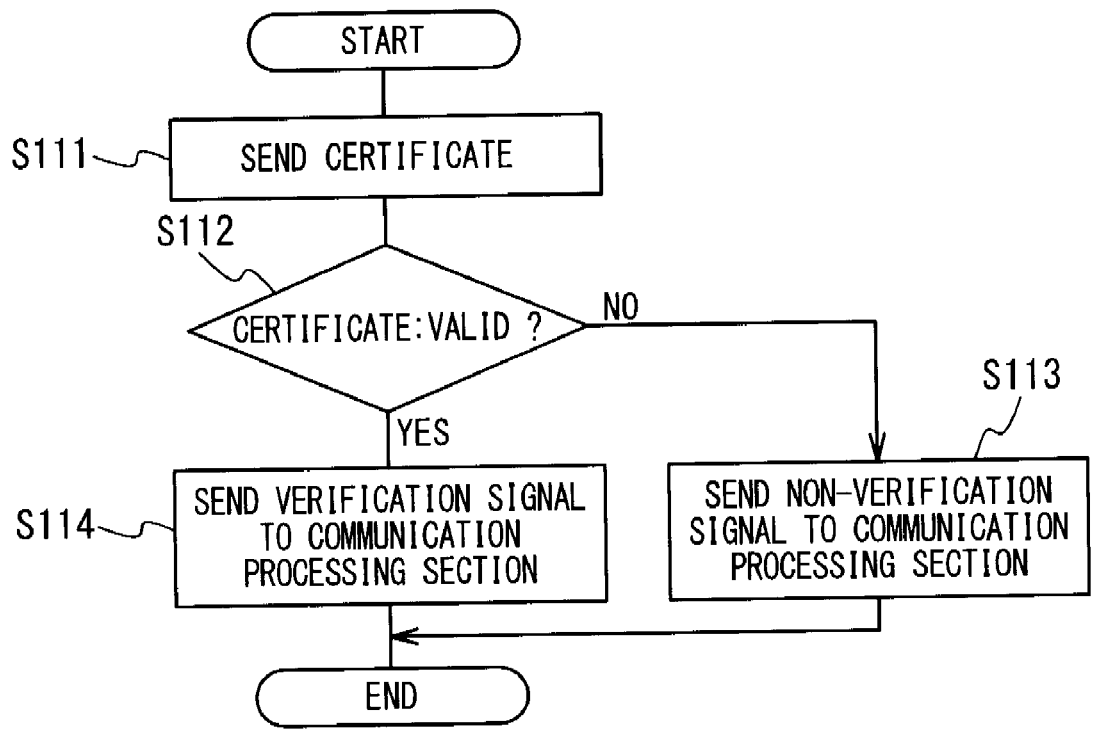
FIG. 8 is a flowchart showing a process example in a certificate verifying section of the server terminal apparatus in the first exemplary embodiment of the present invention.

When receiving the certificate (S111 in FIG. 8), the certificate verifying section 54 determines whether the certificate is valid or not (S112). The certificate verifying section 54 transmits the certificate repudiation signal to the communication processing section 53 (S113), when the certificate is not valid, and transmits the certificate authentication signal to the communication processing section 53 (S114) when the certificate is valid.

When receiving the certificate repudiation signal (S103), the communication processing section 53 ends the process. On the other hand, when receiving the certificate authentication signal (S103), the communication processing section 53 transmits data received from the communication target to the server application 52 (S104).

Figure 9:
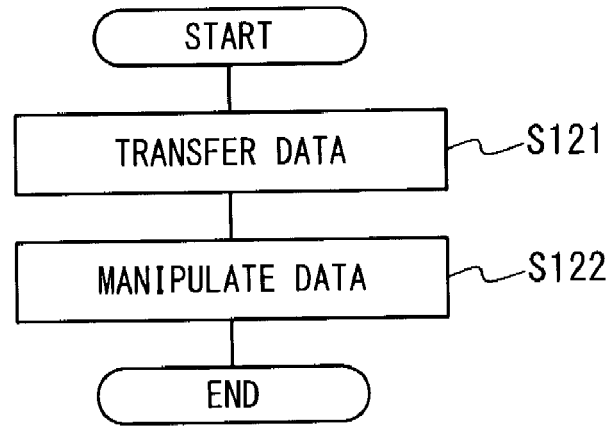
FIG. 9 is a flowchart showing a process example in a server application of the server terminal apparatus in the first exemplary embodiment of the present invention.

When the data is given from the communication processing section 53 (S121 in FIG. 9), the server application 52 processes the given data (S122).

As described above, according to the server terminal apparatus of the present exemplary embodiment, by processing the data received with the certificate in the server application 52 only when the received certificate is authenticated, the server terminal apparatus can determine whether or not it is a communication after the communication target has executed the necessary pre-process before prior to the communication and separates processes depending on the determination result.

Second Exemplary Embodiment of Server Terminal Apparatus

The server terminal apparatus according to the second exemplary embodiment of the present invention is different from the server terminal apparatus in the first exemplary embodiment in that the server terminal apparatus transmits a response about success or failure of communication to the communication target which has transmitted the data and the certificate.

The server terminal apparatus in the second exemplary embodiment is composed of the server application 52, the communication processing section 53, and the certificate verifying section 54 similar to the server terminal apparatus 51 of the first exemplary embodiment shown in FIG. 6. Of them, a process of the certificate verifying section 54 is the same as that of the first exemplary embodiment, and processes of the server application 52 and the communication processing section 53 are different from those of the first exemplary embodiment.

Next, an operation of the server terminal apparatus of the present exemplary embodiment will be described mainly with respect to different points thereof from the server terminal apparatus of the first exemplary embodiment.

Figure 10:
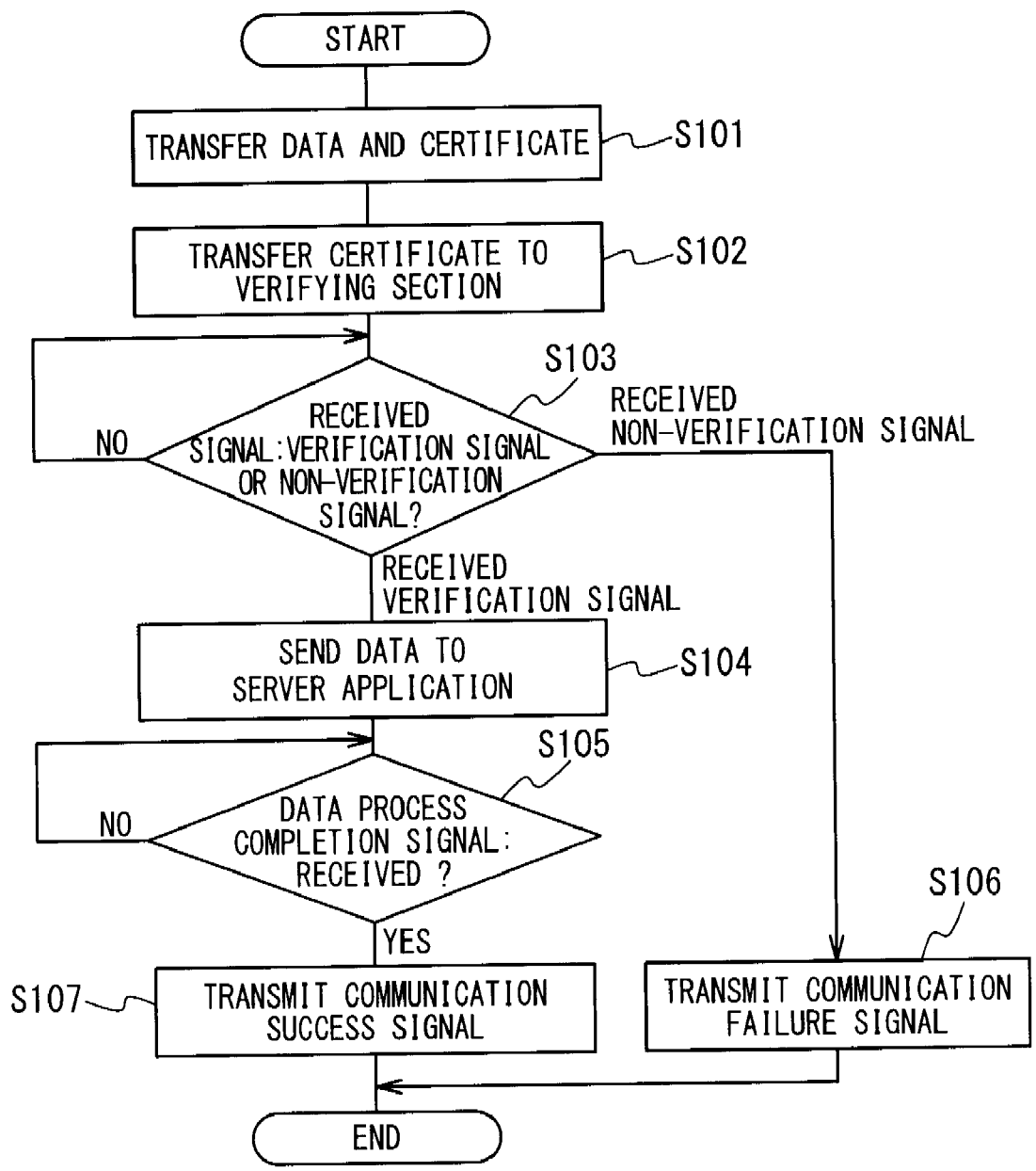
FIG. 10 is a flowchart showing a process example in the communication processing section of the server terminal apparatus in a second exemplary embodiment of the present invention.

When receiving the data and the certificate from the communication target (S101 in FIG. 10), the communication processing section 53 of the server terminal apparatus 51 transfers the certificate to the certificate verifying section 54 (S102), and waits until a certificate authentication signal or a certificate repudiation signal is received (S103). When receiving the certificate (S111 in FIG. 8), the certificate verifying section 54 determines whether the certificate is valid or not (S112), and the certificate verifying section 54 transmits the certificate repudiation signal to the communication processing section 53 (S113) when the certificate is not valid, and transmits the certificate authentication signal to the communication processing section 53 (S114) when the certificate is valid.

When receiving the certificate repudiation signal (S103), the communication processing section 53 transmits a communication failure signal to the communication target which has transmitted the data and the certificate (S106). On the other hand, when receiving the certificate authentication signal (S103), the communication processing section 53 transmits the data received from the communication target to the server application 52 (S104).

Figure 11:
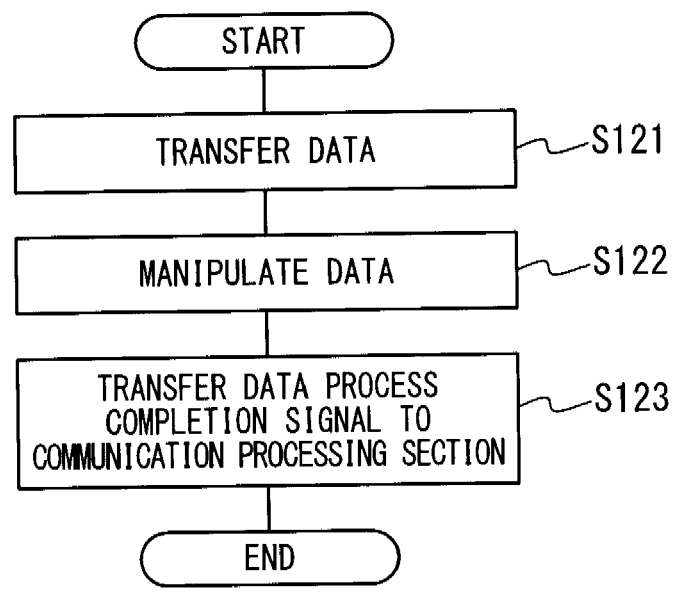
FIG. 11 is a flowchart showing a process example in a server application of the server terminal apparatus in the second exemplary embodiment of the present invention.

When the data is given from the communication processing section 53 (S121 in FIG. 11), the server application 52 processes the given data (S122) and transfers a data process completion signal to the communication processing section 53 (S123). When receiving the data process completion signal (S105), the communication processing section 53 transmits a communication success signal to the communication target which has transmitted the data and the certificate (S107).

As described above, according to the server terminal apparatus of the present exemplary embodiment, by processing the data received with the certificate in the server application 52 only when the received certificate is authenticated, the server terminal apparatus can determine whether or not a necessary pre-process for the communication target has been executed prior to the communication and separate processes depending on the determination result.

In addition, according to the server terminal apparatus of the present exemplary embodiment, since a communication failure signal when the certificate is not valid and a communication success signal when the certificate is valid and the process by the server application is completed are send to the communication target which has transmitted the data and the certificate. The communication target can recognize whether or not the data could be transmitted to the server application based on the communication failure signal or the communication success signal, and a client application on the communication target side can execute a process when the data could be transmitted to the server application and a process when the data could not be transmitted to the server application.

Third Exemplary Embodiment of Server Terminal Apparatus

Figure 12:
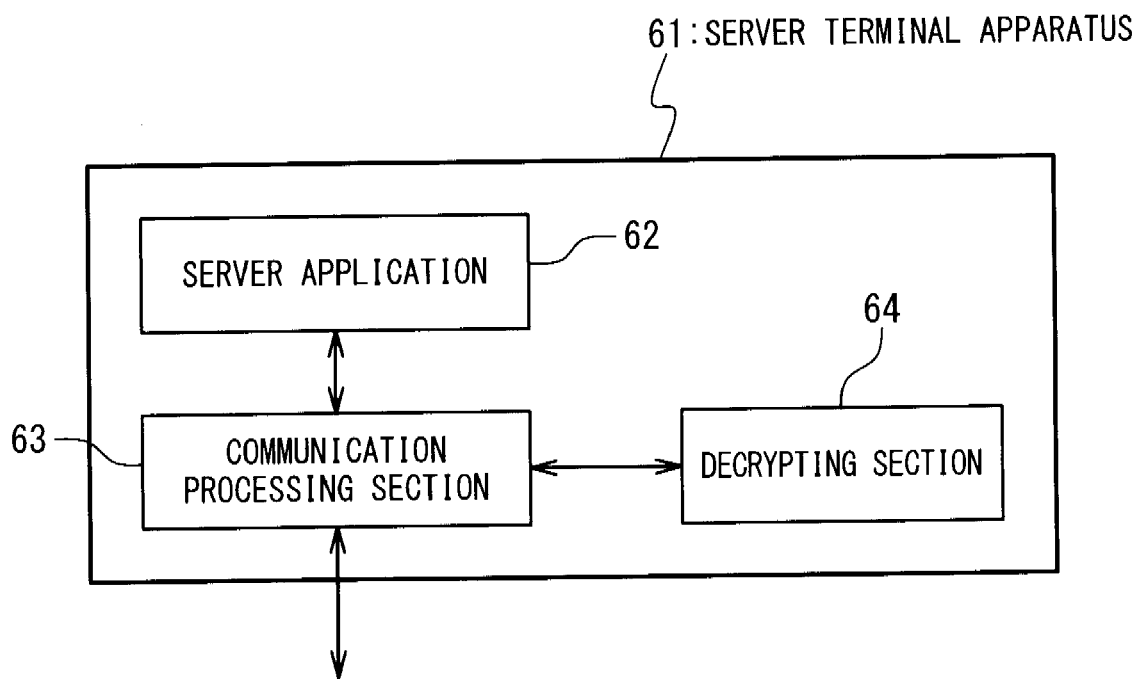
FIG. 12 is a block diagram of the server terminal apparatus according to a third exemplary embodiment of the present invention.

Referring to FIG. 12, the server terminal apparatus according to the third exemplary embodiment of the present invention includes a server application 62, a communication processing section 63, and a decrypting section 64.

The decrypting section 64 receives an encrypted data, which is received from the communication target through the communication processing section 63, decrypts the data by using a public key of the server terminal apparatus 61 itself, and informs the result thereof to the communication processing section 63.

When receiving the encrypted data from the communication target via a network (not shown), the communication processing section 63 transfers the encrypted data to the decrypting section 64, receives a result thereof, determines that the communication target has already executed a predetermined pre-process when the decrypted data has been obtained, and transmits the decrypted data to the server application 62. When failing to decrypt the data, the communication processing section 63 determines that the communication target did not execute the predetermined pre-process and ends the process.

The server application 62 receives the decrypted data from the communication processing section 63 and processes the data. As a result of the process, the server application 62 transmits a data to the communication target via the communication processing section 63 when it is required to transmit some data to the communication target.

Next, an operation of the server terminal apparatus 61 of the present exemplary embodiment will be described.

Figure 13:
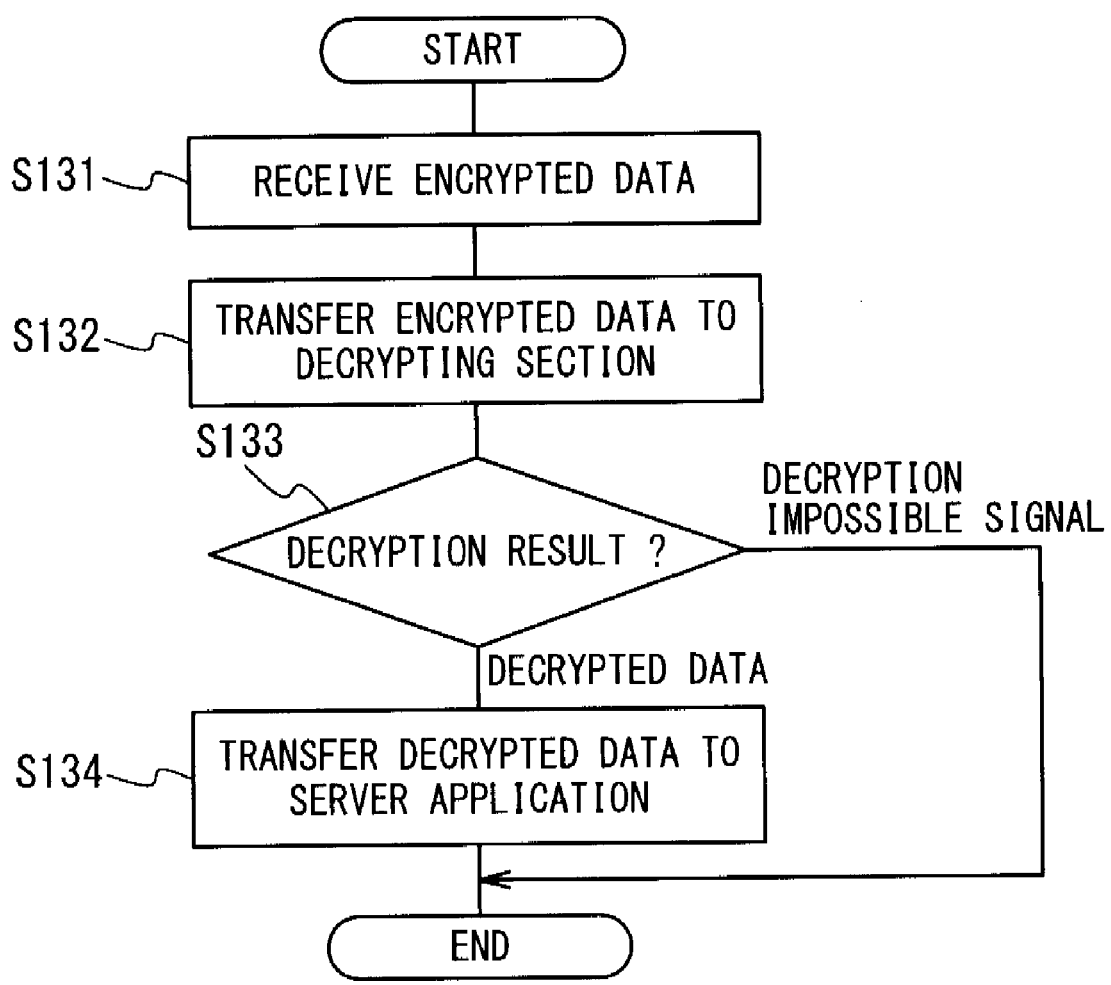
FIG. 13 is a flowchart showing a process example in the communication processing section of the server terminal apparatus in the third exemplary embodiment of the present invention.

When receiving the encrypted data from the communication target (S131 in FIG. 13), the communication processing section 63 of the server terminal apparatus 61 transfers the encrypted data to the decrypting section 64 (S132), and waits a decryption result thereof (S133).

Figure 14:
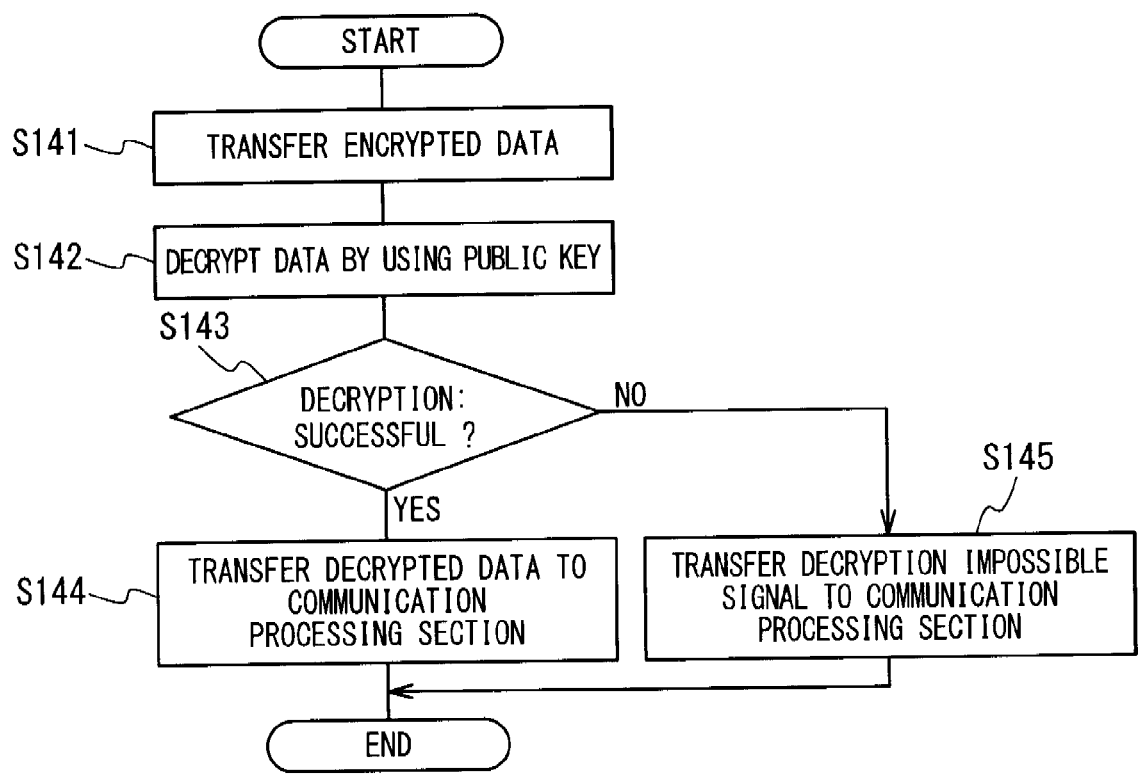
FIG. 14 is a flowchart showing a process example in a decrypting section of the server terminal apparatus in the third exemplary embodiment of the present invention.

When receiving the encrypted data (S141 in FIG. 14), the decrypting section 64 decrypts the encrypted data by using the public key of the server terminal apparatus 61 itself (S142). When succeeding the decryption (YES in S143), the decrypting section 64 transfers the decrypted data to the communication processing section 63 (S144). When failing to the decryption (NO in S143), the decrypting section 64 transfers a decryption impossibility signal to the communication processing section 63 (S145).

When receiving the decryption impossibility signal (S133), the communication processing section 63 ends the process. On the other hand, when receiving the decrypted data (S133), the communication processing section 53 transmits the decrypted data to the server application 62 (S134). The server application 62 processes the data transferred from the communication processing section 63.

As described above, according to the server terminal apparatus of the present exemplary embodiment, by processing the decrypted data in the server application 62 only when the received encrypted data could be decrypted by using the public key of the server terminal apparatus itself, the server terminal apparatus can determine whether or not the necessary pre-process for the communication target has been executed prior to the communication and separate processes depending on the determination result.

Referring to drawings, a communication system having the communication terminal apparatus and the server terminal apparatus according to the exemplary embodiment of the present invention will be described below in detail.

First Exemplary Embodiment of Communication System

Figure 15:
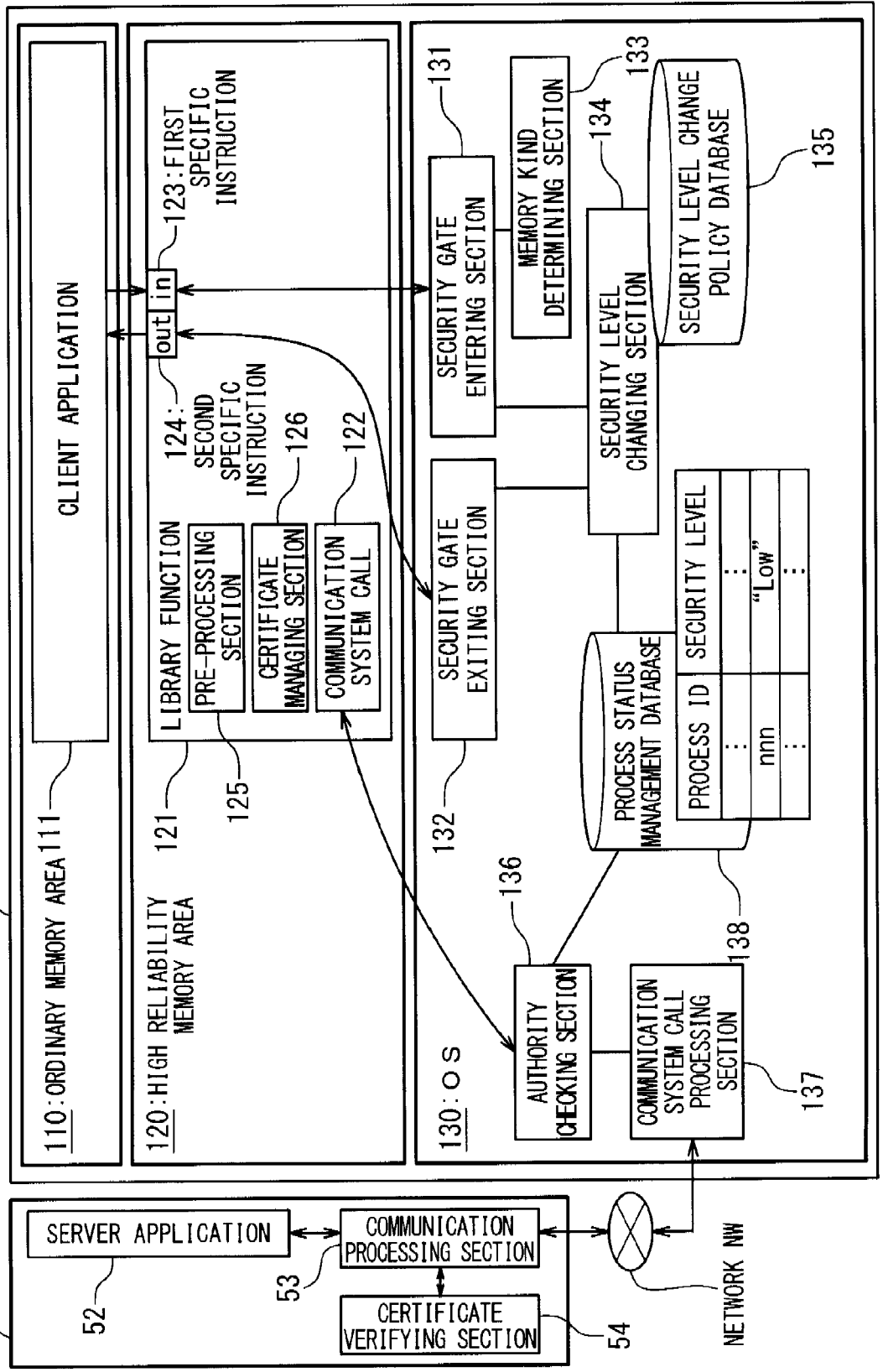
FIG. 15 is a block diagram of a communication system according to the first exemplary embodiment of the present invention.

Referring to FIG. 15, in the communication system of the first exemplary embodiment of the present invention, a communication terminal apparatus 100 operating as a client terminal and a server terminal apparatus 51 operating as a server terminal are connected communicably to each other via a network NW such as the internet.

The communication terminal apparatus 100 is composed of a computer operating under a program control, and includes an ordinary memory area 110 and a high reliability memory area 120. In addition, an OS 130 that is a basic program operates. Although the OS 130 is Linux, for example, other types of OS may be used.

A client application 111 is arranged in the ordinary memory area 110. The ordinary memory area 110 is realized by RAM and the like and is used by the client application 111 freely.

The client application 111 is assumed to be a program which is not included at shipping of a product and loaded after the shipping and whose reliability is unclear. The client application 111 is generally loaded from a nonvolatile storage such as a file system into the ordinary memory area 110 by the OS 130 and is executed as an application process.

A reliable library function 121 is arranged in the high reliability memory area 120. The high reliability memory area 120 is a memory area with high reliability in which there is a low possibility that a stored data is altered, unlike the ordinary memory area 110. A most general method for realizing the memory area is use of a ROM, but the use of the RAM may be allowed which is set not to be easily altered by the application process under management of the OS 130, that is, a RAM may be allowed which is allocated as a memory space to which authority of a write operation from the application program is not permitted. In this case, the library function 121 is arranged in the high reliability memory area 120 by loading from the ROM or a file system by the OS 130. In the Linux, for example, since a memory space where program codes are stored is set as a write inhibition space, such a memory space is concerned.

The library function 121 provides a function of communication with the server application 52 of the server terminal apparatus 51 for the client application 111. In the present exemplary embodiment, a first specific instruction 123 and a second specific instruction 124 are arranged in the library function 121. In addition, the library function 121 includes a communication system call 122, a pre-processing section 125, and a certificate managing section 126.

The first specific instruction 123 is implemented as a specific system call instruction and arranged in a head portion of process of the library function 121. When the client application 111 calls first specific instruction 123, an internal interruption is generated and a security gate entering section 131 of the OS 130 is called.

The second specific instruction 124 is also implemented as a specific system call instruction and arranged in an end portion of process of the library function 121. When the client application 111 calls the second specific instruction 124, an internal interruption is generated and a security gate exiting section 132 of the OS 130 is called.

The communication system call 122 is a socket communication system call and the like and is used when the client application 111 communicates with the server application 52 of the server terminal apparatus 51. The communication system call 122 is a privileged instruction to which an execution authority is not given in a security level of the client application 111 whose reliability is unapparent. When the client application 111 calls the communication system call 122, an internal interruption is generated and an authority checking section 136 in the OS 130 is called. The security level of the client application 111 has two levels of "Low" (non-privilege level) and "High" (privilege level) in the present exemplary embodiment. Of course, the present invention is also applicable to a computer having three or more levels and a terminal having a security of four levels of an apparatus manufacturer level, a communication carrier level, a reliable application vendor level, and a level of unapparent reliability, such as a certain type of mobile phone.

The pre-processing section 125 is composed of an instruction sequence for executing a predetermined process to be executed before the client application 111 communicates with the server application 52.

The certificate managing section 126 is composed of an instruction sequence which is executed after a process of the pre-processing section 125 and adds a certificate of execution of the pre-process to a transmission data of the client application 111.

The OS 130 is provided with a security gate entering section 131, a security gate exiting section 132, a memory kind determining section 133, a security level changing section 134, a security level change policy database 135, an authority checking section 136, a communication system call processing section 137, and a process status management database 138.

The security gate entering section 131 determines whether or not the first specific instruction 123 is normally executed based on a result of the security level changing section 134, and changes a security level of the application process to be a higher level by using the security level changing section 134 when the instruction has been normally executed. On the other hand, the security level is not changed when the first specific instruction 123 has been executed illegally.

The memory kind determining section 133 determines whether or not the first specific instruction 123 to be executed is in the high reliability memory area 120. Specifically, an address range of the high reliability memory area 120 is retained as a permissible address range. An address of the first specific instruction 123 to be executed is compared to the permissible address range, and it is determined that the address is in the high reliability memory area 120 if the address of the first specific instruction 123 is in the permissible address range. Otherwise, the address is in the ordinary memory area 110. In addition, the memory kind determining section 133 may further confirm that the memory address, in which the first specific instruction exists and which is confirmed as a high reliability memory area, is a program code area and is not a data area, by referring to data managed by the OS 130. Thus, an error in determination caused by accidental coincidence of pattern of a data area can be prevented.

Setting of the permissible address range described above is performed according to the following way a) or b).

a) When the high reliability memory area 120 is a ROM area, an address range of the ROM area is set as a permissible address range.

b) In case of a computer executing the reliable library function 121 existing in a file system or a ROM after loading the library function 121, the loaded memory address range is set as a permissible address range. Determination of whether or not the library function 121 to be loaded is reliable may use one of a method of previously retaining a data indicating whether or not the file system and the ROM itself is reliable and referring to the data, a method of previously retaining a list of reliable library functions, and referring to the list, a method of previously adding a mark (such as a signature) to reliable library functions itself and confirming the mark on the loading, and so on.

The security gate exiting process 132 returns the security level of the client application to its original state by using the security level changing section 134.

The process status management database 138 retains a combination of a process ID used for uniquely identifying a process of the client application and the security level.

In change the security level of the client application in response to a request by the security gate entering process 131, the security level changing section 134 changes a portion indicating the security level of the client application of the process status management database 138. At this time, the data before the change is retained in the process status management database 138 so that the security level can be returned to a previous state.

Here, by including the security level change policy database 135 retaining a change rule, the security level changing section 134 may change the security level of the client application on the basis of the change rule retained in the database 135. If a change rule describing the security level to be improved depending on a type, a background, and a previous security level of a client application and a change rule describing the security level to be improved depending on a condition of a apparatus (a computer) are used, more flexible change of the security level can be realized.

In addition, the security level changing section 134 performs a process for returning the security level of the client application to a previous state in response to a request by the security gate exiting process 132.

The authority checking section 136 determines whether or not the communication system call 122 required to the OS 130 has an authority to operate in a present security level of the client application 111 as a system call source, by referring to a data of the process status management database 138, and executes a process by using the communication system call processing section 137 when having the authority. When having no authority, it results in an error without executing the required communication system call 122.

The communication system call processing section 137 executes the required process of the communication system call 122.

On the other hand, the server terminal apparatus 51 is a server terminal apparatus of the first exemplary embodiment shown in FIG. 6, and includes the server application 52, the communication processing section 53, and the certificate verifying section 54.

Next, referring to FIG. 15 and FIGS. 16 to 18, an operation of the present exemplary embodiment will be described in detail.

An operation of the communication terminal apparatus 100 will be explained first. The client application 111 is loaded in the ordinary memory area 110 by the OS 130, and is executed as an application process (process ID=nnn). At this time, the client application 111 is not clear in its reliability and operates in a "Low" security level. When transmitting a data to the server application 52 of the server terminal apparatus 51, the client application 111 calls the library function 121. When being called, the library function 121 first executes the first specific instruction 123 arranged in a head portion of the function (S201 in FIG. 16).

When the first specific instruction 123 is executed, the security gate entering process 131 existing in the OS 130 is called. The security gate entering section 131 obtains a kind of the memory area in which the first specific instruction 123 as a cause of the calling exists by using the memory kind determining section 133 (S202). Only when the obtained kind of the memory area is the high reliability memory area 120, the security level of the client application 111 is changed to a higher security level by using the security level changing section 134 (S203 and S204). According to this, a data of the security level of a process of the client application 111 existing in the process status management database 138 is changed from a "Low" level to a "High" level, for example. When the security level of the client application 111 has been changed, a process of the first specific instruction 123 is completed (step S205). When the kind of the memory area is not the high reliability memory area 120 at step S203, the process of the first specific instruction 123 is completed without changing the security level of the client application 111 (S205).

Subsequently, the client application 111 executes a program provided by the library function 121. In this process, the pre-processing section 125, the certificate managing section 126, and the communication system call 122 are executed in this order.

The pre-processing section 125 executes a predetermined process before communicating with the server application 52 of the server terminal apparatus 51. In addition, the certificate managing section 126 executes a process of adding a certificate verifying execution of a pre-process to a transmission data of the client application 111. It should be noted that when functions of the OS 130 are required in the execution of the pre-processing section 125 and the certificate managing section 126, various types of the functions of the OS 130 are arbitrarily utilized.

When the communication system call 122 is executed (S211 in FIG. 17), the authority checking section 136 in the OS 130 is called. Referring to the security level of the client application 111 existing in the process status management database 138, the authority checking section 136 executes a communication process by using the communication system call processing section 137 when the security level is in the "High" security level (S212 to S214). According to this, the transmission data of the client application 111 and the certificate added in the certificate managing section 126 are transmitted to the communication processing section 53 of the server terminal apparatus 51 through the network NW. On the other hand, when the security level of the client application 111 is in the "Low" security level, the authority checking section 136 returns a privilege mode error without executing the communication process (step S215) and ends the process (step S214).

Figure 18:
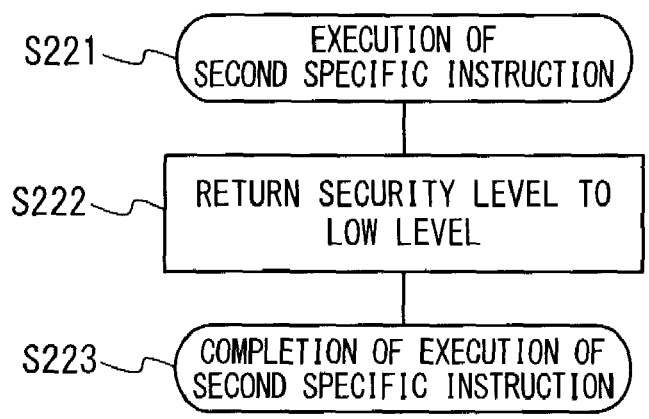
FIG. 18 is a flowchart showing a process example in a security gate exiting section of the communication system in the first exemplary embodiment of the present invention.

After that, the process of the library function 121 by the client application 111 is completed, and the second specific instruction 124 is executed immediately before returning to the client application 111 (step S221 in FIG. 18).

When the second specific instruction 124 is executed, the security gate exiting process 132 existing in the OS 130 is called. The security gate exiting process 132 returns the security level of the client application 111 to the previous security level by using the security level changing section 134 (S222), and ends the process (S223). Here, a data of the security level of the client application 111 existing in the process status management database 138 is returned to the "Low" security level.

Next, an operation of the server terminal apparatus 51 will be explained. When receiving data and a certificate from the communication terminal apparatus 100 (S101 in FIG. 7), the communication processing section 53 of the server terminal apparatus 51 transfers the certificate to the certificate verifying section 54. The certificate verifying section 54 determines whether or not the transferred certificate is authorized (S111 and S112 in FIG. 8), and transmits a certificate repudiation signal to the communication processing section 53 if unauthorized (S113), and transmits a certificate authentication signal if authorized (S114).

The communication processing section 53 ends the process when receiving the certificate repudiation signal from the certificate verifying section 54, and transmits the data received from the communication target to the server application 52 when receiving the certificate authentication signal (S103 and S104). The server application 52 processes the data transferred from the communication processing section 53 (S121 and S122 in FIG. 9).

According to the present exemplary embodiment, when the client application 110 communicates with the server application 52, execution of necessary pre-process before the communication can be guaranteed within the communication terminal apparatus 100. This is because an illegal use of the communication system call 122 and the library function 121 by the client application 111 in the communication terminal apparatus 100 cannot be allowed, communication with the server terminal apparatus 51 cannot be realized if the library function 121 is not correctly used, and the pre-process 125 is necessarily executed prior to the communication if the library function 121 is correctly used.

Moreover, on the side of the server terminal apparatus 51, whether or not the necessary pre-process has been executed before the communication can be determined according to the present exemplary embodiment. This is because the client application 111 in the communication terminal apparatus 100 is not able to communicate with the server terminal apparatus 51 without correctly using the library function 121, and when the library function 121 is correctly used, the pre-processing section 125 and the certificate managing section 126 are necessarily executed prior to the communication. Therefore, whether or not the necessary pre-process has been executed before the communication can be determined by verifying whether or not the received certificate is authorized in the server terminal apparatus 51. Only when it is determined that the certificate is authorized, a process can be selectively separated depending on a determination result by processing data received with the certificate in the server application 52.

It should be noted that in the present exemplary embodiment, the server terminal apparatus of the first exemplary embodiment above described is used as the server terminal apparatus 51. However, the server terminal apparatus of the second exemplary embodiment may be used. In such a case, a communication failure signal or a communication success signal transmitted from the communication processing section 53 is received by the communication terminal apparatus 100 via the network NW and finally transmitted to the client application 111. According to this, the client application 111 can selectively separate processes depending on success and failure of a communication.

Application Example 1

Next, an application example of the communication system according to the present exemplary embodiment will be described. The present application example includes a Linux terminal as the communication terminal apparatus 100 and includes a personal computer as the server terminal apparatus 51.

The server application 52 of the server terminal apparatus 51 as the personal computer includes a function for distributing game contents, and communicates with the communication terminal apparatus 100 by using a Security Socket Layer (SSL). The client application 111 of the communication terminal apparatus 100 as the Linux terminal has a function of downloading the game contents distributed by the server application 52. The communication terminal apparatus 100 has functions of an IC card storing electronic money data, and the pre-processing section 125 of the library function 121 executed in a XIP manner in a ROM area has a function of executing a charging process through the IC card. An operation when the client application 111 transmits a download request to the server application 52 and tries to download the game contents will be described.

Figure 16:
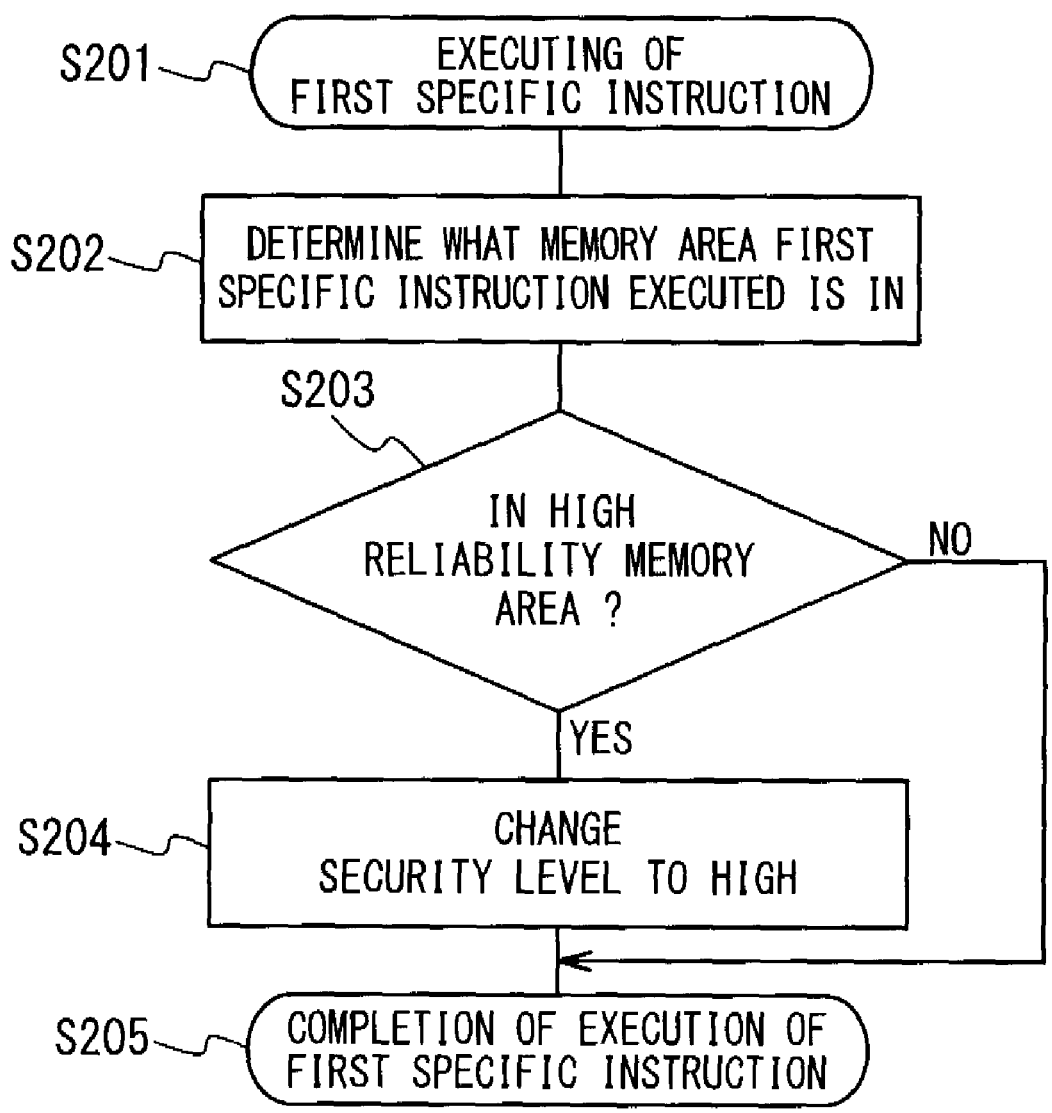
FIG. 16 is a flowchart showing a process example in a security gate entering section of the communication system in the first exemplary embodiment of the present invention.
Figure 17:
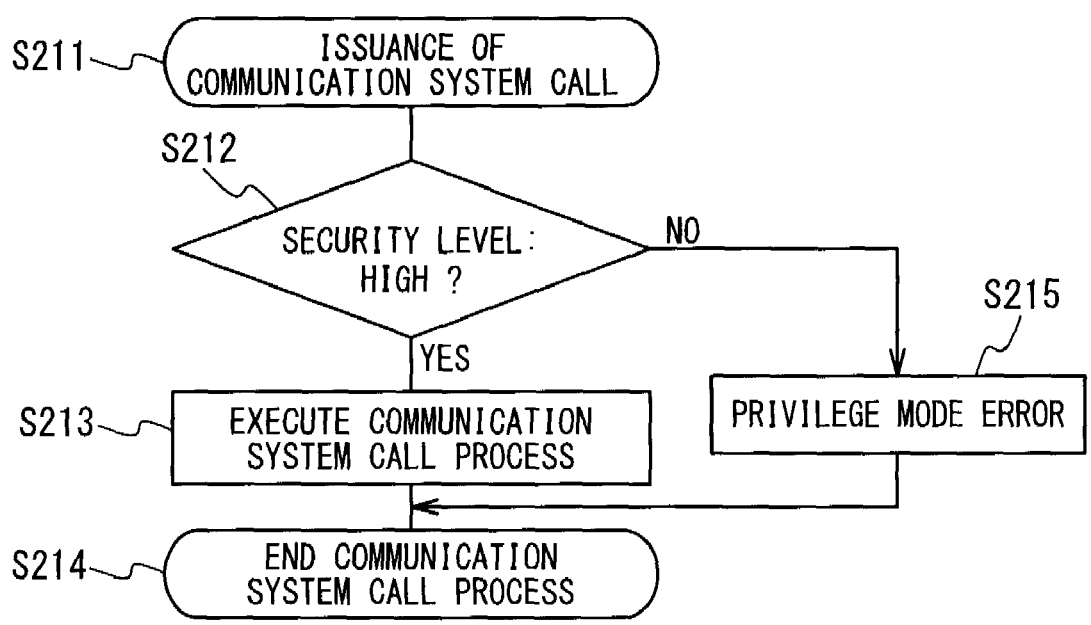
FIG. 17 is a flowchart showing a process example in an authority checking section of the communication system in the first exemplary embodiment of the present invention.

When the client application 111 transfers the download request and calls the library function 121 in the communication terminal apparatus 100, the library function 121 first executes the first specific instruction 123 (S201 in FIG. 16). Thus, the security gate entering section 131 existing in the OS 130 is called, and the security level of the client application 111 is changed into the "High" security level by using the security level changing section 134 only when the kind of the memory area in which the first specific instruction 123 exists is the high reliability memory area 120. Next, the pre-processing section 125 refers to the IC card to charge a fee on the download of game contents, and updates the electronic money data stored therein. Next, the certificate managing section 126 adds the certificate verifying that the pre-process has been executed, to the download request. Subsequently, when the communication system call 122 is executed, the authority checking section 136 in the OS 130 is called and a communication process is executed by using the communication system call processing section 137 since the security level of the client application 111 is in the "High" security level. Thus, the download request of the client application 111 and the certificate added by the certificate managing section 126 are transmitted to the communication processing section 53 of the server terminal apparatus 51 by using the SSL.

When receiving the download request from the communication terminal apparatus 100, the communication processing section 53 of the server terminal apparatus 51 transfers the certificate to the certificate verifying section 54, and the certificate verifying section 54 determines whether the transferred certificate is authorized or unauthorized and returns the determination result to the communication processing section 53. Only when receiving the certificate authentication signal from the certificate verifying section 54, the communication processing section 53 transmits the download request received from the communication terminal apparatus 100 to the server application 52. The server application 52 processes the download request and distributes the game contents to the client application 111 of the communication terminal apparatus 100.

According to this application example 1, the game contents can be downloaded only when the charging process is adequately executed via the library function 121 in the communication terminal apparatus 100, and the load of the server terminal apparatus 51 can be reduced, compared to the technique in the related art which executes the charging process on the server terminal apparatus 51 side.

A download service of the game contents is described in the application example 1 mentioned above. However, it can be also applied to a reproduction service of music data. In addition, the charging process is mentioned as the pre-process. However, it may be other types of processes such as a DRM (Digital Rights Management) that is a rights management process for reproduced music data.

Second Exemplary Embodiment of Communication System

Figure 19:
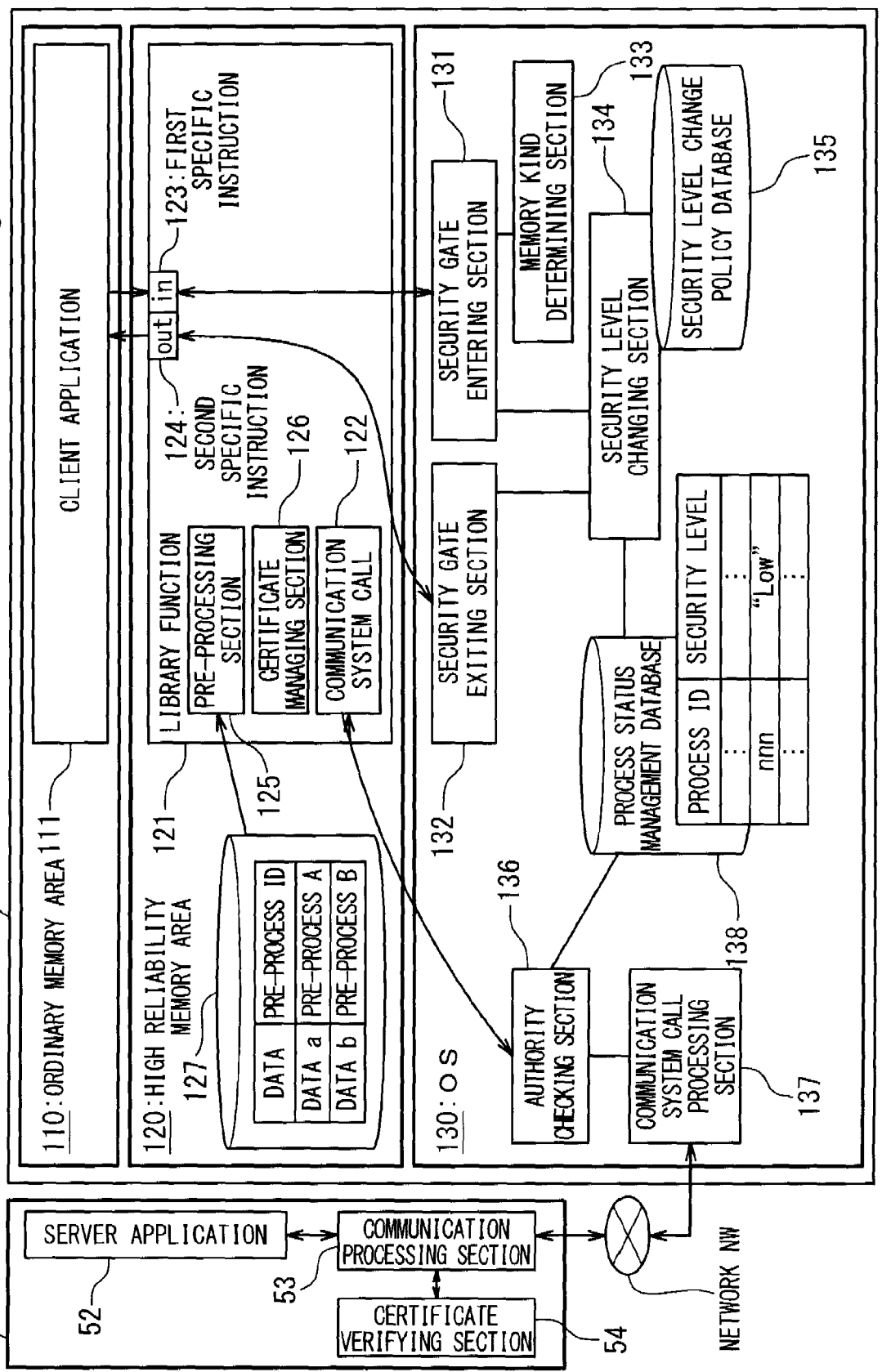
FIG. 19 is a block diagram of the communication system according to the second exemplary embodiment of the present invention.

Referring to FIG. 19, the communication system according to a second exemplary embodiment of the present invention is different from the first exemplary embodiment shown in FIG. 15 in that a pre-process storage section 127 is provided to retain correspondence relation between data and a pre-process identifier in the high reliability memory area 120 of the communication terminal apparatus 100 and that the pre-processing section 125 of the library function 121 searches the pre-process identifier corresponding to the same data as transmission data of the client application 111 from the pre-process storage section 127 and executes a pre-process uniquely identified by the searched pre-process identifier.

Next, an operation of the communication system of the present exemplary embodiment will be described.

The communication system of the present exemplary embodiment is different from the communication system of the first exemplary embodiment in only the operation of the pre-processing section 125 in the library function 121 of the communication terminal apparatus 100. When the transmission data is transferred from the client application 111 to the library function 121 and the library function 121 is called and progresses to a process by the pre-processing section 125 after the first specific instruction 123 is executed, the pre-processing section 125 obtains a pre-process identifier corresponding to the transmission data by referring to the pre-process storage section 127. The pre-process corresponding to the obtained pre-process identifier is executed to progress to a process by the certificate managing section 126.

Next, advantages of the present exemplary embodiment will be described.

According to the present exemplary embodiment, a same effect as the communication system of the first exemplary embodiment can be attained and the pre-process can be changed in accordance with the transmission data to the server application 52 by the client application 111 by providing the pre-process storage section 123.

Application Example 2

Next, an application example of the communication system according to the present exemplary embodiment will be described.

The present application example includes a Linux terminal as the communication terminal apparatus 100 and a personal computer as the server terminal apparatus 51.

The server application 52 of the server terminal apparatus 51 as the personal computer has a function of distributing a plurality of game contents of different prices and communicates with the communication terminal apparatus 100 by using the SSL. The client application 111 of the communication terminal apparatus 100 as the Linux terminal has a function of downloading the game contents distributed by the server application 52. The pre-process storage section 127 stores a price data for the game contents to be downloaded. The communication terminal apparatus 100 has functions of an IC card storing electronic money data, and the pre-processing section 125 of the library function 121 executed in a XIP manner in a ROM area has a function of executing the charging process based on the downloaded game contents through the IC card by referring to the pre-process storage section 127. An operation when the client application 111 transmits a download request to the server application 52 and tries to download the game contents will be described.

When the client application 111 calls the library function 121 by using the download request as an argument, the library function 121 first executes the first specific instruction 123 (S201 in FIG. 201). Thus, the security gate entering section 131 existing in the OS 130 is called, and the security level of the client application 111 is changed into the "High" security level by using the security level changing section 134 only when the kind of the memory area in which the first specific instruction 123 exists is the high reliability memory area 120. Next, the pre-processing section 125 refers to the price data corresponding to the game contents included in the download request to charge a fee on the download of the game contents, and updates the electronic money data stored in an IC card for the price data. The same process as that of the application example 1 described above is executed subsequently.

According to this application example 2, the game contents can be downloaded only when the charging process for an adequate price is performed via the library function 121 in the communication terminal apparatus 100, and load of the server terminal apparatus 51 can be reduced, compared to the technique in the related art of performing the charging process on the server terminal apparatus 51 side.

Third Exemplary Embodiment of Communication System

Figure 20:
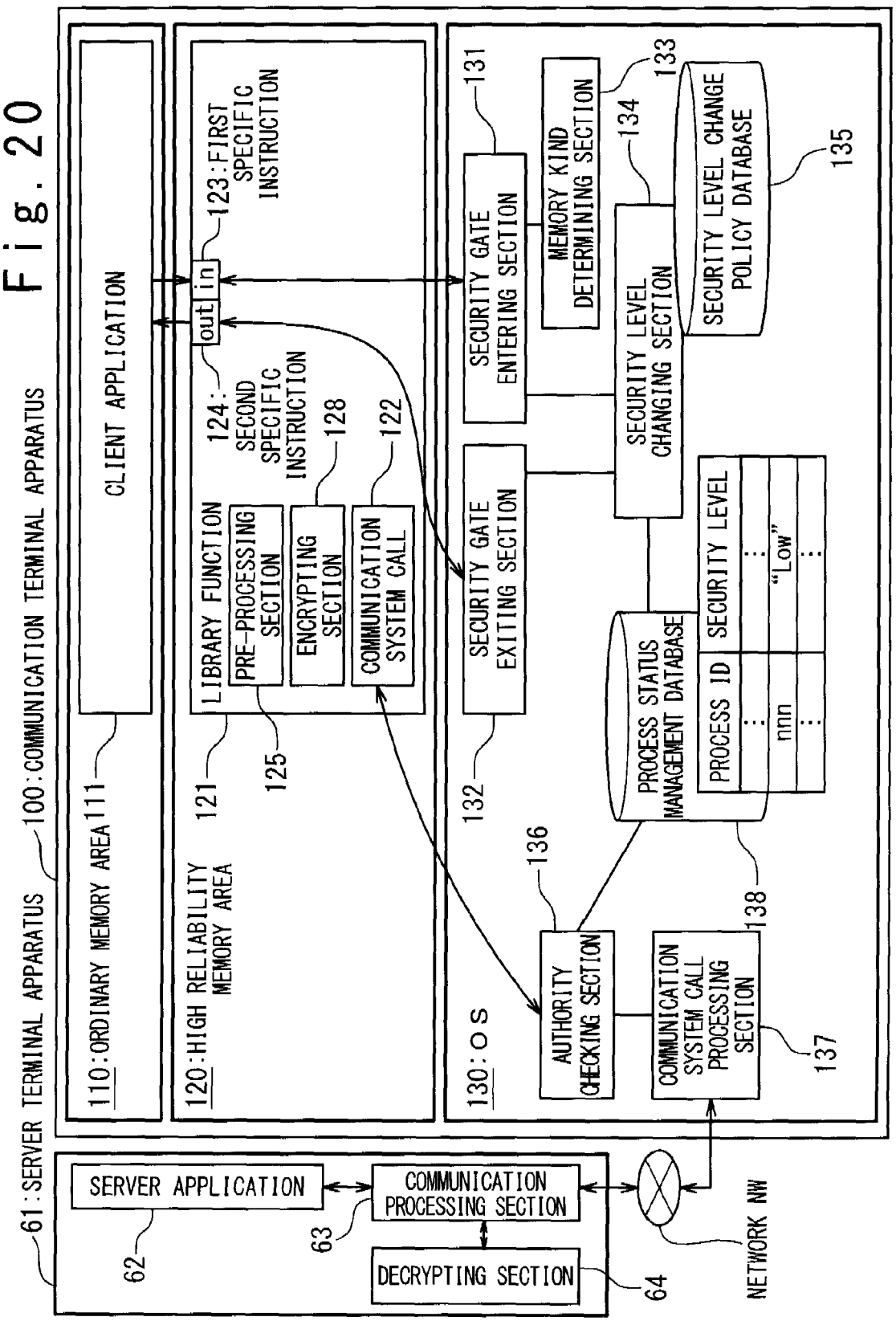
FIG. 20 is a block diagram of the communication system according to the third exemplary embodiment of the present invention.

Referring to FIG. 20, in the communication system according to a third exemplary embodiment of the present invention, the communication terminal apparatus 100 operating as the client terminal apparatus and the server terminal apparatus 61 operating as the server terminal apparatus are communicably connected to each other through the network NW such as the internet.

The communication terminal apparatus 100 is different from the communication terminal apparatus in the communication system of the first exemplary embodiment shown in FIG. 15 in that the communication terminal apparatus 100 retains a secret key distributed previously by the server terminal apparatus 61 and has an encrypting section 128 for encrypting a transmission data from the client application 111 by using the secret key, instead of the certificate managing section 126.

The server terminal apparatus 61 is that of the third exemplary embodiment of the server terminal apparatus explained in FIG. 12 and includes the server application 62, the communication processing section 63, and the decrypting section 64.

Next, an operation of the communication system of the present exemplary embodiment will be described.

The communication terminal apparatus 100 in the communication system of the present exemplary embodiment is different from the communication terminal apparatus in the communication system of the first exemplary embodiment in that a process by the encrypting section 128 is executed instead of the process by the certificate managing section 126 in the library function 121. When ending the first specific instruction 123 and the process by the pre-processing section 125, the library function 121 which is called and to which the transmission data is transferred from the client application data 111 encrypts the transmission data from the client application 111 by using the secret key of the server terminal apparatus 61 by the encrypting section 128 and sets this encrypted data as transmission data. In subsequent communication using the communication system call 122, the encrypted data is transmitted to the communication processing section 63 of the server terminal apparatus 61 through the network NW.

Next, an operation of the server terminal apparatus 61 will be explained. When receiving the encrypted data from the communication terminal apparatus 100 (S131), the communication processing section 63 of the server terminal apparatus 61 transfers the encrypted data to the decrypting section 64 (S132). The decrypting section 64 decrypts the encrypted data by using a public key of the server terminal apparatus 61 itself (S142), transfers the decrypted data to the communication processing section 63 if the decryption succeeds (S144), and transfers a decryption impossible signal to the communication processing section 63 if the decryption fails (S145).

The communication processing section 63 ends the process when receiving a decryption impossible signal and transmits the decrypted data to the server application 62 when receiving the decrypted data (S134). The server application 62 processes data transferred from the communication processing section 63.

According to the present exemplary embodiment, when the client application 110 communicates with the server application 62, execution of the necessary pre-process before the communication can be guaranteed within the communication terminal apparatus 100 based on the same reason as the communication system in the first exemplary embodiment.

Moreover, according to the present exemplary embodiment, whether or not the necessary pre-process has been executed before the communication can be determined on a server terminal apparatus 61 side. This is because the client application 111 in the communication terminal apparatus 110 cannot communicate with the server terminal apparatus 61 if the library function 121 is not correctly used, and the pre-processing section 125 and the encrypting section 128 using a secret key of the server terminal apparatus 61 are necessarily executed prior to the communication, if the library function 121 is correctly used. Therefore, whether the necessary pre-process has been executed prior to the communication can be determined by confirming whether or not the received encrypted data can be decrypted by using its own public key in the server terminal apparatus 61.

Application Example 3

Next, an application example of the communication system according to the present exemplary embodiment will be described.

The present application example includes a Linux terminal as the communication terminal apparatus 100 and a personal computer as the server terminal apparatus 61.

The server application 62 of the server terminal apparatus 61 as the personal computer has a function of distributing the game contents, and the client application 111 of the communication terminal apparatus 100 as the Linux terminal has a function of downloading the game contents distributed by the server application 62. Communication between the communication terminal apparatus 100 and the server terminal apparatus 61 is performed in the SSL by using a secret key distributed previously by the server terminal apparatus 61, and retained by the encrypting section 128 of the communication terminal apparatus 100, and a public key retained by the communication processing section 63 of the server terminal apparatus 61. In addition, the communication terminal apparatus 100 has functions of an IC card storing electronic money data, and the pre-processing section 125 of the library function 121 executed in an XIP manner in a ROM area has a function of executing the charging process through the IC card. An operation when the client application 111 transmits a download request to the server application 62 and tries to download the game contents will be described.

When the client application 111 transfers the download request and calls the library function 121 in the communication terminal apparatus 100, the library function 121 first executes the first specific instruction 123. Thus, the security gate entering section 131 existing in the OS 130 is called, and the security level of the client application 111 is changed into the "High" security level by using the security level changing section 134 only when the kind of the memory area in which the first specific instruction 123 exists is the high reliability memory area 120. Next, the pre-processing section 125 refers to the IC card to charge a fee on the download of the game contents, and updates the stored electronic money data. The encrypting section 128 encrypts the download request of the client application 111 by using the secret key distributed by the server terminal apparatus 61. Next, when the communication system call 122 is executed, the authority checking section 136 is called and the communication process is executed by using the communication system call processing section 137 since the security level of the client application 111 is in the "High" security level. According to this, the encrypted download request from the client application 111 is transmitted to the communication processing section 63 of the server terminal apparatus 61.

When receiving the encrypted download request from the communication terminal apparatus 100, the communication processing section 63 of the server terminal apparatus 61 transfers it to the decrypting section 64, and the decrypting section 64 decrypts the download request by using the public key and returns the decrypted download request to the communication processing section 63. The communication processing section 63 transmits it to the server application 52. The server application 52 processes the download request and distributes the game contents to the client application 111 of the communication terminal apparatus 100.

According to this application example 3, the game contents can be downloaded only when the charging process is adequately executed via the library function 121 in the communication terminal apparatus 100, and load of the server terminal apparatus 61 can be reduced, compared to a conventional in the related art for performing the charging process on the server terminal apparatus 61 side.

Fourth Exemplary Embodiment of Communication System

Figure 21:
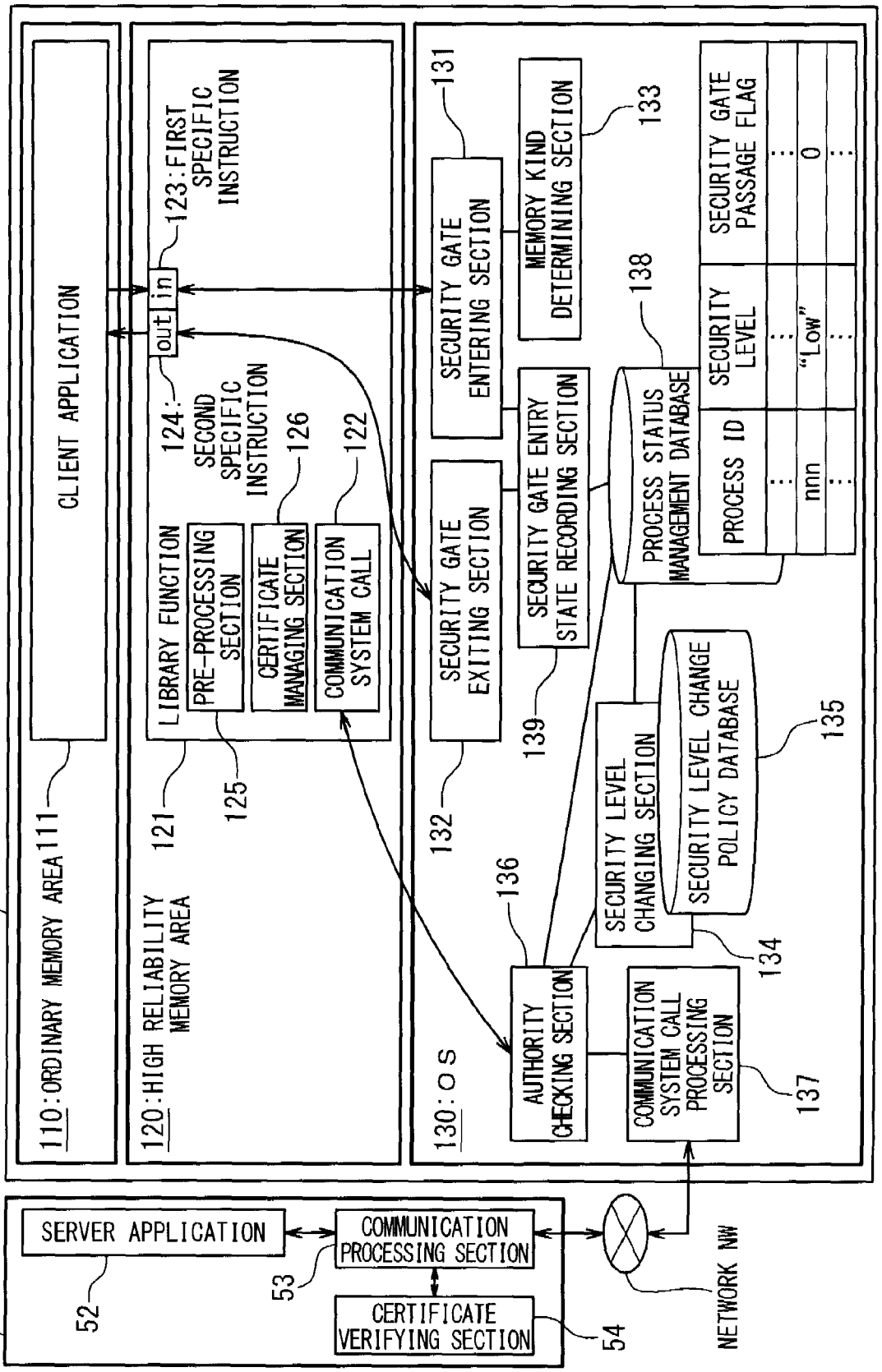
FIG. 21 is a block diagram of the communication system according to a fourth exemplary embodiment of the present invention.
Figure 22:
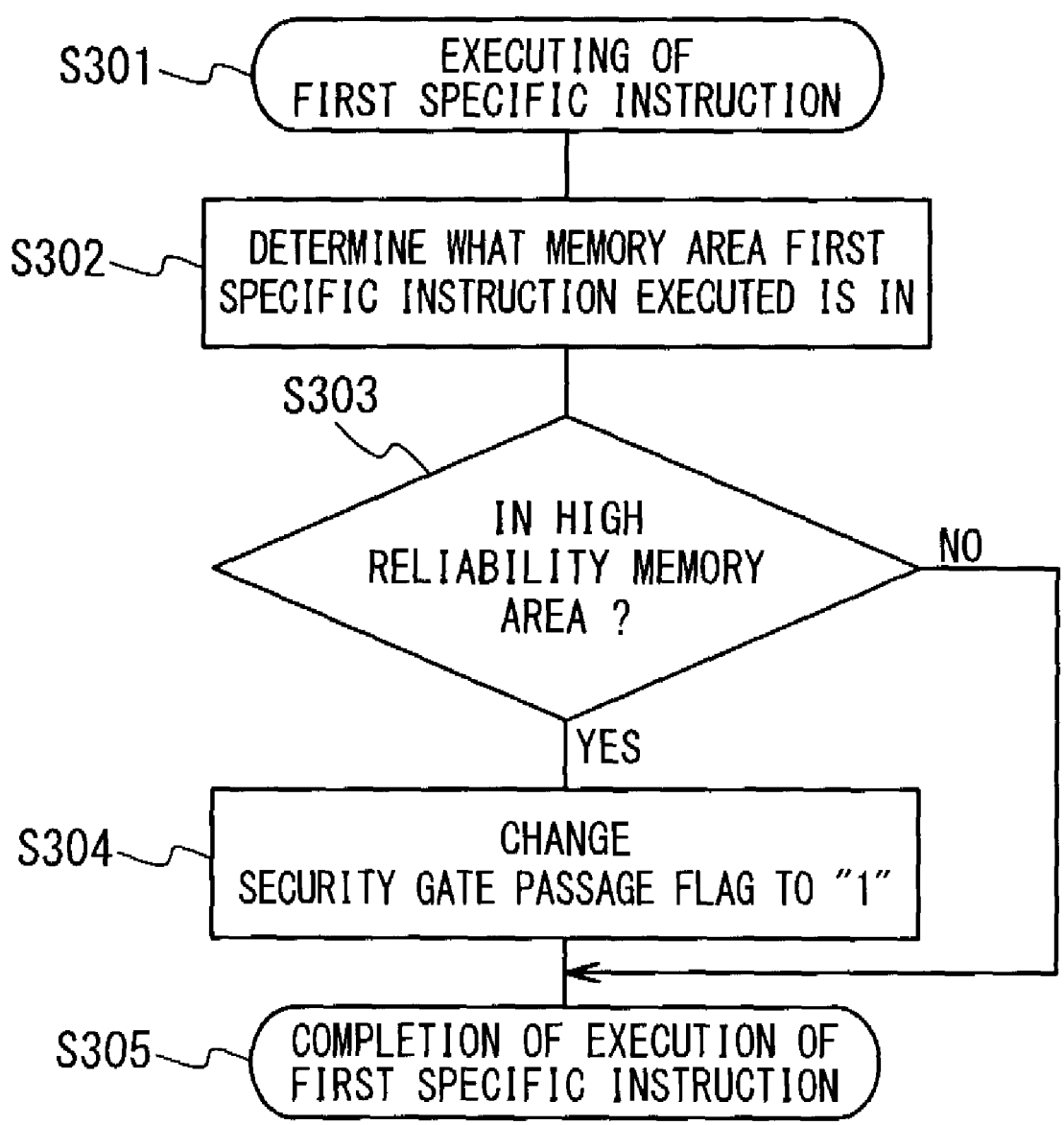
FIG. 22 is a flowchart showing a process example in the security gate entering section of the communication system in the fourth exemplary embodiment of the present invention.
Figure 23:
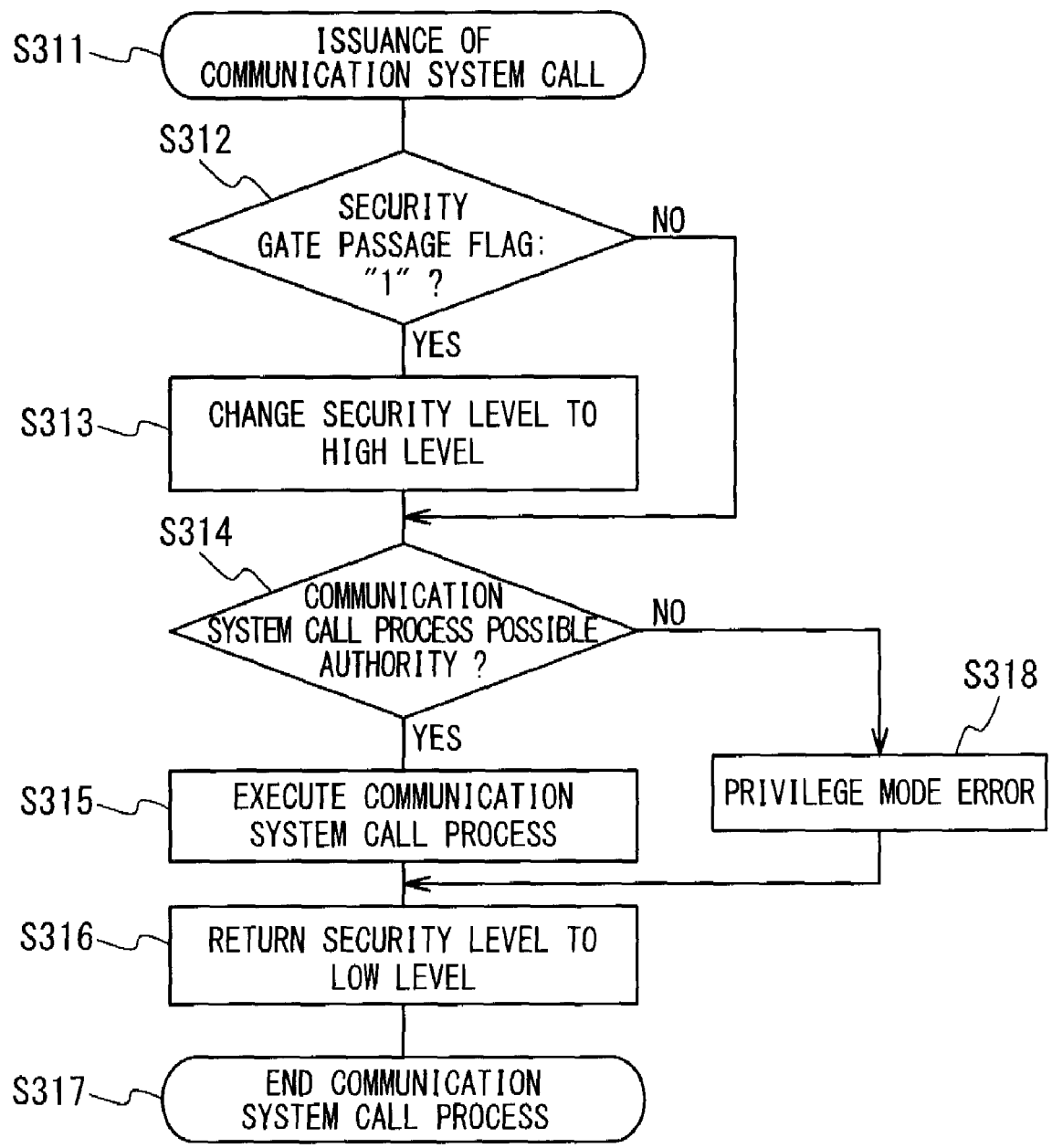
FIG. 23 is a flowchart showing a process example in an authority checking section of the communication system in the fourth exemplary embodiment of the present invention.

Referring to FIG. 21, the communication system according to a fourth exemplary embodiment of the present invention is different from the communication system in the first exemplary embodiment in that an attribute value indicating the security gate entry state as a new attribute value of the client application 111 is added, the process status management database 138 retains a combination of a process ID, a security level, and a security gate passage flag corresponding to the attribute value, a security gate entry state recording section 139 is provided to have a function of changing the security gate passage flag in this process status management database 138, the security gate entry state is managed by using the security gate passage flag without changing the security level at the entry of the client application 111 into the security gate, and the security level is temporarily changed at the authority check of communication instruction execution by the authority checking section 136.

Next, referring to flowcharts FIG. 21 and FIGS. 22 to 24, an operation of the communication system of the present exemplary embodiment will be described.

The client application 111 is loaded in the ordinary memory area 110 by the OS 130 and is executed as an application process (process ID=nnn) in the communication terminal apparatus 100. It is not clear whether or not the client application 111 is reliable at this time, and the security level of the operation is in the "Low" security level. In addition, the security gate passage flag is "0". When transmitting a data to the server application 52 of the server terminal apparatus 51, the client application 111 calls the library function 121. When being called, the library function 121 first executes the first specific instruction 123 arranged in the head portion of the function (S301 in FIG. 22).

When the first specific instruction 123 is executed, the security gate entering section 131 existing in the OS 130 is called. In the security gate entering section 131, the kind of the memory area in which the first specific instruction 123 exists is obtained by using the memory kind determining section 133 (S302). Only when the obtained kind of the memory area is the high reliability memory area 120, it is recorded that the client application 111 is in the security gate entry state, by using the security gate entry state recording section 139 (S303 and S304). Thus, the security gate passage flag of the client application 111 existing in the process status management database 138 is changed, for example, from "0" to "1". When the security gate passage flag of the client application 111 has been changed, the process of the first specific instruction 123 is completed (S305). On the other hand, when the memory area in which the first specific instruction 123 exists is not the high reliability memory area 120 (NO in S303), the process of the first specific instruction 123 is completed without changing the security gate passage flag of the client application (S305).

After that, the client application 111 executes a program provided by the library function 121, and in this process, the pre-processing section 125, the certificate managing section 126, and the communication system call 122 are executed in this order.

The pre-processing section 125 executes a predetermined process before communicating with the server application 52 of the server terminal apparatus 51. In addition, the certificate managing section 126 executes a process for adding a certificate verifying execution of the pre-process to transmission data of the client application 111. It should be noted that when functions of the OS 130 are required in the execution of the process of the pre-processing section 125 and the certificate managing section 126, various types of the functions of the OS 130 are arbitrarily utilized.

When the communication system call 122 is executed (S311 in FIG. 23), the authority checking section 136 in the OS 130 is called. Referring to the security gate passage flag of the client application existing in the process status management database 138, the authority checking section 136 changes the security level of the client application to the "High" security level by using the security level changing section 134 when the security gate passage flag is in a "1" state (S312 to S313). Next, it is checked whether the client application has the authority to process a communication system call instruction based on the changed security level, and a communication process is executed by the communication system call processing section 137 when the client application has the authority (S314 and S315). According to this, the transmission data of the client application 111 and the certificate added in the certificate managing section 126 are transmitted to the communication processing section 53 of the server terminal apparatus 51 through the network NW. On the other hand, it is determined as a privilege mode error without executing the communication process when the client application does not have the authority (S318). After that, the security level of the client application 111 is returned to the "Low" security level again by using the security level changing section 134, and the communication system call process is ended (S316 and S317).

Figure 24:
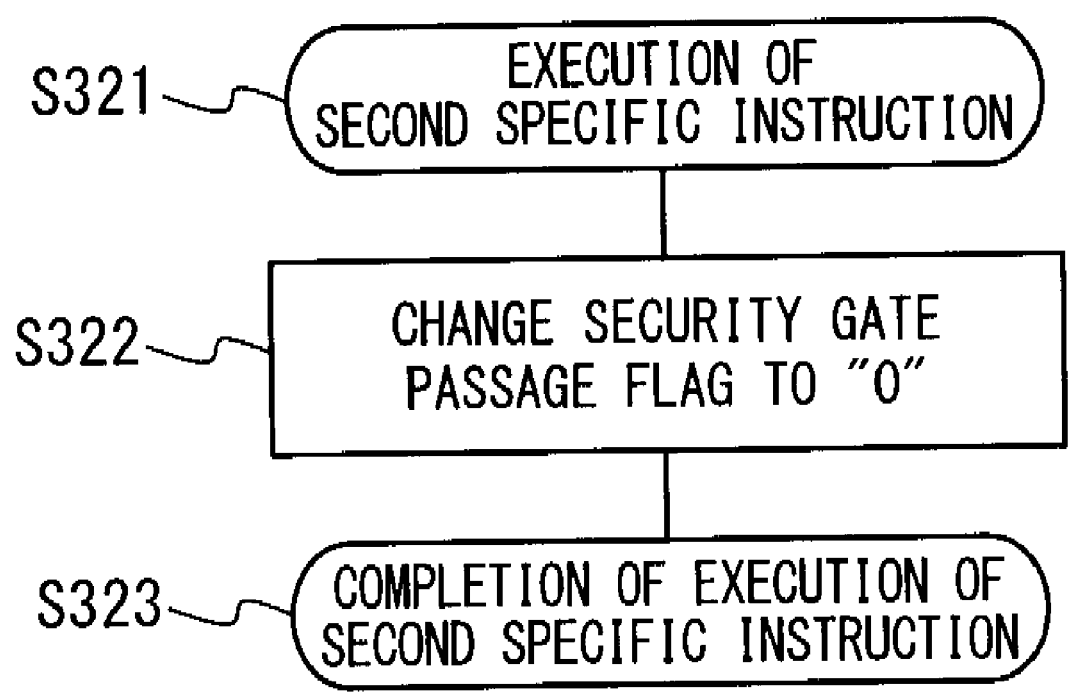
FIG. 24 is a flowchart showing a process example in the security gate exiting section of the communication system in the fourth exemplary embodiment of the present invention.

After that, the client application 111 completes the process of the library function 121, and the second specific instruction 124 is executed immediately before returning to the client application 111 (S321 in FIG. 24).

When the second specific instruction 124 is executed, the security gate exiting process 132 existing in the OS 130 is called. The security gate exiting process 132 returns the security gate passage flag of the client application to the previous state by using the security gate entry state recording section 139 (S322), and ends the process (S323). Here, the security gate passage flag of the client application existing in the process status management database 138 is returned to "0".

The operation of the server terminal apparatus 51 is the same as that of the communication system in the first exemplary embodiment.

Similar to the first exemplary embodiment, according to the present exemplary embodiment, execution of the necessary pre-process before the communication of the communication terminal apparatus 100 can be guaranteed within the communication terminal apparatus 100 and it can be determined on the server terminal apparatus 51 side whether or not the necessary pre-process prior to the communication has been executed.

In addition, according to the present exemplary embodiment, since an interval during which the security level of the client application 111 is set to the "High" security level can be limited to be short, compared to the communication terminal apparatus in the communication system of the first exemplary embodiment, an operation can be realized more safely.

It should be noted that although the present exemplary embodiment manages whether the state of the client application 111 is in the security gate entry state or not based on the flag provided in the process status management database 138 retaining at least the security level in relation to process IDs of respective client applications, another database for managing a process ID list of an application process of the security gate entry state may be provided.

Fifth Exemplary Embodiment of Communication System

Figure 25:
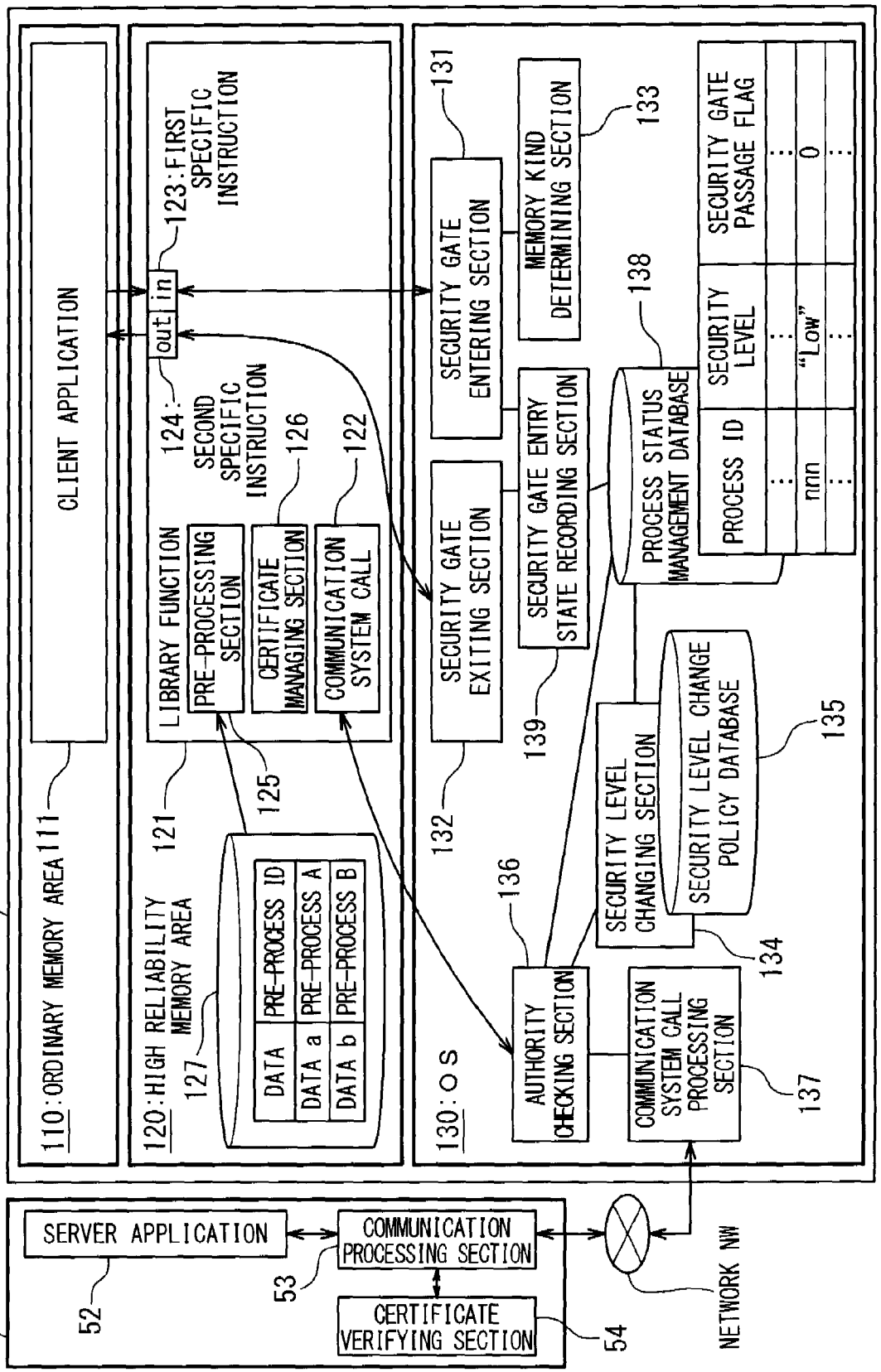
FIG. 25 is a block diagram of the communication system according to a fifth exemplary embodiment of the present invention.

Referring to FIG. 25, the communication system according to a fifth exemplary embodiment of the present invention is different from the fourth exemplary embodiment shown in FIG. 21 in that the pre-process storage section 127 is provided in the high reliability memory area 120 of the communication terminal apparatus 100 to retain correspondence relation between a data and a pre-process identifier and that the pre-processing section 125 of the library function 121 searches the pre-process identifier corresponding to the same data as transmission data of the client application 111 from the pre-process storage section 127 and executes the pre-process uniquely identified by the searched pre-process identifier.

Next, an operation of the communication system of the present exemplary embodiment will be described.

The communication system of the present exemplary embodiment is different from the communication system of the fourth exemplary embodiment only in an operation of the pre-processing section 125 in the library function 121 of the communication terminal apparatus 100. When progressing to the process by the pre-processing section 125 after the library function 121, which is called and to which the transmission data is transferred from the client application 111, processes the first specific instruction 123, the pre-processing section 125 obtains a pre-process identifier corresponding to the transmission data by referring to the pre-process storage section 127. The pre-process corresponding to the obtained pre-process identifier is executed to progress to the process by the certificate managing section 126.

According to the present exemplary embodiment, the same effect as the communication system of the fourth exemplary embodiment can be obtained, and an effect is also obtained which can change the contents of the pre-process in accordance with data to be transmitted to the server application 52 by the client application 111 by providing the pre-process storage section 127.

Sixth Exemplary Embodiment of Communication System

Figure 26:
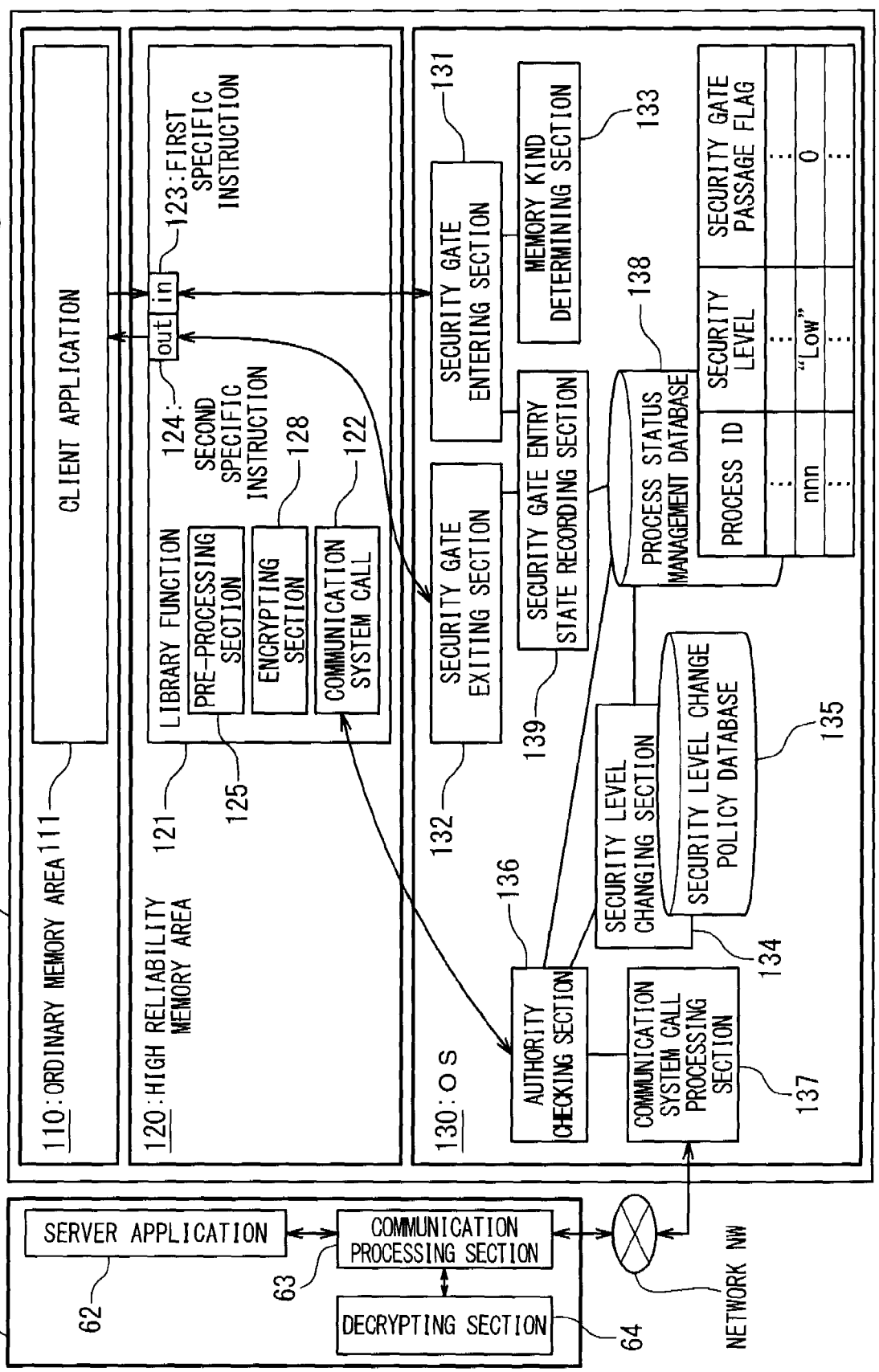
FIG. 26 is a block diagram of the communication system according to a sixth exemplary embodiment of the present invention.

Referring to FIG. 26, in the communication system of a sixth exemplary embodiment of the present invention, the communication terminal apparatus 100 operating as the client terminal apparatus and the server terminal apparatus 61 operating as the server terminal apparatus are communicably connected to each other via the network NW such as the internet.

The communication terminal apparatus 100 is different from the communication terminal apparatus in the communication system of the fourth exemplary embodiment in that the communication terminal apparatus retains a secret key distributed previously by the server terminal apparatus 61 and has an encrypting section 128 for encrypting a transmission data from the client application 111 by using the secret key, instead of the certificate managing section 126.

The server terminal apparatus 61 is same as that of the server terminal apparatus of FIG. 12 in the third exemplary embodiment and includes the server application 62, the communication processing section 63, and the decrypting section 64.

Next, an operation of the communication system of the present exemplary embodiment will be described.

The communication terminal apparatus 100 in the communication system of the present exemplary embodiment is different from the communication terminal apparatus in the communication system of the fourth exemplary embodiment in that the process by the encrypting section 128 is executed instead of the process by the certificate managing section 126 in the library function 121. When ending the processes by the first specific instruction 123 and the pre-processing section 125, the library function 121 which is called and to which the transmission data is transferred from the client application data 111 encrypts the transmission data of the client application 111 by the encrypting section 128 by using the secret key of the server terminal apparatus 61 and sets the encrypted data as the transmission data. In subsequent communication using the communication system call 122, the encrypted data is transmitted to the communication processing section 63 of the server terminal apparatus 61 through the network NW.

The operation of the server terminal apparatus 61 is the same as that of the server terminal apparatus in the communication system of the third exemplary embodiment.

According to the present exemplary embodiment, when the client application 111 communicates with the server application 62, execution of the necessary pre-process before the communication can be guaranteed within the communication terminal apparatus 100 based on the same reason as in the fourth exemplary embodiment of the communication system.

Moreover, according to the present exemplary embodiment, whether or not the necessary pre-process has been executed before the communication can be determined on the server terminal apparatus 61 side, based on the same reason as in the communication system in the third exemplary embodiment.

Seventh Exemplary Embodiment of Communication System

Figure 27:
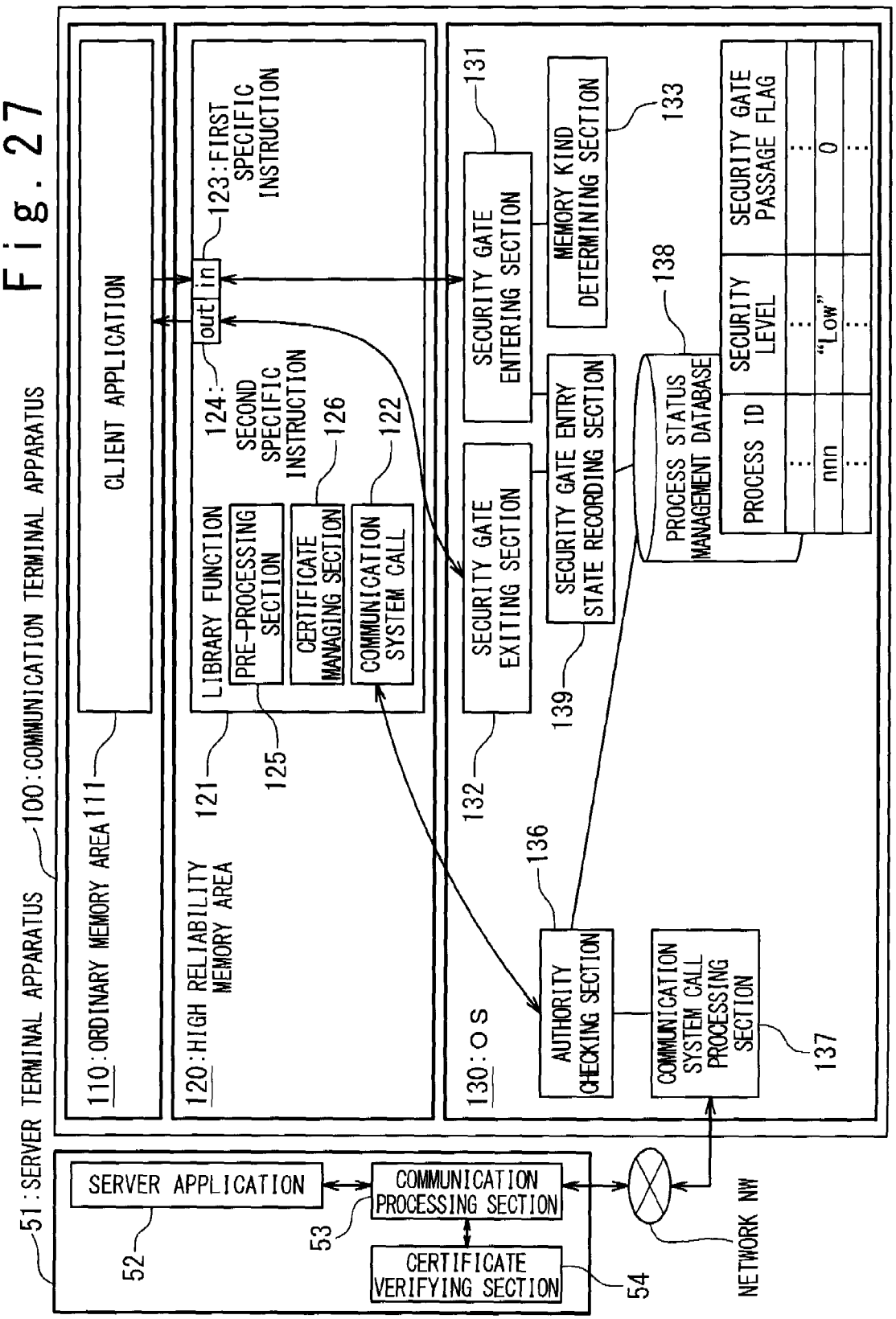
FIG. 27 is a block diagram of the communication system according to a seventh exemplary embodiment of the present invention.

Referring to FIG. 27, the communication terminal apparatus 100 in a seventh exemplary embodiment of the communication system of the present invention is different from the communication terminal apparatus in the communication system of the fourth exemplary embodiment shown in FIG. 21 in that the security level changing section 134 and the security level change policy database 135 are omitted from the configuration of the communication terminal apparatus in the communication system of the fourth exemplary embodiment shown in FIG. 21, and that the authority checking section 136 omits an authority check depending on the security level of the client application 111 and executes a communication instruction when the client application 111 is in the security gate entry state, performs an authority check depending on the security level of the client application 111 when the client application 111 is not in the security gate entry state, performs the communication instruction when having the authority to execute the communication instruction, and gives an error as a privilege instruction violence when not having the authority to execute the communication instruction. The server terminal apparatus 51 is the same as that of the communication system in the communication system of the fourth exemplary embodiment.

Figure 28:
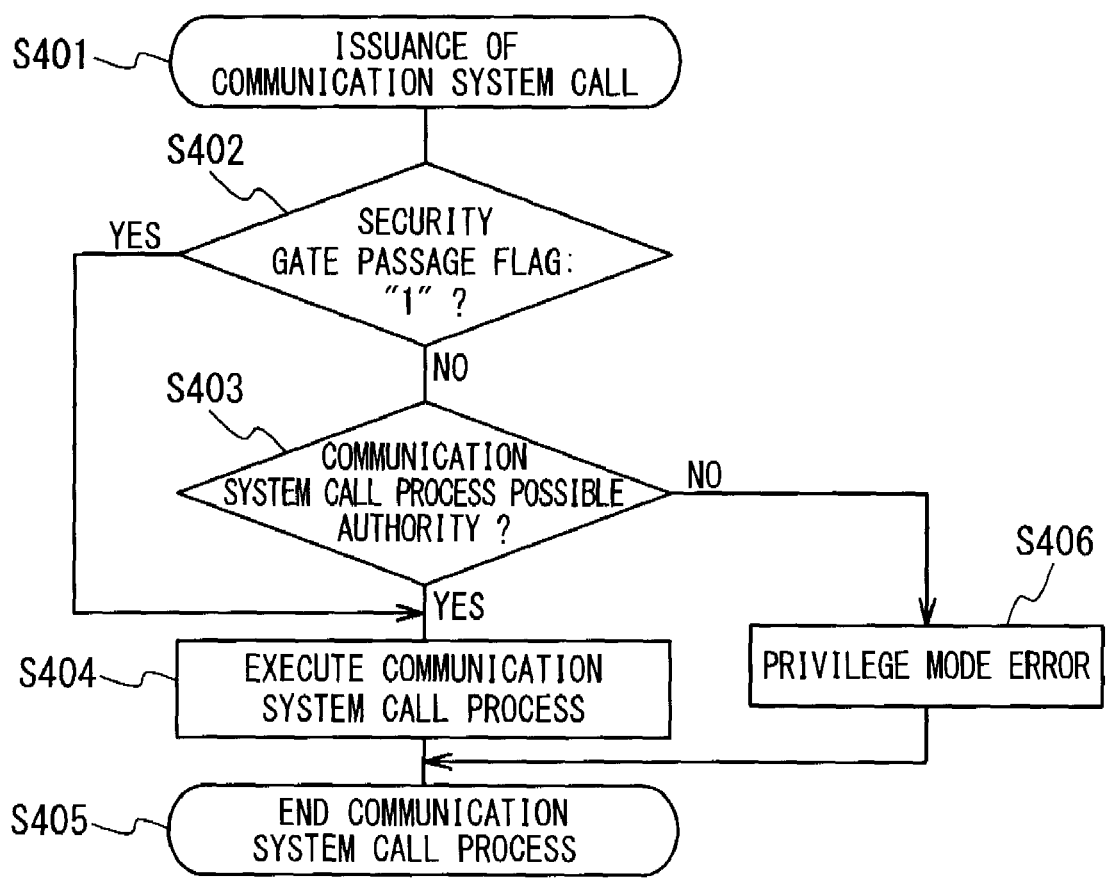
FIG. 28 is a flowchart showing a process example in the authority checking section of the communication system in the seventh exemplary embodiment of the present invention.

Referring to flowcharts of FIGS. 27 and 28, an operation of the present exemplary embodiment will be described.

The client application 111 is loaded in the ordinary memory area 110 by the OS 130 and is executed as an application process (process ID=nnn) in the communication terminal apparatus 100. It is not clear at this time whether or not the client application 111 is reliable, and the security level of the operation is in the "Low" security level. When transmitting a data to the server application 52 of the server terminal apparatus 51, the client application 111 calls the library function 121. When being called, the library function 121 first executes the first specific instruction 123 arranged in the head portion of the function. The operation at this time is the same as that of the communication terminal apparatus in the communication system of the fourth exemplary embodiment, and only when the memory area in which the first specific instruction 123 exists is the high reliability memory area 120, the security gate passage flag of the client application 111 existing in the process status management database 138 is changed, for example, from "0" to "1".

After that, the client application 111 executes a program provided by the library function 121, and in this process, the pre-processing section 125, the certificate managing section 126, and the communication system call 122 are executed in this order.

The pre-processing section 125 executes a predetermined process before communicating with the server application 52 of the server terminal apparatus 51. In addition, the certificate managing section 126 executes a process for adding a certificate verifying execution of the pre-process to the transmission data of the client application 111. When functions of the OS 130 are required in the execution of the process of the pre-processing section 125 and the certificate managing section 126, various types of the functions of the OS 130 are arbitrarily utilized.

When the communication system call 122 is executed (S401 in FIG. 28), the authority checking section 136 in the OS 130 is called. Referring to the security gate passage flag of the client application 111 existing in the process status management database 138, the authority checking section 136 passes an authority check based on the security level if the security gate passage flag is in "1" state and the communication process is executed by using the communication system call processing section 137 (S402, s404, and S405). According to this, the transmission data of the client application 111 and the certificate added in the certificate managing section 126 are transmitted to the communication processing section 53 of the server terminal apparatus 51 through the network NW. On the other hand, it is checked whether or not the client application 111 has an authority to process a communication system call instruction, based on the security level of the client application 111 when the security gate passage flag is in the "0" state (NO at step S402), and the communication process is executed by using the communication system call processing section 137 when the client application has the authority. Then, the communication system call process is ended (S403 to S405). However, it is determined as a privilege mode error without executing the communication process when the client application does not have the authority (S403 and S406).

After that, when the process of the library function 121 is completed in the client application 111 and the second specific instruction 124 is executed immediately before returning to the client application 111, the security gate passage flag in the client application process existing in the process status management database 138 is returned to "0", as in the communication terminal apparatus in the communication system of the fourth exemplary embodiment.

Similar to the first exemplary embodiment, according to the present exemplary embodiment, execution of the necessary pre-process before the communication of the client application 111 can be guaranteed within the communication terminal apparatus 100 and it can be determined on the server terminal apparatus 51 side whether or not the necessary pre-process prior to the communication has been executed.

Also, according to the present exemplary embodiment, there is an effect that a configuration is simplified for easy implementation, and a process speed can be improved while detailed control cannot be performed, since the process of changing the security level is not executed.

It should be noted that the present exemplary embodiment manages whether the state of the client application 111 is in the security gate entry state or not, based on the flag provided in the process status management database 138 retaining the security levels in relation to process IDs of client applications at least. However, another database may be provided to manage a process ID list of application processes in the security gate entry state.

Eighth Exemplary Embodiment of Communication System

Figure 29:
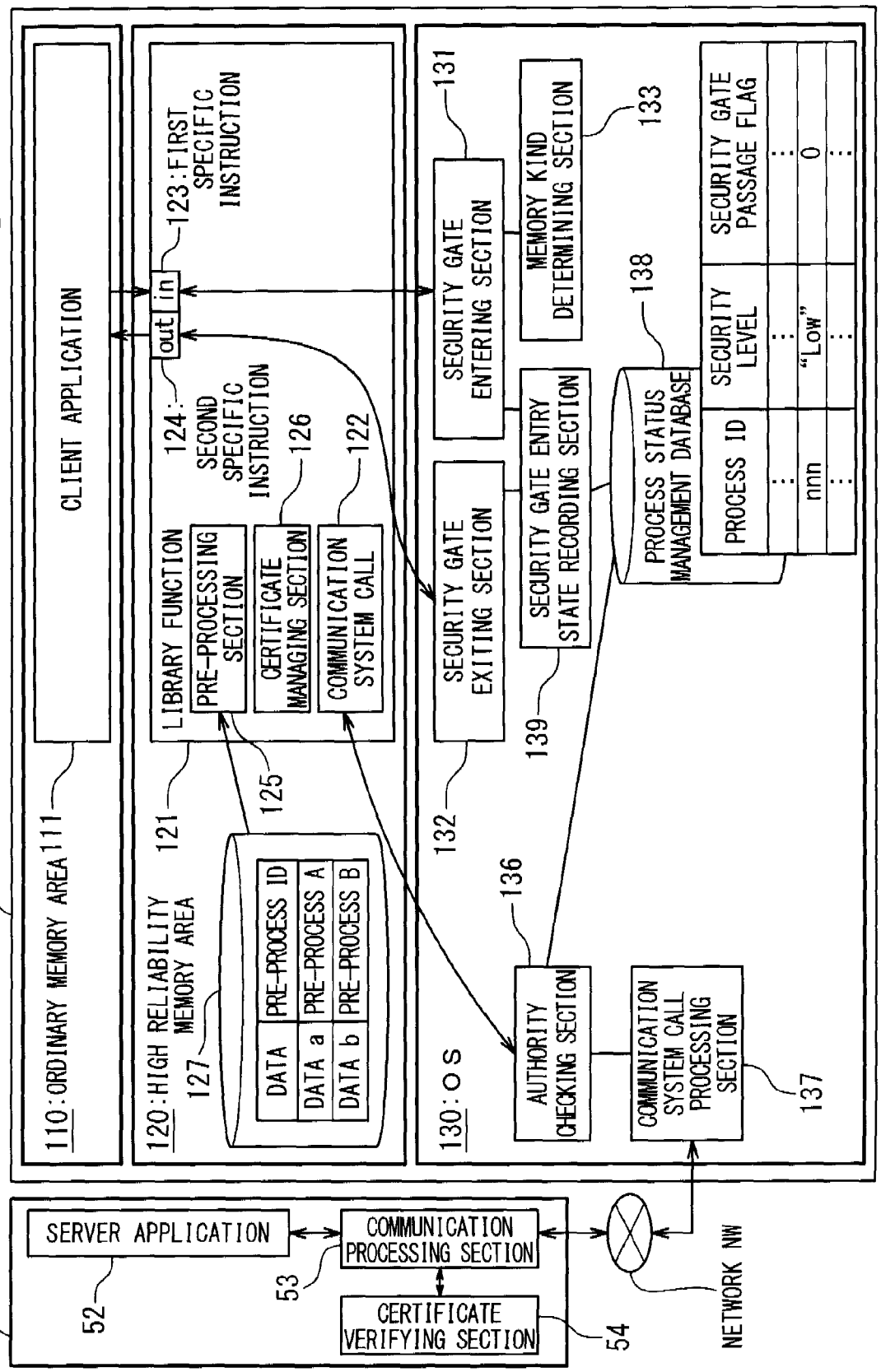
FIG. 29 is a block diagram of the communication system according to an eighth exemplary embodiment of the present invention.

Referring to FIG. 29, the communication system according to an eighth exemplary embodiment of the present invention is different from the seventh exemplary embodiment shown in FIG. 27 in that the pre-process storage section 127 is provided to retain correspondence relation between a data and a pre-process identifier in the high reliability memory area 120 of the communication terminal apparatus 100 and that the pre-processing section 125 of the library function 121 searches the pre-process identifier corresponding to the same data as transmission data of the client application 111 from the pre-process storage section 127 and executes the pre-process having contents uniquely identified by the searched pre-process identifier.

Next, an operation of the communication system of the present exemplary embodiment will be described.

The communication system of the present exemplary embodiment is different from the communication system of the seventh exemplary embodiment only in the operation of the pre-processing section 125 in the library function 121 of the communication terminal apparatus 100. When progressing to the process by the pre-processing section 125 after the library function 125 which is called and to which transmission data is transferred from the client application 111 processes the first specific instruction 123, the pre-processing section 125 obtains a pre-process identifier corresponding to the transmission data by referring to the pre-process storage section 127. The pre-process corresponding to the obtained pre-process identifier is executed to progress to the process by the certificate managing section 126.

According to the present exemplary embodiment, the same effect as the communication system of the seventh exemplary embodiment can be obtained. Also, an effect is obtained which can change the contents of the pre-process in accordance with the data to be transmitted to the sever application 52 by the client application 111 by providing the pre-process storage section 123.

Ninth Exemplary Embodiment of Communication System

Figure 30:
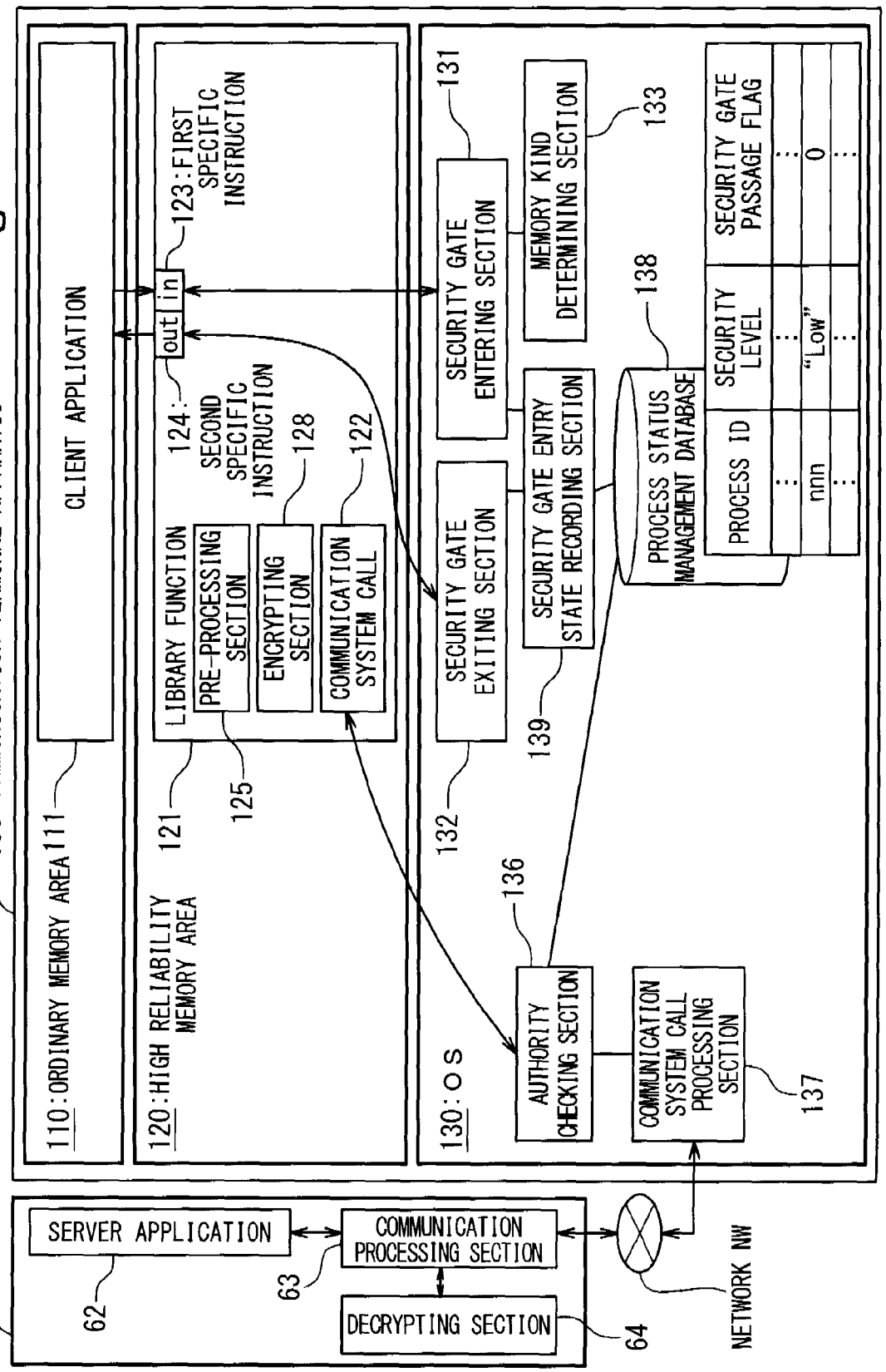
FIG. 30 is a block diagram of the communication system according to a ninth exemplary embodiment of the present invention.

Referring to FIG. 30, in the communication system of a ninth exemplary embodiment of the present invention, a communication terminal apparatus 100 operating as the client terminal apparatus and the server terminal apparatus 61 operating as the server terminal apparatus are communicably connected to each other via the network NW such as the internet.

The communication terminal apparatus 100 is different from the communication terminal apparatus in the communication system of the seventh exemplary embodiment in that the communication terminal apparatus 100 retains a secret key distributed previously by the server terminal apparatus 61 and the encrypting section 128 is provided to encrypt transmission data of the client application 111 by using the secret key, instead of the certificate managing section 126.

The server terminal apparatus 61 is same as that of the third exemplary embodiment of the server terminal apparatus shown in FIG. 12 and includes the server application 62, the communication processing section 63, and the decrypting section 64.

Next, an operation of the communication system of the present exemplary embodiment will be described.

The communication terminal apparatus 100 in the communication system of the present exemplary embodiment is different from the communication terminal apparatus in the communication system of the seventh exemplary embodiment in that the process by the encrypting section 128 is executed instead of the process by the certificate managing section 126 in the library function 125. When ending the processes by the first specific instruction 123 and the pre-processing section 125, the library function 121 which is called and to which transmission data is transferred from the client application data 111 encrypts the transmission data of the client application 111 by using the secret key of the server terminal apparatus 61 and sets the encrypted data as the transmission data. In subsequent communication using the communication system call 122, the encrypted data is transmitted to the communication processing section 63 of the server terminal apparatus 61 through the network NW.

Next, an operation of the server terminal apparatus 61 is the same as that of the server terminal apparatus in the communication system of the third exemplary embodiment.

According to the present exemplary embodiment, when the client application 111 communicates with the server application 62, execution of the necessary pre-process before the communication can be guaranteed within the communication terminal apparatus 100 based on the same reason as the communication system of the seventh exemplary embodiment.

Moreover, according to the present exemplary embodiment, whether or not the necessary pre-process has been executed before the communication can be determined on the server terminal apparatus 61 side, which is based on the same reason as that of the communication system of the third exemplary embodiment.

Tenth Exemplary Embodiment of Communication System

Figure 31:
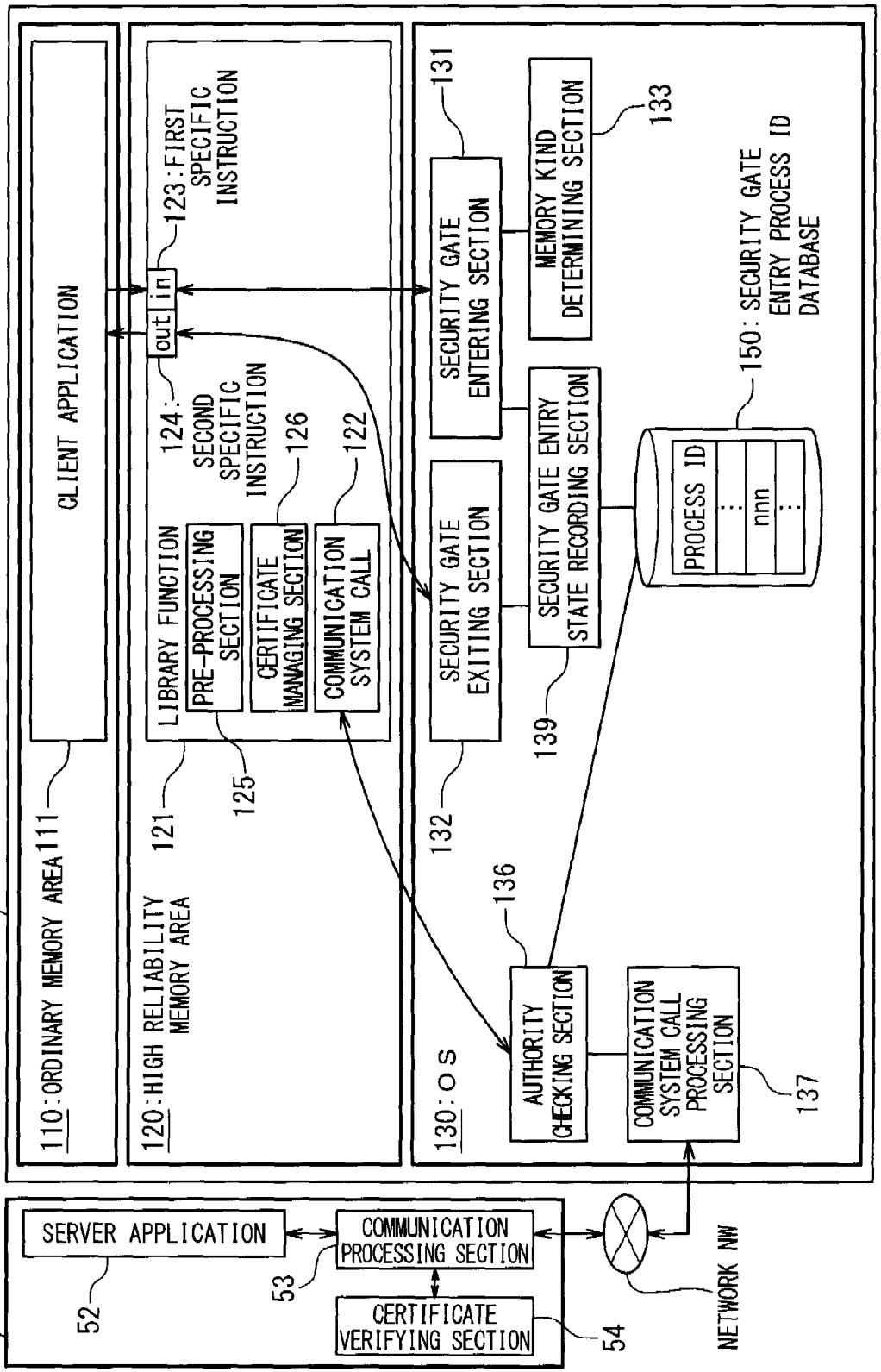
FIG. 31 is a block diagram of the communication system according to a tenth exemplary embodiment of the present invention.

Referring to FIG. 31, the communication terminal apparatus 100 in the communication system according to a tenth exemplary embodiment of the present invention is different from the communication terminal apparatus in the communication system of the fourth exemplary embodiment in that the security gate entering process ID database 150 is provided to manage a process ID list of the client application 111 in the security gate entering state while the security level changing section 134, the security level change policy database 135, and the process status management database 138 are omitted from the configuration of the communication terminal apparatus in the communication system of the fourth exemplary embodiment shown in FIG. 21, and that the authority checking section 136 controls the permission of execution of the communication instruction based on whether or not the client application 111 is in the security gate entering state. The server terminal apparatus 51 is the same as that of the communication system in the communication system of the fourth exemplary embodiment.

Figure 32:
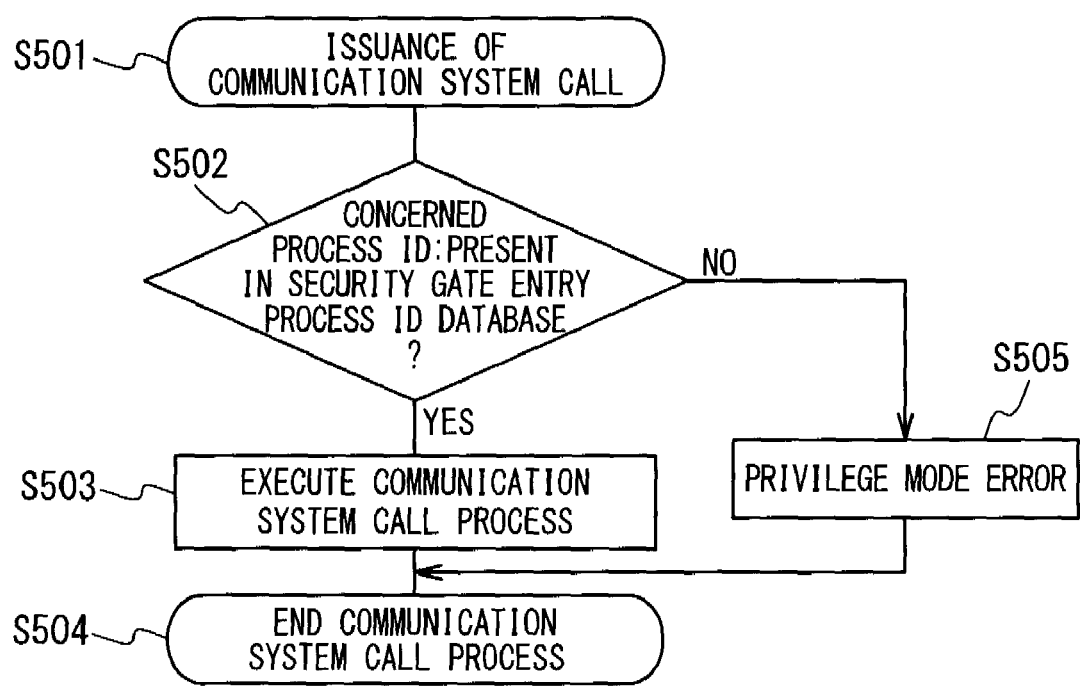
FIG. 32 is a flowchart showing a process example in the authority checking section of the communication system in the tenth exemplary embodiment of the present invention.

Referring to flowcharts of FIGS. 31 and 32, an operation of the present exemplary embodiment will be described.

The client application 111 is loaded in the ordinary memory area 110 by the OS 130 and is executed as an application process (process ID=nnn) in the communication terminal apparatus 100. Since setting of the security level to the client application 111 is not required in the present exemplary embodiment, the security level may be set arbitrarily. When transmitting a data to the server application 52 of the server terminal apparatus 51, the client application 111 calls the library function 121. When being called, the library function 121 first executes the first specific instruction 123 arranged in the head portion of the function. The operation at this time is the same as that of the communication terminal apparatus in the communication system of the fourth exemplary embodiment, and only when the memory area in which the first specific instruction 123 exists is the high reliability memory area 120, the client application 111 is managed as the security gate entry state. Specifically, the process ID of the client application 111 is recorded in the security gate entering process ID database 150 by the security gate entry state recording section 139.

Subsequently, the client application 111 executes a program provided by the library function 121, and in this process, the pre-processing section 125, the certificate managing section 126, and the communication system call 122 are executed in this order.

The pre-processing section 125 executes a predetermined process before communicating with the server application 52 of the server terminal apparatus 51. In addition, the certificate managing section 126 executes a process for adding a certificate of execution of the pre-process to transmission data of the client application 111. When functions of the OS 130 are required in the execution of process of the pre-processing section 125 and the certificate managing section 126, various types of the functions of the OS 130 are arbitrarily utilized.

When the communication system call 122 is executed (S501 in FIG. 32), the authority checking section 136 in the OS 130 is called. Checking whether or not the process ID of the client application 111 is registered in the security gate entering process ID database 150, the authority checking section 136 executes the communication process by using the communication system call processing section 137 when the process ID is registered (step S502 to S504). According to this, the transmission data of the client application 111 and the certificate added in the certificate managing section 126 are transmitted to the communication processing section 53 of the server terminal apparatus 51 through the network NW. On the other hand, when the process ID is not registered (NO at S502), it is determined as a privilege mode error without executing the communication process (S505).

After that, when the client application 111 completes the process of the library function 121 and the second specific instruction 124 is executed immediately before returning to the client application 111, the security gate exiting process 132 is called and the process ID of the client application is deleted from the security gate entering process ID database 150 by the security gate entry state recording section 139.

Similar to the first exemplary embodiment, according to the present exemplary embodiment, execution of the necessary pre-process before the communication can be guaranteed within the communication terminal apparatus 100 and it can be determined on the server terminal apparatus 51 side whether or not the necessary pre-process prior to the communication has been executed.

Also, according to the present exemplary embodiment, there is an effect that the configuration is simplified so that implementation is made easy, and the process speed is improved while detailed control cannot be performed, since the process of changing the security level is not performed.

Eleventh Exemplary Embodiment of Communication System

Figure 33:
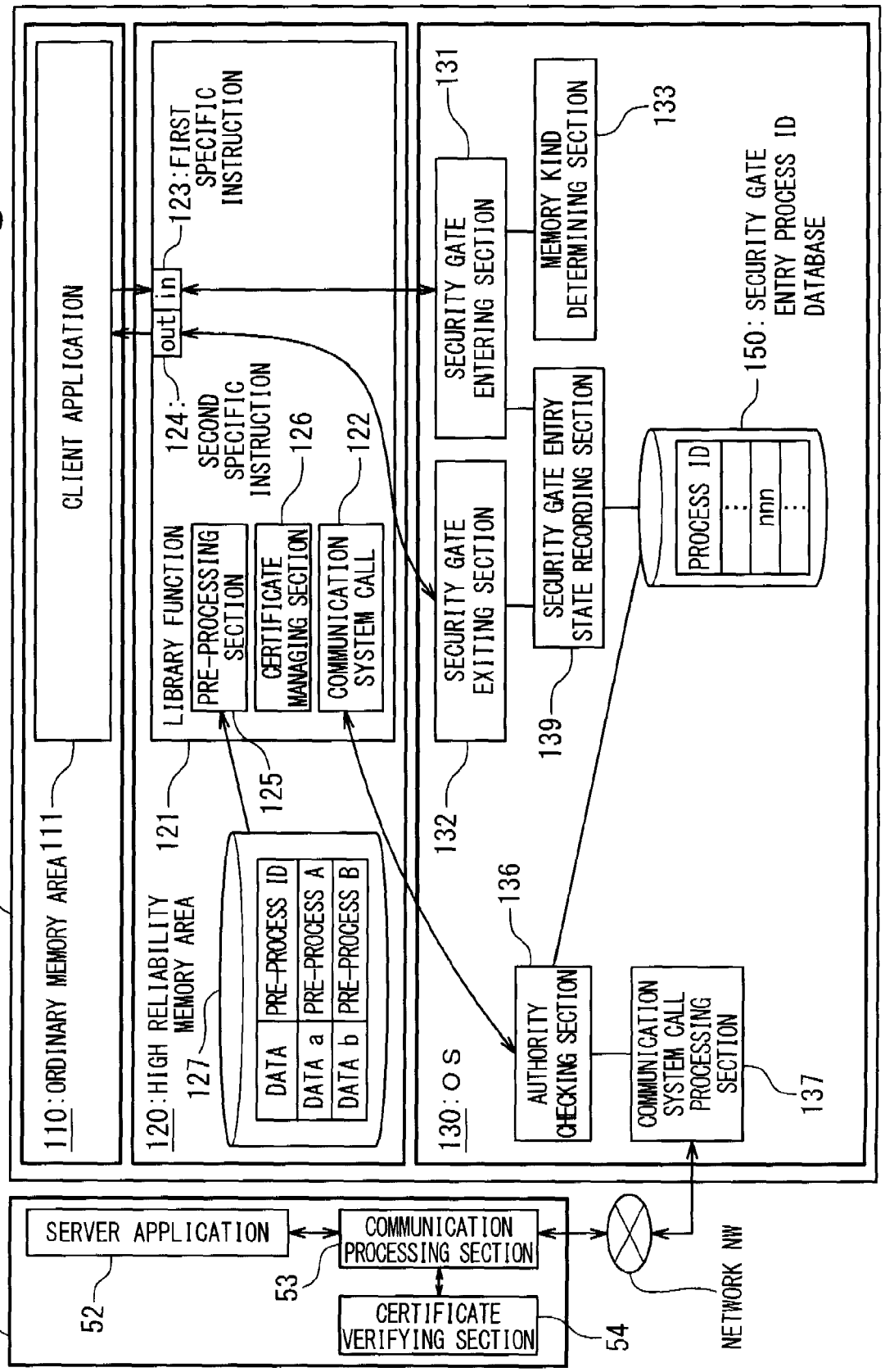
FIG. 33 is a block diagram of the communication system according to an eleventh exemplary embodiment of the present invention.

Referring to FIG. 33, the communication system according to an eleventh exemplary embodiment of the present invention is different from the tenth exemplary embodiment shown in FIG. 31 in that a pre-process storage section 127 is provided to retain correspondence relation between a data and a pre-process identifier in the high reliability memory area 120 of the communication terminal apparatus 100 and that the pre-processing section 125 of the library function 121 searches the pre-process identifier corresponding to the same data as transmission data of the client application 111 from the pre-process storage section 127 and executes the pre-process having the contents uniquely identified by the searched pre-process identifier.

Next, an operation of the communication system of the present exemplary embodiment will be described.

The communication system of the present exemplary embodiment is different from the communication system of the tenth exemplary embodiment only in an operation of the pre-processing section 125 in the library function 121 of the communication terminal apparatus 100. When progressing to the process by the pre-processing section 125 after the library function 121 which is called and to which transmission data is transferred from the client application 111 processes the first specific instruction 123, the pre-processing section 125 obtains a pre-process identifier corresponding to the transmission data by referring to the pre-process storage section 127. Thus, the pre-process corresponding to the obtained pre-process identifier is executed to progress to the process by the certificate managing section 126.

According to the present exemplary embodiment, the same effect as the communication system of the tenth exemplary embodiment can be obtained and the contents of the pre-process can be changed in accordance with the data to be transmitted to the server application 52 by the client application 111 by providing the pre-process storage section 123.

Twelfth Exemplary Embodiment of Communication System

Figure 34:
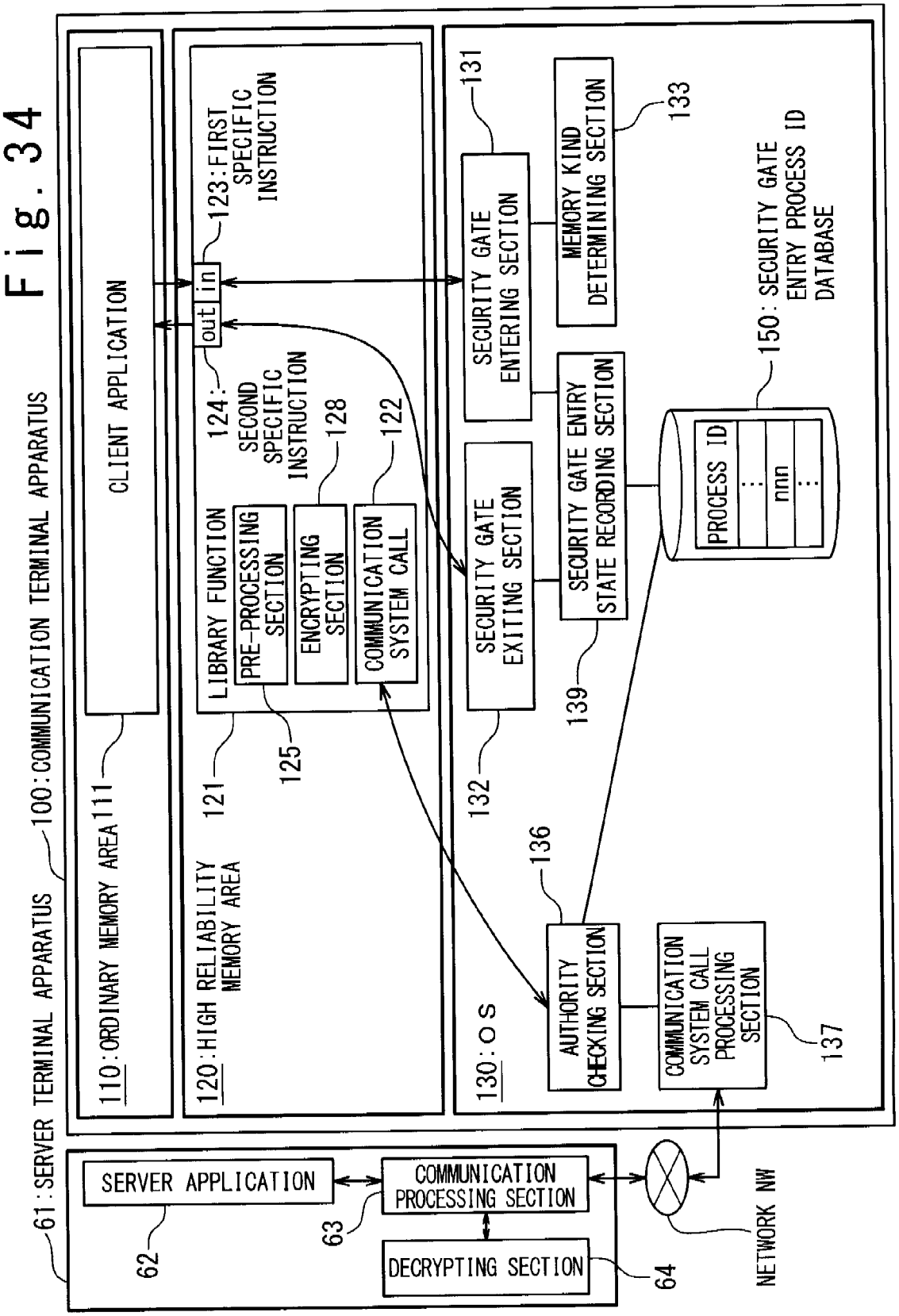
FIG. 34 is a block diagram of the communication system according to a twelfth exemplary embodiment of the present invention.

Referring to FIG. 34, in the communication system according to a twelfth exemplary embodiment of the present invention, the communication terminal apparatus 100 operating as the client terminal apparatus and the server terminal apparatus 61 operating as the server terminal apparatus are communicably connected to each other through the network NW such as the internet.

The communication terminal apparatus 100 is different from the communication terminal apparatus in the communication system of the tenth exemplary embodiment in that the communication terminal apparatus 100 retains a secret key distributed previously by the server terminal apparatus 61 and an encrypting section 128 is provided to encrypt the transmission data of the client application 111 by using the secret key instead of the certificate managing section 126.

The server terminal apparatus 61 is the same as that of the third exemplary embodiment of the server terminal apparatus explained in FIG. 12 and includes the server application 62, the communication processing section 63, and the decrypting section 64.

Next, an operation of the communication system of the present exemplary embodiment will be described.

The communication terminal apparatus 100 in the communication system of the present exemplary embodiment is different from the communication terminal apparatus in the communication system of the tenth exemplary embodiment in that the process by the encrypting section 128 is executed instead of the process by the certificate managing section 126 in the library function 121. When ending the first specific instruction 123 and the processes by the pre-processing section 125, the library function 121 which is called and to which the transmission data is transferred from the client application data 111 encrypts the transmission data of the client application 111 by using the secret key of the server terminal apparatus 61 and sets the encrypted data as the transmission data. In subsequent communication using the communication system call 122, the encrypted data is transmitted to the communication processing section 63 of the server terminal apparatus 61 through the network NW.

Next, an operation of the server terminal apparatus 61 is the same as that of the server terminal apparatus in the communication system in the third exemplary embodiment.

According to the present exemplary embodiment, when the client application 111 communicates with the server application 62, execution of the necessary pre-process before the communication can be guaranteed within the communication terminal apparatus 100 based on the same reason as in the communication system of the tenth exemplary embodiment.

Moreover, according to the present exemplary embodiment, whether or not the necessary pre-process has been executed before the communication can be determined on the server terminal apparatus 61 side, which is based on the same reason as that of the communication system of the third exemplary embodiment.

Thirteenth Exemplary Embodiment of Communication System

Figure 35:
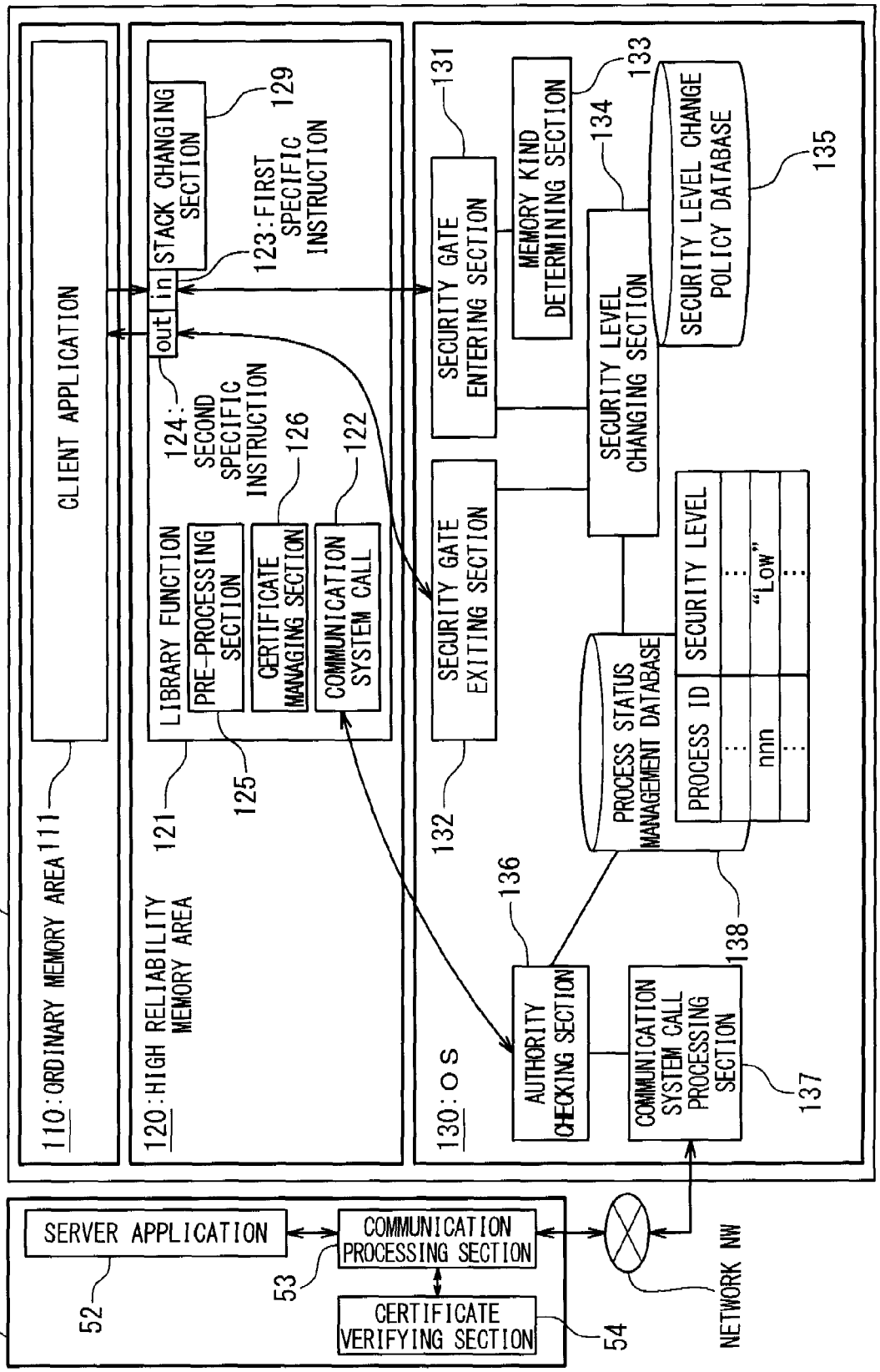
FIG. 35 is a block diagram of the communication system according to a thirteenth exemplary embodiment of the present invention.

Referring to FIG. 35, in the communication system according to a thirteenth exemplary embodiment of the present invention, the communication terminal apparatus 100 is different from the communication terminal apparatus in the communication system of the first exemplary embodiment in that a stack modifying section 129 is added to the library function 121 and the section 129 is an instruction sequence for modifying a stack of a process of the client application 111 so as to necessarily go through a function including the second specific instruction 124 immediately before returning to the client application 111 when executing the first specific instruction 123, instead of omission of the second specific instruction 124 arranged in the end portion of the process of the library function 121. The server terminal 51 of the present exemplary embodiment is the same as that of the communication system of the first exemplary embodiment.

Figure 36A:
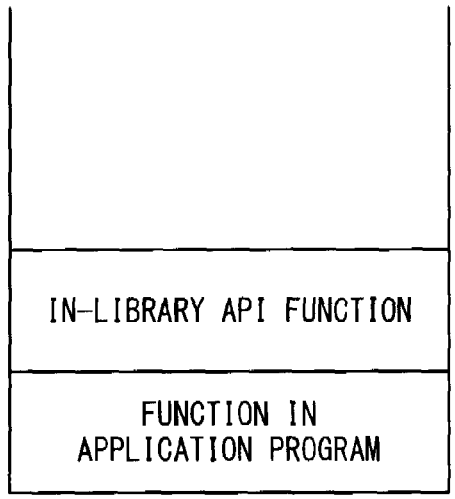
FIGS. 36A and 36B are diagrams of a stack modifying section of the communication system in the thirteenth exemplary embodiment of the present invention.
Figure 36B:
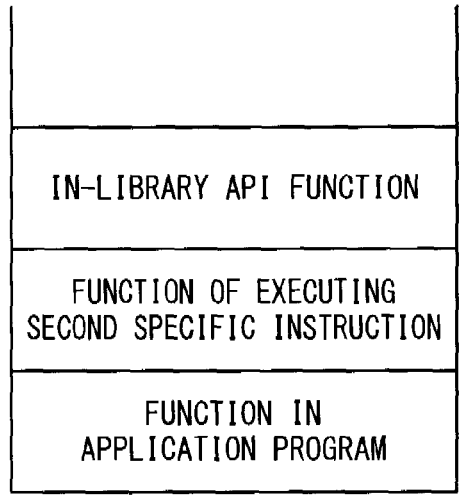

Next, referring to FIG. 35 and FIGS. 36A and 36B, an operation of the communication system of the present exemplary embodiment will be described.

In the communication terminal apparatus 100, the client application 111 is loaded in the ordinary memory area 110 by the OS 130 and is executed as an application process (process ID=nnn) in the communication terminal apparatus 100. It is not clear at this time whether or not the client application 111 is reliable, and the security level of the operation is in the "Low" security level. When transmitting a data to the server application 52 of the server terminal apparatus 51, the client application 111 calls the library function 121. When being called, the library function 121 first executes the first specific instruction 123 arranged in the head portion of the function. According to this, the security level of the application process is changed, for example, from the "Low" security level to the "High" security level by using the security level changing section 134 only when the kind of the memory area in which the first specific instruction 123 exists is the high reliability memory area 120, as in the communication terminal apparatus of the communication system of the first exemplary embodiment.

Subsequently, the stack modifying section 129 is executed, a stack data of the client application 111 is modified, the stack data of a function of executing the second specific instruction 124 is inserted between the stack data of an in-library API function and the stack data of an in-application program function. By modifying the stack data in such a manner, the client application 121 completes the process of the library function 111, and a function of necessarily executing the second specific instruction 124 is called before returning to the in-program function of the client application.

When the function of executing the second specific instruction 124 is called and the second specific instruction 124 is executed, the security level of the client application 111 is returned to the "Low" security level by using the security level changing section 134, as in the communication terminal apparatus in the communication system of the first exemplary embodiment. In accordance with the stack data, the control flow is returned to the client application 111.

According to the present exemplary embodiment, since the same effect as the communication system of the first exemplary embodiment can be obtained, the client application 111 completes process of the library function 121 and a function of necessarily executing the second specific instruction 124 is called before returning to the function in the client application 111 through the stack modification process, illegal leakage of the privilege level due to a miss arrangement of the second specific instruction 124 can be prevented.

In addition, the stack modification process may be executed in the security gate entering section 131 called at the execution of the first specific instruction 123 by providing the stack modification process as one function of the OS 130 as described above.

Fourteenth Exemplary Embodiment of Communication System

Referring to FIG. 37, the communication system according to a fourteenth exemplary embodiment of the present invention is different from the thirteenth exemplary embodiment shown in FIG. 35 in that a pre-process storage section 127 for retaining correspondence relation between a data and a pre-process identifier is provided in the high reliability memory area 120 of the communication terminal apparatus 100 and that the pre-processing section 125 of the library function 121 searches the pre-process identifier corresponding to the same data as transmission data of the client application 111 from the pre-process storage section 127 and executes the pre-process having the contents uniquely identified by the searched pre-process identifier.

Next, an operation of the communication system of the present exemplary embodiment will be described.

The communication system of the present exemplary embodiment is different from the communication system of the thirteenth exemplary embodiment only in an operation of the pre-processing section 125 in the library function 121 of the communication terminal apparatus 100. When progressing to the process by the pre-processing section 125 after the library function 121 which is called and to which transmission data is transferred from the client application 111 processes the first specific instruction 123 and the process by the stack modifying section 129, the pre-processing section 125 obtains a pre-process identifier corresponding to the transmission data by referring to the pre-process storage section 127. Thus, the pre-process corresponding to the obtained pre-process identifier is executed to progress to the process by the certificate managing section 126.

According to the present exemplary embodiment, the same effect as the communication system of the thirteenth exemplary embodiment can be obtained, and there is an effect that can change the contents of a pre-process in accordance with a data to be transmitted to the server application 52 by the client application 111 by providing the pre-process storage section 123.

Fifteenth Exemplary Embodiment of Communication System

Referring to FIG. 38, in the communication system according to a fifteenth exemplary embodiment of the present invention, the communication terminal apparatus 100 operating as the client terminal apparatus and the server terminal apparatus 61 operating as the server terminal apparatus are communicably connected to each other through the network NW such as the internet.

The communication terminal apparatus 100 is different from the communication terminal apparatus in the communication system of the thirteenth exemplary embodiment in that the communication terminal apparatus retains a secret key distributed previously by the server terminal apparatus 61 and an encrypting section 128 is provided for encrypting the transmission data of the client application 111 by using the secret key instead of the certificate managing section 126.

The server terminal apparatus 61 is the same as that of the server terminal apparatus in the third exemplary embodiment shown in FIG. 12 and includes the server application 62, the communication processing section 63, and the decrypting section 64.

Next, an operation of the communication system of the present exemplary embodiment will be described.

The communication terminal apparatus 100 in the communication system of the present exemplary embodiment is different from the communication terminal apparatus in the communication system according to the thirteenth exemplary embodiment in that the process by the encrypting section 128 is executed instead of the process by the certificate managing section 126 in the library function 121. When ending the processes by the first specific instruction 123, the stack modifying section 129, and the pre-processing section 125, the library function 121 which is called and to which transmission data is transferred from the client application data 111 encrypts the transmission data of the client application 111 by using a secret key of the server terminal apparatus 61 and sets the encrypted data as the transmission data. In subsequent communication using the communication system call 122, the encrypted data is transmitted to the communication processing section 63 of the server terminal apparatus 61 through the network NW.

Next, an operation of the server terminal apparatus 61 is the same as that of the server terminal apparatus in the communication system in the third exemplary embodiment.

According to the present exemplary embodiment, when the client application 110 communicates with the server application 62, the execution of the necessary pre-process before the communication can be guaranteed within the communication terminal apparatus 100 based on the same reason as in the communication system of the thirteenth exemplary embodiment.

Moreover, according to the present exemplary embodiment, whether or not the necessary pre-process has been executed before the communication can be determined on the server terminal apparatus 61 side, and this is based on the same reason as that of the communication system of the third exemplary embodiment.

Sixteenth Exemplary Embodiment of Communication System

Referring to FIG. 39, in the communication system according to a sixteenth exemplary embodiment of the present invention, a signal/interrupt handler 112, a signal/interrupt processing section 140, and a security gate temporary exiting process 141 are added to the communication terminal apparatus 100 in the communication system of the first exemplary embodiment. In addition, the process status management database 138 stores a combination of a process ID of the client application 111, a present security level, the security level (an initial level) originally allocated at process generation, and a preservation area of the security level.

The signal/interrupt handler 112 exists in the client application 111 and executes a process corresponding to a signal/interrupt occurring while the client application is running.

The signal/interrupt processing section 140 exists in the OS 130 and executes a process for stopping the previous process when the signal/interrupt occurs while the client application 111 is running and for calling the signal and interrupt handler 112 in the client application 111 via the security gate temporary exiting process 141.

The security gate temporary exiting process 141 executes a process for temporarily returning the security level of the client application 111 to a previous level before calling the signal and interrupt handler 112 in the client application 111.

Figure 40:
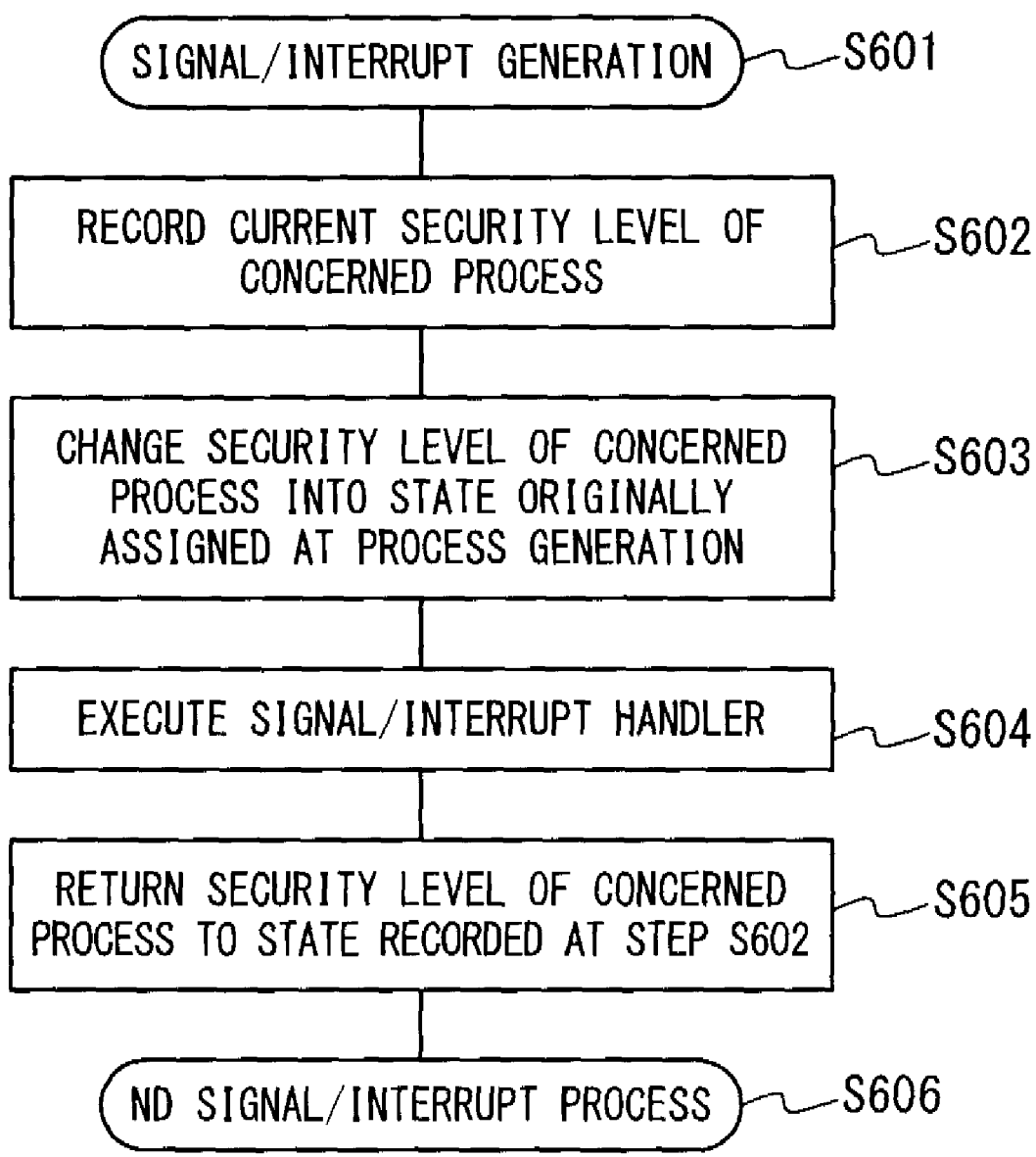
FIG. 40 is a flowchart showing a process example in a signal/interrupt processing section of the communication system in the sixteenth exemplary embodiment of the present invention.

Referring to FIG. 39 and a flowchart of FIG. 40, an operation of the present exemplary embodiment will be described in detail.

When a signal/interrupt occurs while the client application 111 is performing process when the communication terminal apparatus 100 operates in accordance with the process operation described in the communication system of the first exemplary embodiment, the OS 130 temporarily stops the process of the client application 111 and tries to call the signal/interrupt handler 112 in the client application 111 by using the signal/interrupt processing section 140. At this time, if the state of the client application 111 is in a state of passage through the security gate entering section 131, the execution of communication system call in a program of the client application 111 is possible and thus the pre-process cannot be guaranteed. Therefore, in the present exemplary embodiment, in order to prevent this case, a process is executed for temporarily returning the security level of the client application 111 by using the security gate temporary exiting process 141 before the signal/interrupt processing section 140 calls the signal/interrupt handler 112 as follows.

When the signal/interrupt is generated during the process of the client application 111 (S601 in FIG. 40), the signal/interrupt processing section 140 calls the security gate temporary exiting process 141. The security gate temporary exiting process 141 records the current security level of the client application 111 into the preservation area of the process status management database 138 (S602). The security gate temporary exiting process 141 changes the security level of the client application into the security level originally allocated at the process generation (S603). After that, the security gate temporary exiting process 141 calls the signal/interrupt handler 112 existing in the client application 111 (S604).

When the process of the signal/interrupt handler 112 is completed, the control flow is returned to the security gate temporary exiting process 141, and the security gate temporary exiting process 141 returns the security level of the client application 111 to the security level recorded in the preservation area in the process status management database 138 (S605). Subsequently, the control flow is returned to the signal/interrupt processing section 140 and the signal/interrupt process is completed (S606).

According to the present exemplary embodiment, the same effect as the communication system of the first exemplary embodiment can be obtained. In addition, since the security level of the client application can be temporarily returned to the security level allocated originally to the client application even when the signal/interrupt is generated in the client application 111 passing through the security gate and the handler existing in the client application 111 is executed, illegal leakage of the privilege level can be prevented and the execution of the pre-process prior to the communication can be guaranteed more certainly.

Seventeenth Exemplary Embodiment of Communication System

Figure 41:
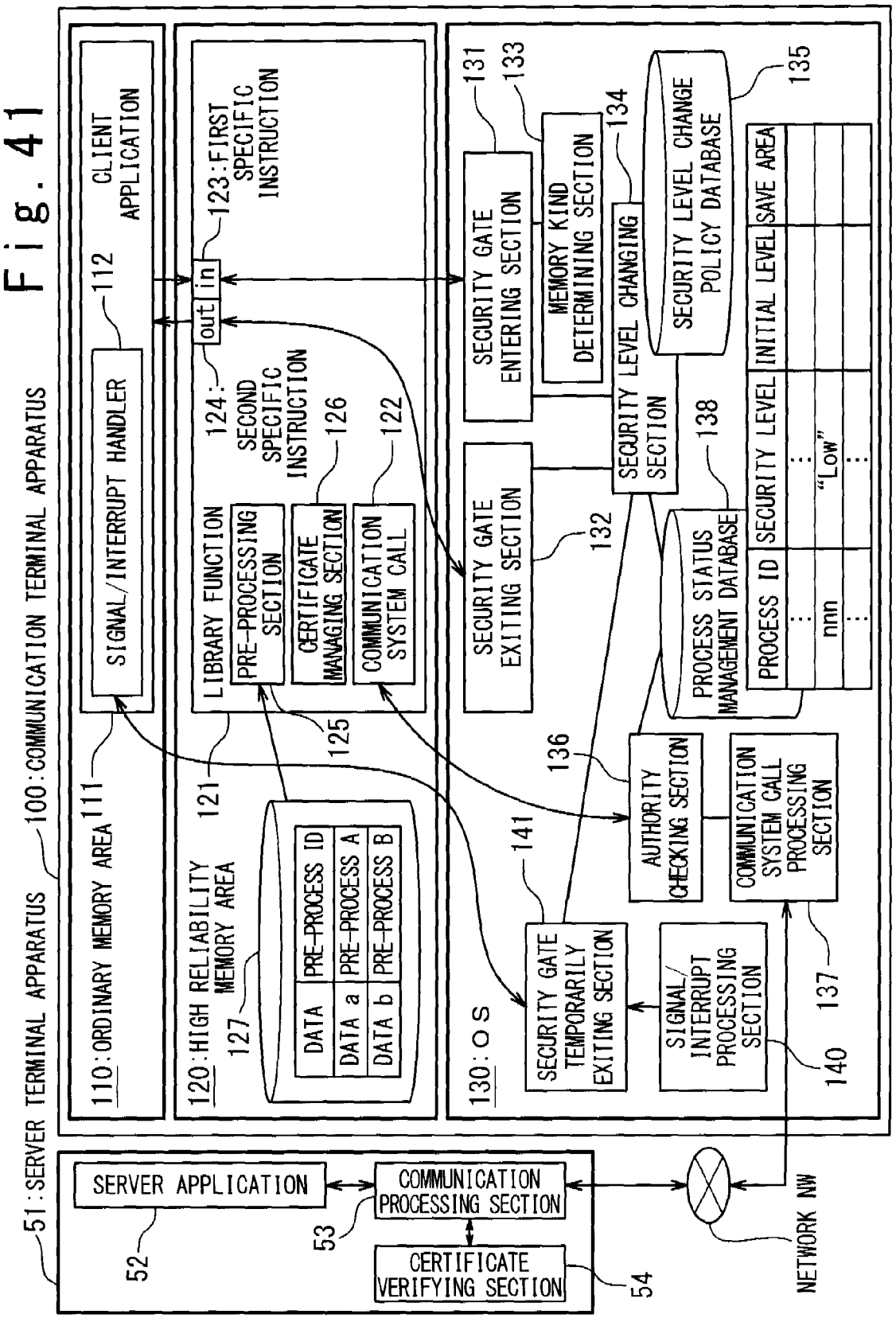
FIG. 41 is a block diagram of the communication system according to a seventeenth exemplary embodiment of the present invention.

Referring to FIG. 41, the communication system according to a seventeenth exemplary embodiment of the present invention is different from the sixteenth exemplary embodiment shown in FIG. 39 in that the pre-process storage section 127 is provided in the high reliability memory area 120 of the communication terminal apparatus 100 to retain correspondence relation between a data and a pre-process identifier and that the pre-processing section 125 of the library function 121 searches the pre-process identifier corresponding to the same data as the transmission data of the client application 111 from the pre-process storage section 127 and executes the pre-process having contents uniquely identified by the searched pre-process identifier.

Next, an operation of the communication system of the present exemplary embodiment will be described.

The communication system of the present exemplary embodiment is different from the communication system of the sixteenth exemplary embodiment only in the operation of the pre-processing section 125 in the library function 121 of the communication terminal apparatus 100. When progressing to the process by the pre-processing section 125 after the library function 121 which is called and to which the transmission data is transferred from the client application 111 processes the first specific instruction 123, the pre-processing section 125 obtains a pre-process identifier corresponding to the transmission data by referring to the pre-process storage section 127. Thus, the pre-process corresponding to the obtained pre-process identifier is executed to progress to the process by the certificate managing section 126.

According to the present exemplary embodiment, the same effect as the communication system of the sixteenth exemplary embodiment can be obtained, and there is an effect that the contents of a pre-process can be changed in accordance with a data to be transmitted to the server application 52 by the client application 111 by providing the pre-process storage section 123.

Eighteenth Exemplary Embodiment of Communication System

Figure 42:
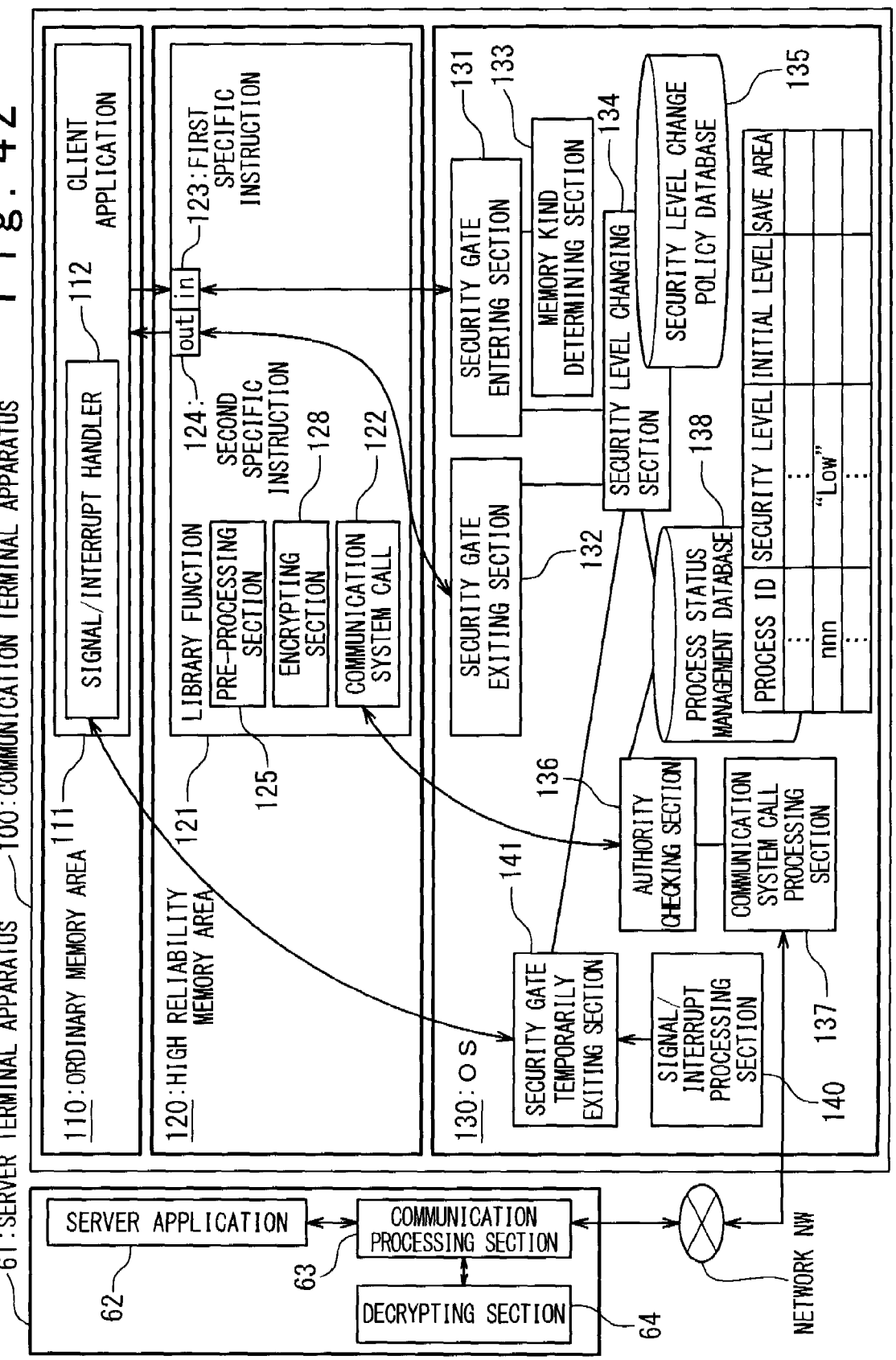
FIG. 42 is a block diagram of the communication system according to an eighteenth exemplary embodiment of the present invention.
Figure 43:
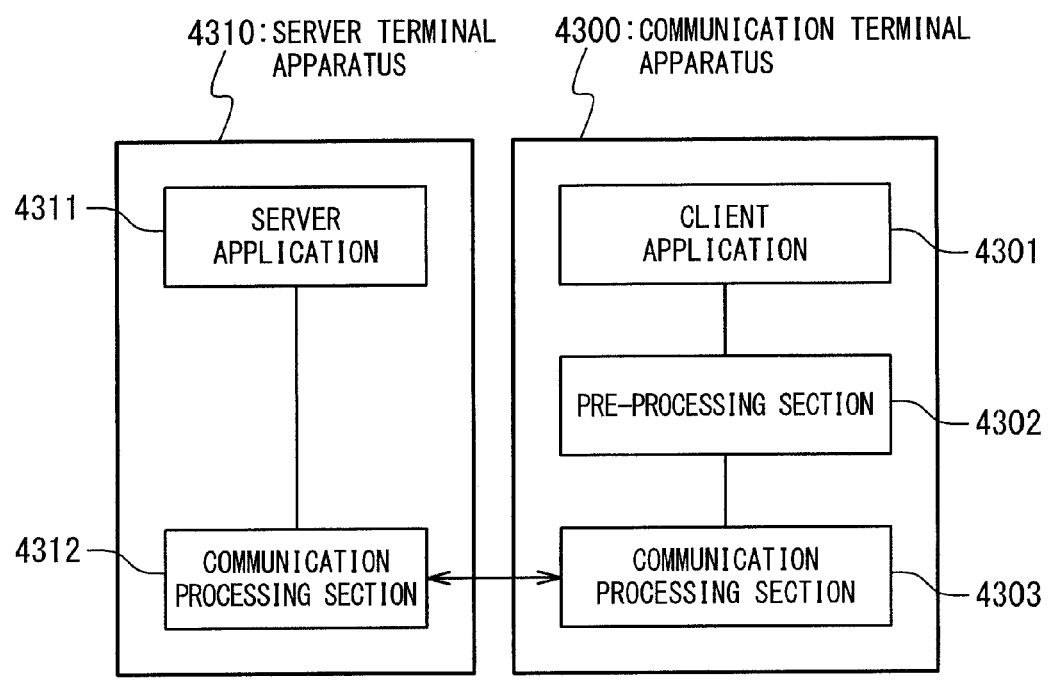
FIG. 43 is a block diagram of a conventional technique.

Referring to FIG. 42, in the communication system according to an eighteenth exemplary embodiment of the present invention, the communication terminal apparatus 100 operating as the client terminal apparatus and the server terminal apparatus 61 operating as the server terminal apparatus are communicably connected to each other through the network NW such as the internet.

The communication terminal apparatus 100 is different from the communication terminal apparatus in the communication system of the sixteenth exemplary embodiment in that the communication terminal apparatus 100 retains a secret key distributed previously by the server terminal apparatus 61 and an encrypting section 128 is provided for encrypting the transmission data of the client application 111 by using the secret key instead of the certificate managing section 126.

The server terminal apparatus 61 is the same as that of the server terminal apparatus in the third exemplary embodiment shown in FIG. 12 and includes the server application 62, the communication processing section 63, and the decrypting section 64.

Next, an operation of the communication system of the present exemplary embodiment will be described.

The communication terminal apparatus 100 in the communication system of the present exemplary embodiment is different from the communication terminal apparatus in the communication system of the sixteenth exemplary embodiment in that the process by the encrypting section 128 is executed instead of the process by the certificate managing section 126 in the library function 121. When ending the first specific instruction 123 and the process by the pre-processing section 125, the library function 121 which is called and to which the transmission data is transferred from the client application data 111 encrypts the transmission data of the client application 111 by using a secret key of the server terminal apparatus 61 by the encrypting section 128 and sets the encrypted data as the transmission data. In subsequent communication using the communication system call 122, the encrypted data is transmitted to the communication processing section 63 of the server terminal apparatus 61 through the network NW.

Next, an operation of the server terminal apparatus 61 is the same as that of the server terminal apparatus in the communication system in the third exemplary embodiment.

According to the present exemplary embodiment, when the client application 110 communicates with the server application 62, the execution of the necessary pre-process before the communication can be guaranteed within the communication terminal apparatus 100 based on the same reason as the communication system of the sixteenth exemplary embodiment.

Moreover, according to the present exemplary embodiment, whether or not the necessary pre-process has been executed before the communication can be determined on the server terminal apparatus 61 side, which is based on the same reason as the third exemplary embodiment of the communication system.

In a system in which the client application operating on the communication terminal apparatus communicates with a server application on a server terminal apparatus and operates, the present invention can be applied to realize a function of communicating with the server application after the client application has necessarily executed the specific process in the communication terminal apparatus.

The invention claimed is:

1. A communication terminal apparatus comprising:
a storage section configured to store a library function in which a first specific instruction is executed before a process to be executed prior to a communication with a communication target and a second specific instruction is executed before returning to a call source, a client application, an attribute value group of the client application, and an permissible address range of the first specific instruction;
a communication instruction execution control section configured to control execution of a communication instruction based on the attribute value group of the client application, when the client application executes the communication instruction to generate an internal interruption;
a security gate entering section configured to check whether or not an address of the first specific instruction is within a permissible address range when the client application executes the first specific instruction to generate the internal interrupt, and to change the attribute value group of the client application when the address of the first specific instruction is within the permissible address range; and
a security gate exiting section configured to return the attribute value group of the client application to an original state when the client application executes the second specific instruction to generate the internal interrupt.

2. The communication terminal apparatus according to claim 1, wherein the process to be executed prior to the communication with the communication target includes a pre-process, and a process of adding a certificate verifying the execution of the pre-process for the communication target to a transmission data.

3. The communication terminal apparatus according to claim 2, wherein the pre-process includes a charging process.

4. The communication terminal apparatus according to claim 2, wherein the pre-process includes a copy right managing process.

5. The communication terminal apparatus according to claim 1, wherein the process to be executed prior to the communication with the communication target includes: a pre-process, and a process of encrypting a data to be transmitted to the communication target by using a secret key of the communication target.

6. The communication terminal apparatus according to claim 1, wherein the attribute value group includes an attribute value indicating a security level of the client application.

7. The communication terminal apparatus according to claim 6, wherein the communication instruction execution control section performs an authority check based on the security level of the client application and performs the communication instruction when having an authority to execute the communication instruction.

8. The communication terminal apparatus according to claim 6, wherein the security gate entering section changes the security level of the client application to a privilege level.

9. The communication terminal apparatus according to claim 1, wherein the attribute value group includes an attribute value indicating a security gate entry state of the client application.

10. The communication terminal apparatus according to claim 9, wherein the communication instruction execution control section performs the communication instruction when the client application is in the security gate entry state.

11. The communication terminal apparatus according to claim 1, wherein the attribute value group includes an attribute value indicating a security level of the client application and an attribute value indicating a security gate entry state.

12. The communication terminal apparatus according to claim 11, wherein the communication instruction execution control section executes the communication instruction without executing an authority check based on the security level of the client application when the client application is in the security gate entry state, performs the authority check based on the security level of the client application when the client application is not in the security gate entry state, and performs the communication instruction when having an authority to execute the communication instruction.

13. The communication terminal apparatus according to claim 12, further comprising:

a security gate temporary exiting section configured to return the security level of the client application to a state previous to a security gate entry, before calling a signal/interruption handler of the client application, when a signal/interruption is generated while the client application is being run in the security gate entry state, and to return the security level to a state after the security gate entry when or after a process of the signal/interruption handler is ended.

14. The communication terminal apparatus according to claim 11, wherein the security gate entry section changes the security level of the client application in the security gate entry state,
   the security gate exiting section returns the security level of the client application into an original state, and
   the communication instruction execution control section performs an authority check based on the security level of the client application and performs the communication instruction when having an authority to execute the communication instruction.

15. The communication terminal apparatus according to claim 11, wherein the communication instruction execution control section performs an authority check based on the security level of the client application after updating the security level of the client application when the client application is in the security gate entry state, and returns the security level to the original state after performing the communication instruction when having the authority to execute the communication instruction.

16. The communication terminal apparatus according to claim 1, further comprising:
   a security gate temporary exiting section configured to return the security level of the client application to a state previous to update, before calling a signal/interruption handler of the client application, when a signal/interruption is generated while the client application is being run from the update of the attribute value group of the client application by the security gate entering section to return of the attribute value group of the client application by the client application exiting section, and to return the security level to a state after the update by the security gate entering section when or after a process of the signal/interruption handler is ended.

17. The communication terminal apparatus according to claim 1, wherein in the library function, the first specific instruction is arranged before a pre-process description and the second specific instruction is arranged before an exit for returning to a call source.

18. The communication terminal apparatus according to claim 1, wherein an instruction sequence is arranged to change a stack of the client application such that in the library function, the first specific instruction is arranged before a pre-process description and a function including the second specific instruction is executed before returning to a call source, on a path that is necessarily executed after the first specific instruction.

19. The communication terminal apparatus according to claim 1, wherein in the library function, the first specific instruction is arranged before a pre-process description, and
   the security gate entering section changes a stack of the client application such that a function including the second specific instruction is executed before the client application returns to a call source when the attribute value group of the client application is changed.

20. The communication terminal apparatus according to claim 1, wherein the predetermined address range is an address range in a ROM area.

21. The communication terminal apparatus according to claim 1, wherein the security gate entering section checks whether or not an address of the first specific instruction is in a permissible address range, when the client application executes the first specific instruction to generate an internal interruption, and checks whether or not the address of the first specific instruction is in a program area.

22. The communication terminal apparatus according to claim 1, wherein the first and second specific instructions are a security gate entry request, and a system call instruction which issues an exit request to an operating system.

23. A communication system comprising a communication terminal apparatus and a server terminal apparatus, which are connected to each other through a network,
   wherein the communication terminal apparatus comprises
   a storage section configured to store a library function in which a first specific instruction is executed before a process to be executed prior to a communication with a communication target and a second specific instruction is executed before returning to a call source, a client application, an attribute value group of the client application, and an permissible address range of the first specific instruction;
   a communication instruction execution control section configured to control execution of a communication instruction based on the attribute value group of the client application, when the client application executes the communication instruction to generate an internal interruption;
   a security gate entering section configured to check whether or not an address of the first specific instruction is within a permissible address range when the client application executes the first specific instruction to generate the internal interrupt, and to change the attribute value group of the client application when the address of the first specific instruction is within the permissible address range; and
   a security gate exiting section configured to return the attribute value group of the client application to an original state when the client application executes the second specific instruction to generate the internal interrupt,
   wherein the process to be executed prior to the communication with the communication target comprises a pre-process, and a process of adding a certificate verifying the execution of the pre-process for the communication target to a transmission data, and
   wherein the server terminal apparatus comprising:
   a storage section configured to store a server application;
   a certificate verifying section configured to verify whether or not a certificate is authorized; and
   a communication processing section configured to determine to be a data received from a client application which executes a predetermined pre-process prior to a communication, when the certificate added to the data received from the client application is determined to be authorized by the certificate verifying section, and to transmit to the server application.

24. A communication system comprising a communication terminal apparatus and a server terminal apparatus, which are connected to each other through a network,
   wherein the communication terminal apparatus comprises
   a storage section configured to store a library function in which a first specific instruction is executed before a process to be executed prior to a communication with a communication target and a second specific instruction is executed before returning to a call source, a client application, an attribute value group of the client application, and an permissible address range of the first specific instruction;

a communication instruction execution control section configured to control execution of a communication instruction based on the attribute value group of the client application, when the client application executes the communication instruction to generate an internal interruption;

a security gate entering section configured to check whether or not an address of the first specific instruction is within a permissible address range when the client application executes the first specific instruction to generate the internal interrupt, and to change the attribute value group of the client application when the address of the first specific instruction is within the permissible address range; and a security gate exiting section configured to return the attribute value group of the client application to an original state when the client application executes the second specific instruction to generate the internal interrupt, wherein the process to be executed prior to the communication with the communication target comprises a pre-process, and a process of encrypting a data to be transmitted to the communication target by using a secret key of the communication target, and wherein the server terminal apparatus comprises:

a storage section configured to store a server application;

a decrypting section configured to decrypt an encrypted data by using a public key of the apparatus; and a communication processing section configured to determine to be a data received from a client application which has executed a predetermined pre-process prior to a communication, when the encrypted data received from the client application is decrypted by the decrypting section, and to transmit the decrypted data to the server application.

25. A data processing method comprising:

in a communication terminal apparatus, retaining a library function in which a first specific instruction is executed before a process to be executed prior to a communication with a communication target and a second specific instruction is executed before returning to a call source, a client application, an attribute value group of the client application, and an permissible address range of the first specific instruction;

controlling execution of a communication instruction based on the attribute value group of the client application when the client application executes a communication instruction to generate an internal interruption;

checking whether or not an address of the first specific instruction is within the permissible address range when the client application executes the first specific instruction to generate the internal interruption;

changing the attribute value group of the client application when the address of the first specific instruction is within the permissible address range; and returning the attribute value group of the client application to an original state when the client application executes the second specific instruction to generate an internal interruption.

26. The data processing method according to claim 25, wherein the process to be executed comprises a pre-process, and a process of adding a certificate verifying that the pre-process has been executed to the communication target to a transmission data.

27. The data processing method according to claim 25, wherein the pre-process comprises a pre-process, and a process of encrypting a data to be transmitted to the communication target by using a secret key of the communication target.

28. A non-transitory computer-readable software product for a data processing method executed by a computer which comprises s storage section configured to retain a library function in which a first specific instruction is executed before a process to be executed prior to a communication with a communication target and a second specific instruction is executed before returning to a call source, a client application, an attribute value group of the client application, and an permissible address range of the first specific instruction, in a communication terminal apparatus, wherein the method comprises:

controlling execution of a communication instruction based on the attribute value group of the client application when the client application executes a communication instruction to generate an internal interruption;

checking whether or not an address of the first specific instruction is within the permissible address range when the client application executes the first specific instruction to generate the internal interruption;

changing the attribute value group of the client application when the address of the first specific instruction is within the permissible address range; and returning the attribute value group of the client application to an original state when the client application executes the second specific instruction to generate an internal interruption.

29. The non-transitory computer-readable software product according to claim 28, wherein the process to be executed comprises a pre-process, and a process of adding a certificate verifying that the pre-process has been executed to the communication target to a transmission data.

30. The non-transitory computer-readable software product according to claim 28, wherein the pre-process comprises a pre-process, and a process of encrypting a data to be transmitted to the communication target by using a secret key of the communication target.

* * * * *